(12) United States Patent
Jung et al.

(10) Patent No.: US 10,750,918 B2
(45) Date of Patent: Aug. 25, 2020

(54) CLEANING ROBOT AND CONTROLLING METHOD THEREOF

(71) Applicant: Samsung Electronics Co., Ltd., Suwon-si (KR)

(72) Inventors: Hyun Soo Jung, Seongnam-si (KR); Chin Woo Kang, Seoul (KR); Kyong Su Kim, Hwaseong-si (KR); Kyu Ha Lee, Gwangju (KR); Jong Gap Lee, Gwangju (KR); Jeong Gon Song, Gwangju (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 439 days.

(21) Appl. No.: 15/323,349

(22) PCT Filed: Jun. 3, 2015

(86) PCT No.: PCT/KR2015/005574
§ 371 (c)(1),
(2) Date: Dec. 30, 2016

(87) PCT Pub. No.: WO2016/003077
PCT Pub. Date: Jan. 7, 2016

(65) Prior Publication Data
US 2017/0156560 A1 Jun. 8, 2017

(30) Foreign Application Priority Data

Jul. 1, 2014 (KR) .......................... 10-2014-0081749
Jul. 1, 2014 (KR) .......................... 10-2014-0081798

(51) Int. Cl.
*A47L 9/28* (2006.01)
*A47L 9/16* (2006.01)
*G05D 1/02* (2020.01)

(52) U.S. Cl.
CPC .............. *A47L 9/2805* (2013.01); *A47L 9/16* (2013.01); *A47L 9/2852* (2013.01);
(Continued)

(58) Field of Classification Search
CPC ........ A47L 9/2805; A47L 9/16; A47L 9/2852; A47L 2201/04; G05D 1/0219;
(Continued)

(56) References Cited

U.S. PATENT DOCUMENTS 5,815,880 A * 10/1998 Nakanishi ............... A47L 11/20
15/319
6,809,490 B2 * 10/2004 Jones .................... G05D 1/0219
318/568.12
(Continued)

FOREIGN PATENT DOCUMENTS

CN 102846273 1/2013
CN 104068787 10/2014
(Continued)

OTHER PUBLICATIONS

Front_Definition of Front at Dictionary.com.pdf (Front | Definition of Front at Dictionary.com, Aug. 5, 2019, https://www.dictionary.com/browse/front, pp. 1-10) (Year: 2019).*
(Continued)

*Primary Examiner* — Bao Long T Nguyen
(74) *Attorney, Agent, or Firm* — Staas & Halsey LLP

(57) ABSTRACT

Disclosed is a cleaning robot including: a driving unit configured to move the cleaning robot; an obstacle sensor configured to sense an obstacle; and a controller configured to reduce, if a distance between the cleaning robot and the obstacle is shorter than or equal to a reference distance, a driving speed of the cleaning robot so that the driving speed of the cleaning robot is lower than a shock absorbing speed when the cleaning robot contacts the obstacle.

14 Claims, 56 Drawing Sheets

(52) U.S. Cl.
CPC ......... *G05D 1/0219* (2013.01); *G05D 1/0223*
(2013.01); *G05D 1/0227* (2013.01); *G05D*
*1/0238* (2013.01); *A47L 2201/04* (2013.01);
*G05D 2201/0203* (2013.01); *G05D 2201/0215*
(2013.01)

(58) Field of Classification Search
CPC ............... G05D 1/0223; G05D 1/0227; G05D
2201/0203; G05D 2201/0215; G05D
1/0238–0242; B25J 19/027; G05B
2219/37605; G05B 19/41895; Y10S
901/01
USPC ................... 700/245, 253, 258, 255; 901/1;
318/568.12
See application file for complete search history.

(56) References Cited

U.S. PATENT DOCUMENTS

| | | | | |
|---|---|---|---|---|
| 2002/0016649 | A1* | 2/2002 | Jones | G05D 1/0238 |
| | | | | 700/245 |
| 2005/0251292 | A1* | 11/2005 | Casey | G05D 1/0238 |
| | | | | 700/245 |
| 2006/0229774 | A1* | 10/2006 | Park | G05D 1/0238 |
| | | | | 701/23 |
| 2008/0015738 | A1* | 1/2008 | Casey | G05D 1/0238 |
| | | | | 700/258 |
| 2008/0128343 | A1* | 6/2008 | Garti | E04H 4/1654 |
| | | | | 210/167.16 |
| 2008/0276407 | A1* | 11/2008 | Schnittman | A47L 11/34 |
| | | | | 15/319 |
| 2012/0065829 | A1* | 3/2012 | Yu | G05D 1/0227 |
| | | | | 701/23 |
| 2012/0232696 | A1* | 9/2012 | Tang | A47L 9/009 |
| | | | | 700/258 |
| 2013/0117952 | A1 | 5/2013 | Schnittman et al. | |
| 2015/0027959 | A1* | 1/2015 | Chouraqui | E04H 4/1654 |
| | | | | 210/739 |

FOREIGN PATENT DOCUMENTS

| | | |
|---|---|---|
| EP | 2730204 | 5/2014 |
| JP | 2005-216022 | 8/2005 |
| KR | 10-2005-0115994 | 12/2005 |
| KR | 10-0545375 | 1/2006 |
| KR | 10-2010-0010080 | 2/2010 |
| KR | 10-2014-0027682 | 3/2014 |

OTHER PUBLICATIONS

International Search Report dated Sep. 1, 2015 in corresponding International Application No. PCT/KR2015/005574.
Written Opinion of the International Search Authority dated Sep. 1, 2015 in corresponding International Application No. PCT/KR2015/005574.
Extended European Search Report dated Mar. 21, 2018 in European Patent Application No. 15814499.8.
Australian Office Action dated Mar. 16, 2018 in Australian Patent Application No. 2015285065.
Australian Notice of Acceptance dated Jun. 21, 2018 in Australian Patent Application No. 2015285065.
Chinese Office Action dated Jul. 18, 2018 in Chinese Patent Application No. 201580045172.3.
Australian Office Action dated Nov. 27, 2017 in corresponding Australian Patent Application No. 2015285065, 3 pp.
Communication pursuant to Rules 161(2) and 162 EPC dated Feb. 8, 2017 in corresponding European Patent Application No. 15814499.8, 2 pp.
Chinese Office Action dated Mar. 4, 2019 in Chinese Patent Application No. 201580045172.3.
Korean Office Action dated Sep. 30, 2019 in Korean Patent Application No. 10-2014-0081798.
Chinese Office Action dated Aug. 5, 2019 in Chinese Patent Application No. 201580045172.3.

\* cited by examiner

[Fig. 1]
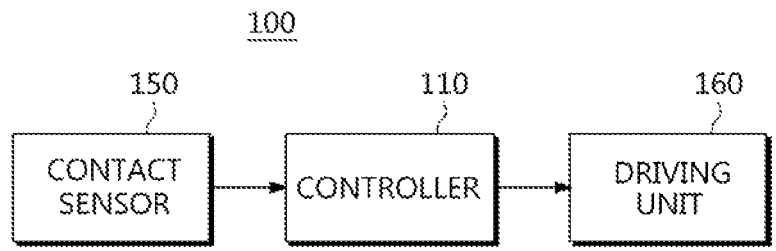
[Fig. 2a]
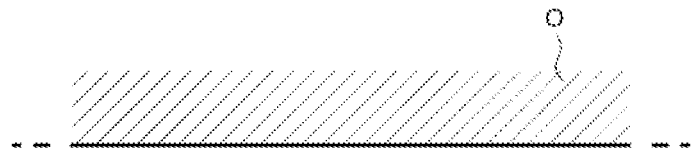
[Fig. 2b]
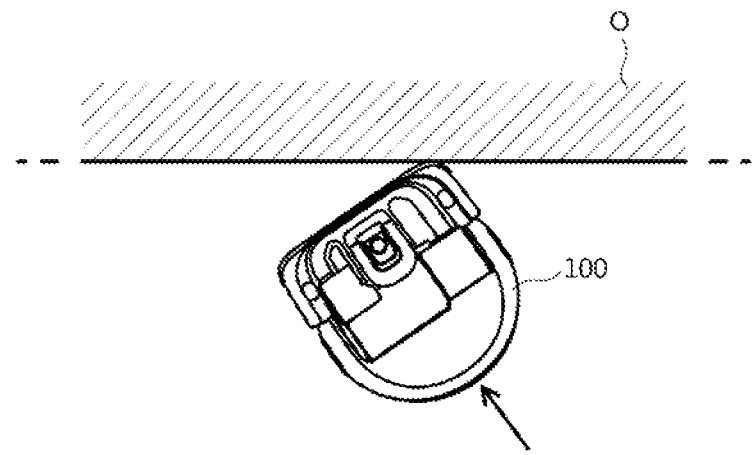

[Fig. 2c]
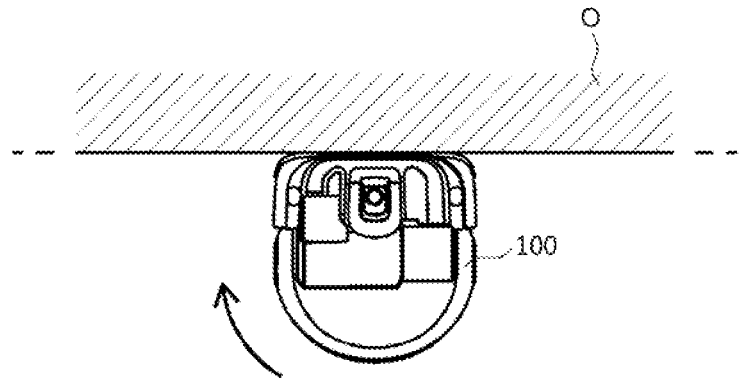
[Fig. 3]
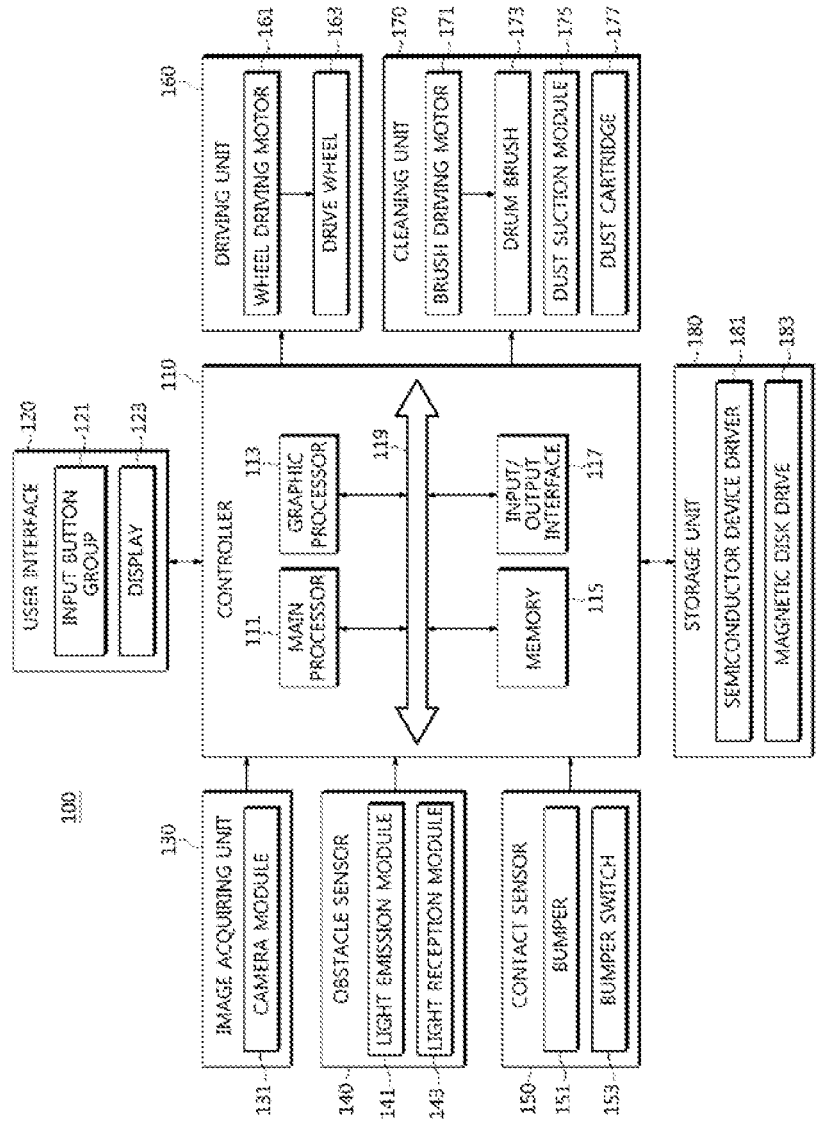

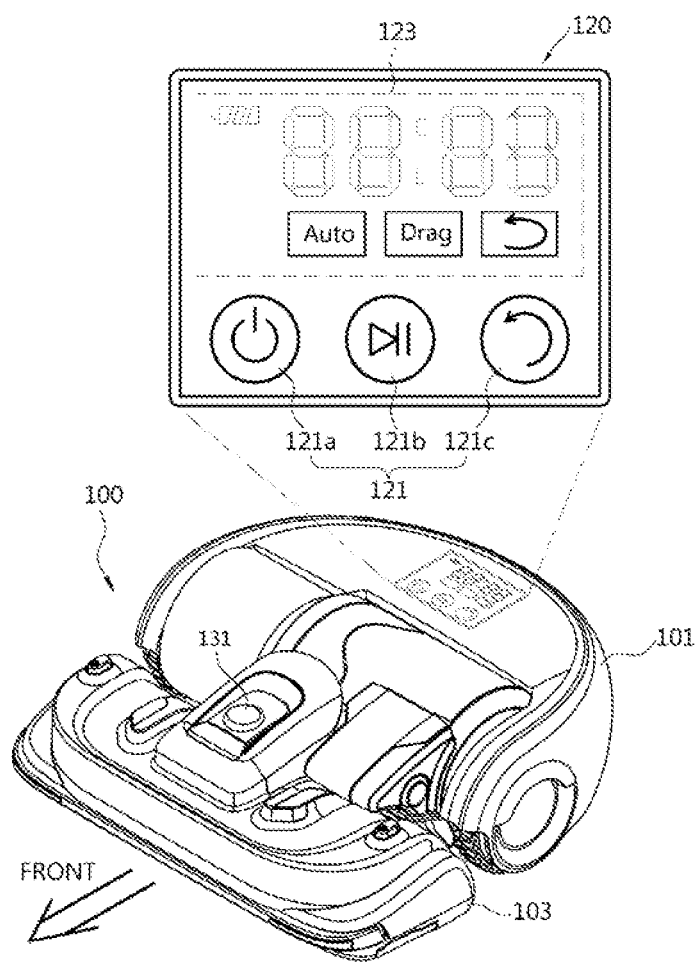
[Fig. 4]

[Fig. 5]
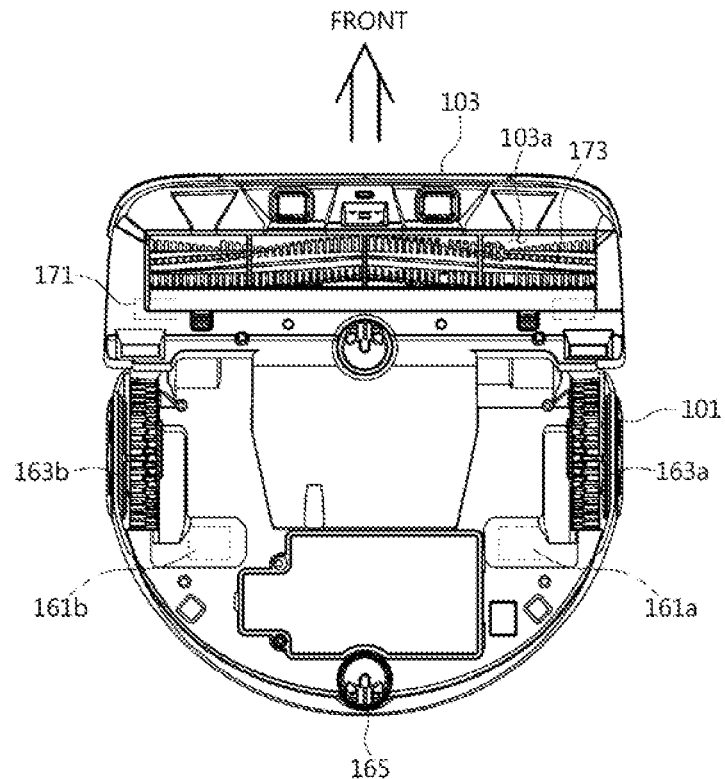
[Fig. 6]
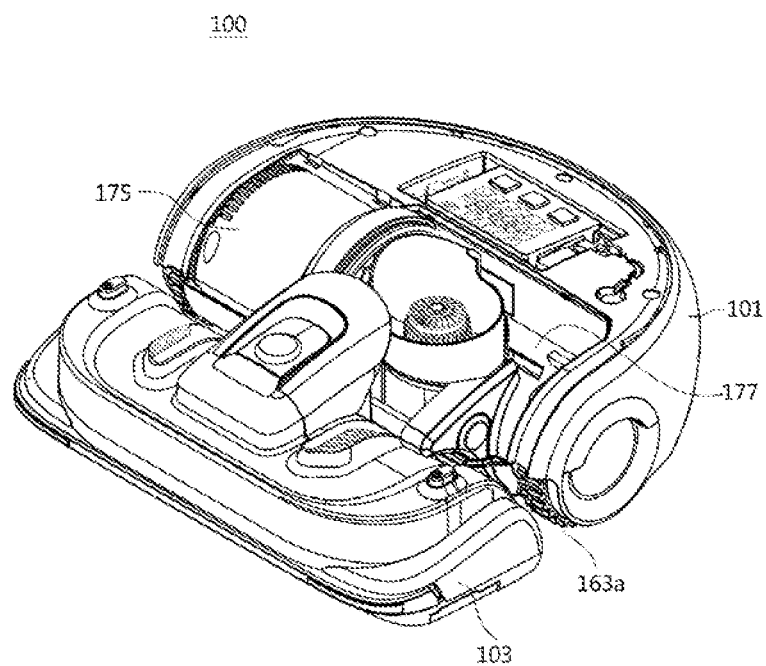

[Fig. 7]
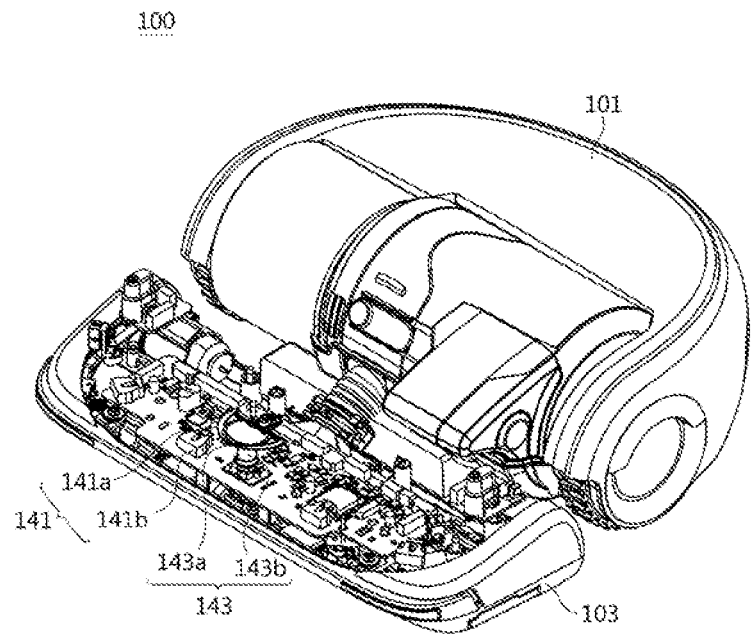
[Fig. 8]
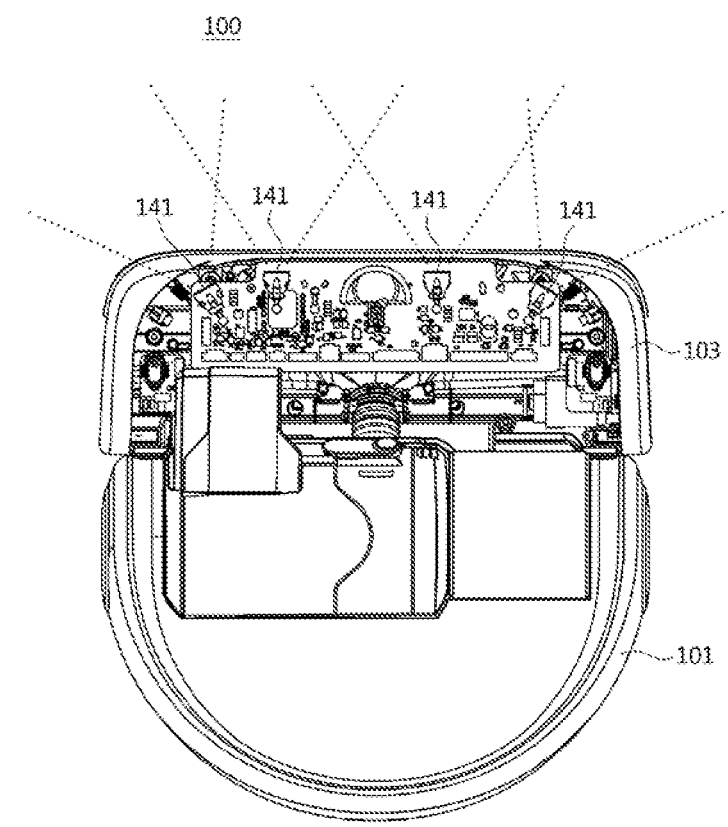

[Fig. 9]
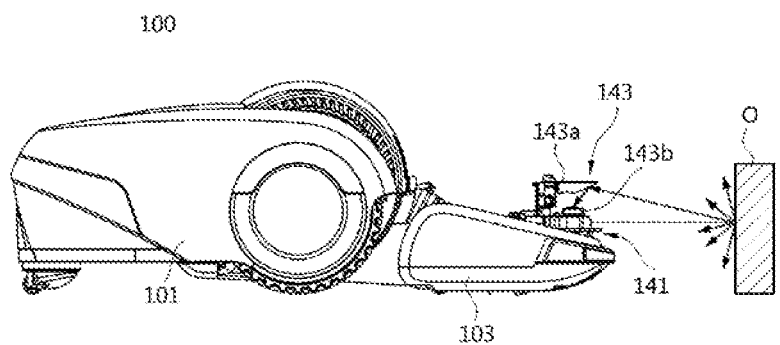
[Fig. 10]
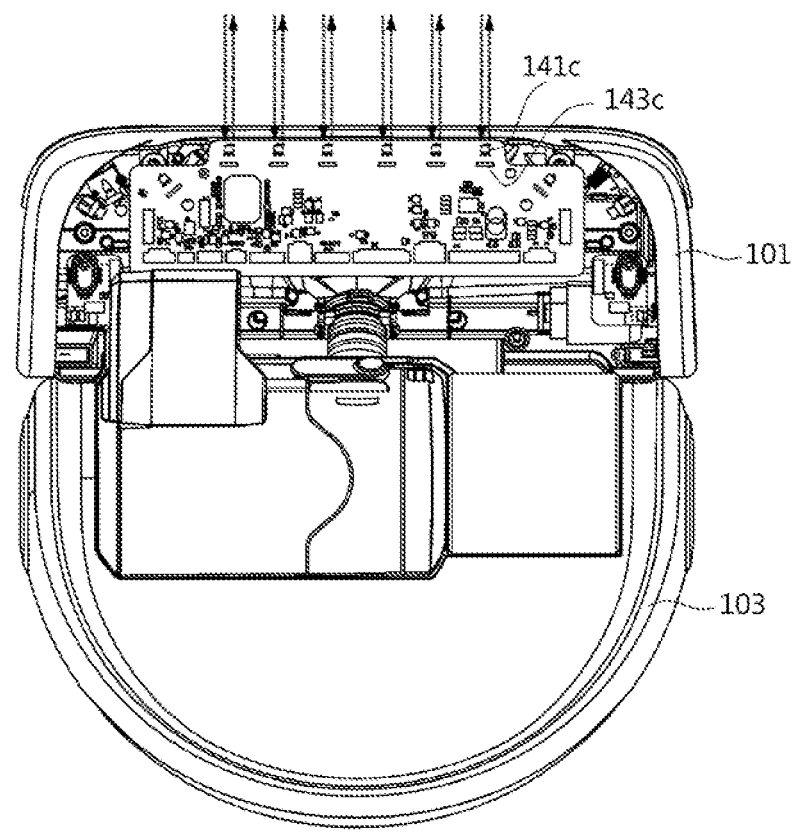

[Fig. 11]
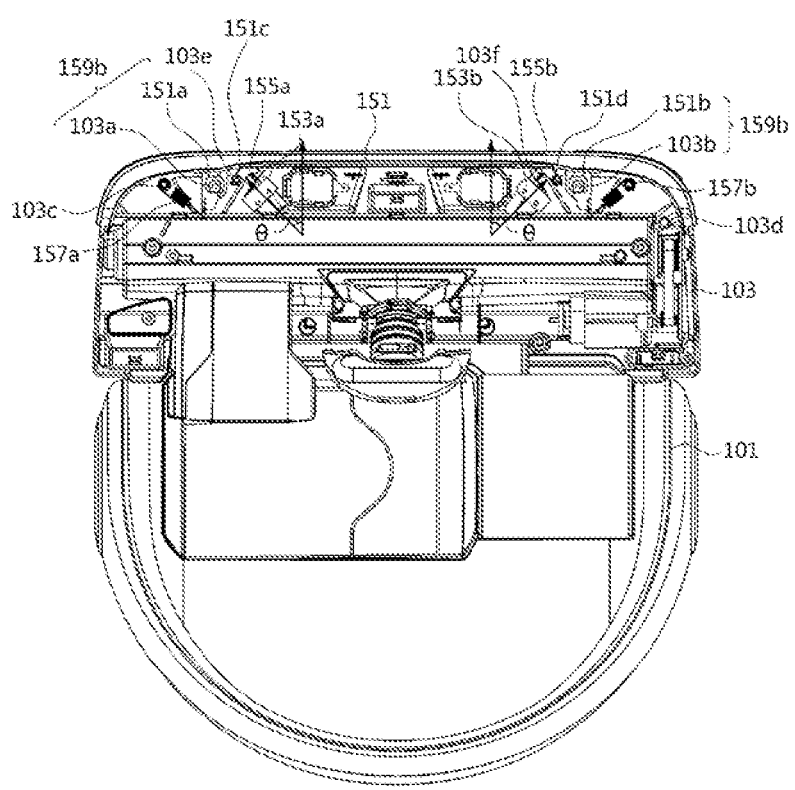

[Fig. 12]
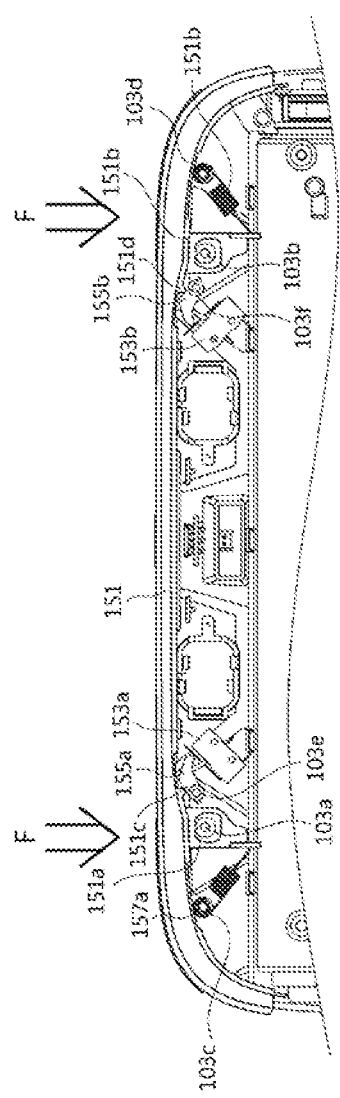

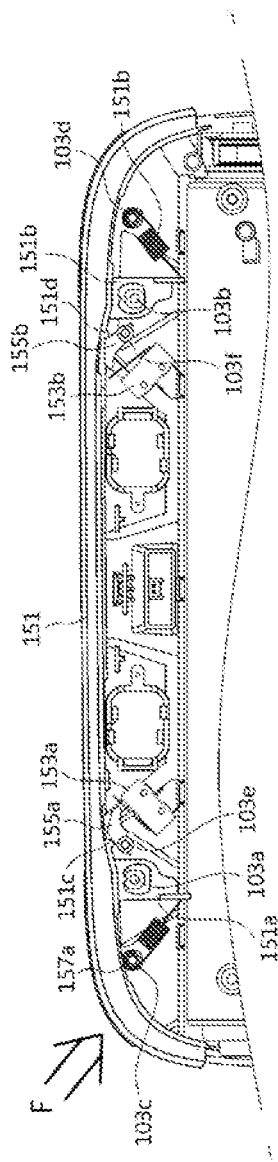
[Fig. 13]

[Fig. 14]
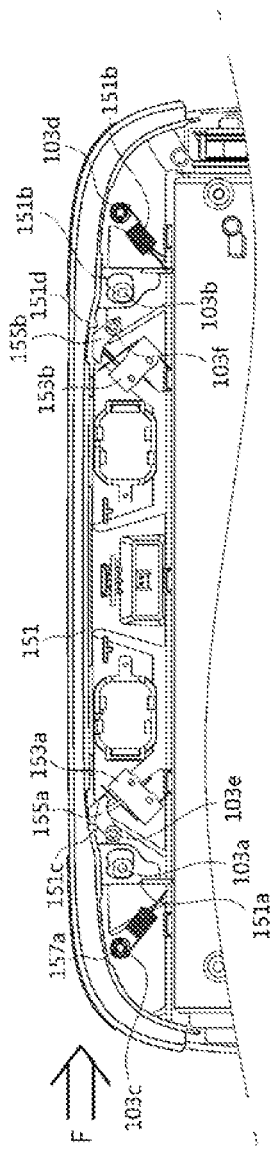

[Fig. 15]
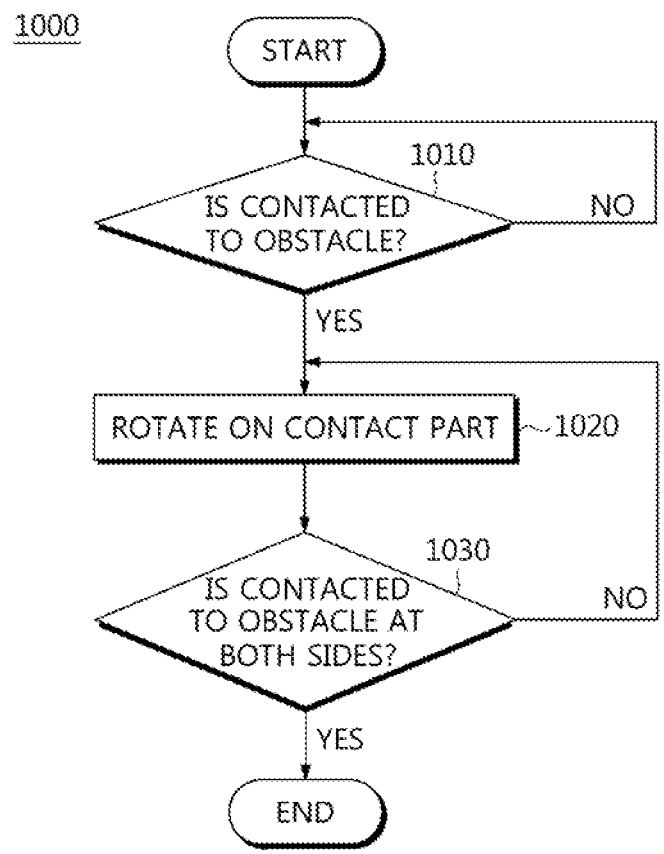
[Fig. 16a]
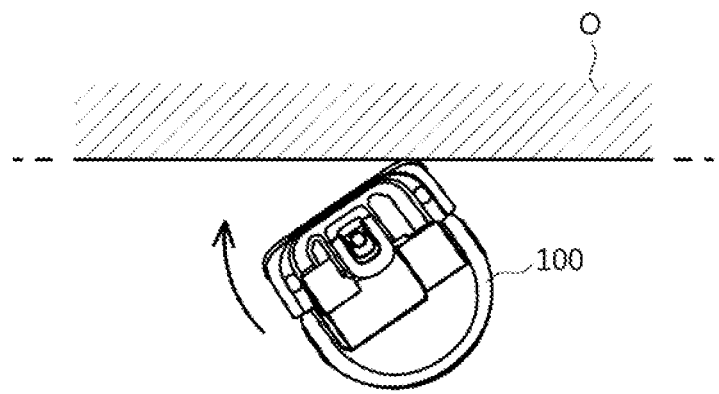

[Fig. 16b]
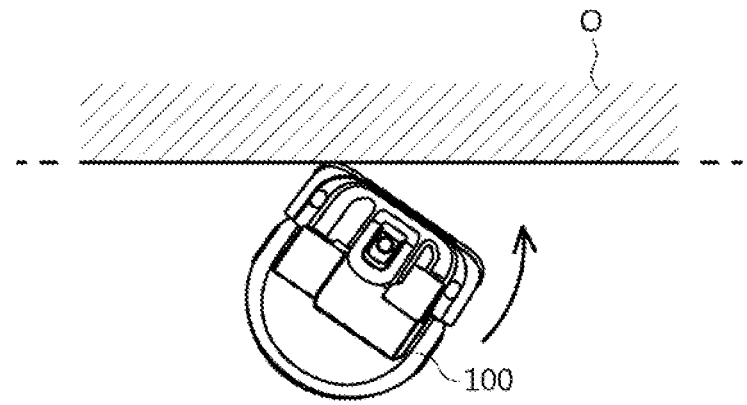
[Fig. 17]
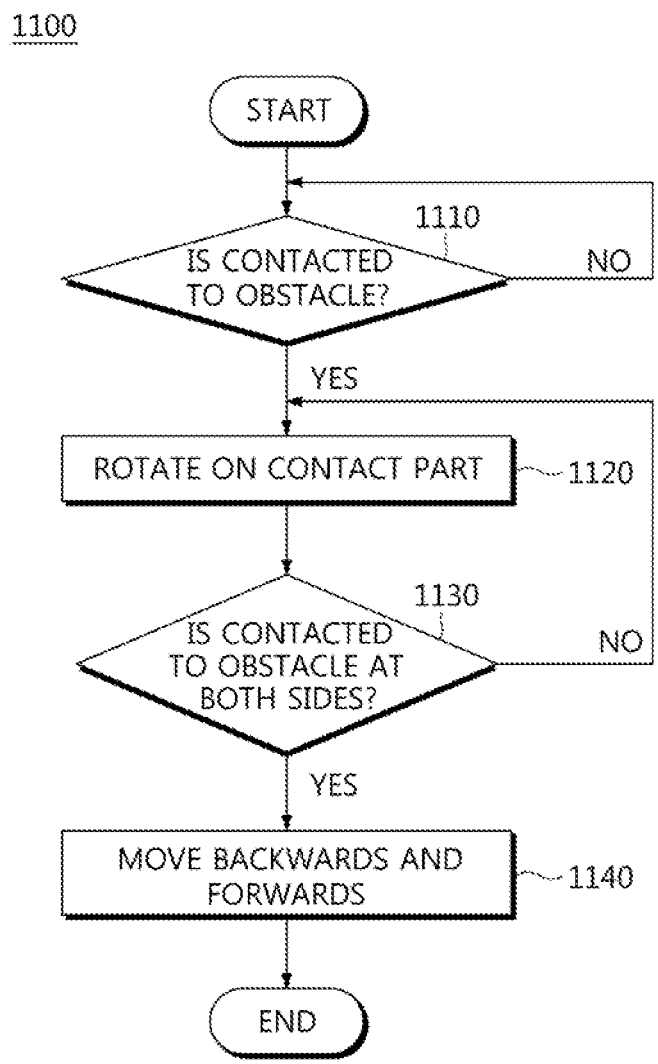

[Fig. 18a]
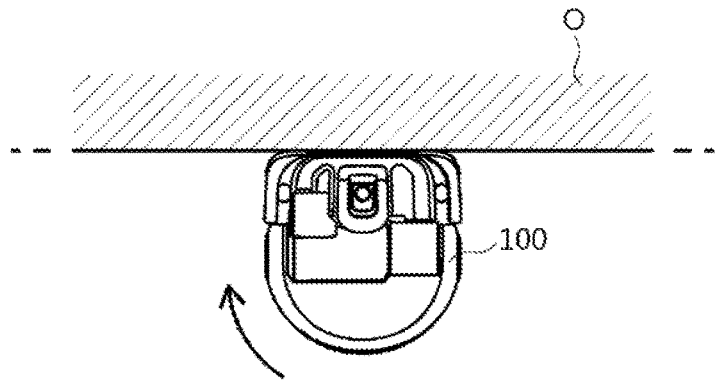
[Fig. 18b]
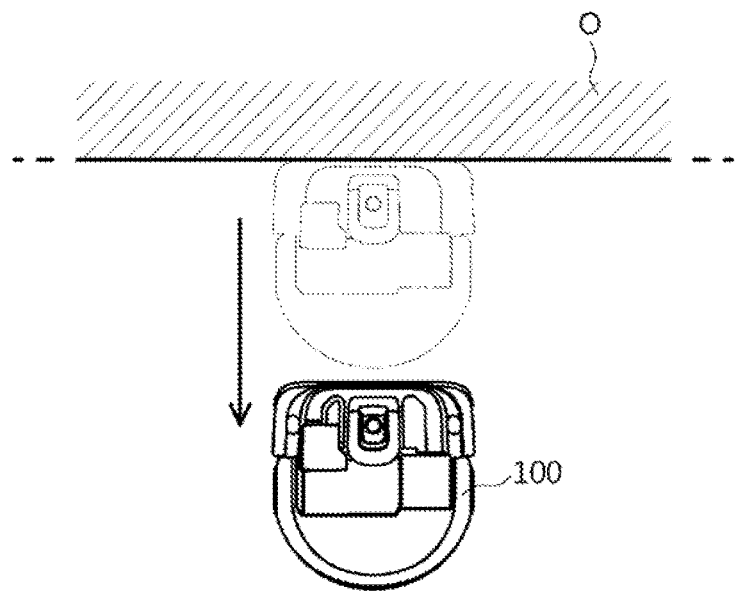
[Fig. 18c]
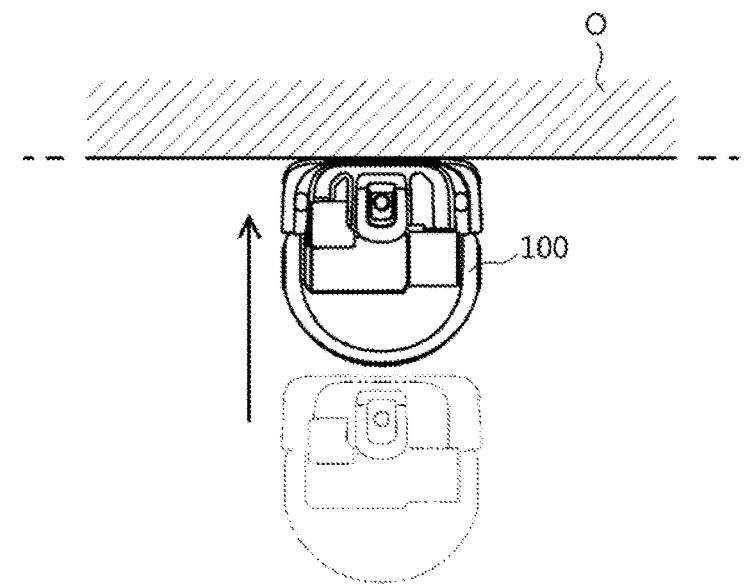

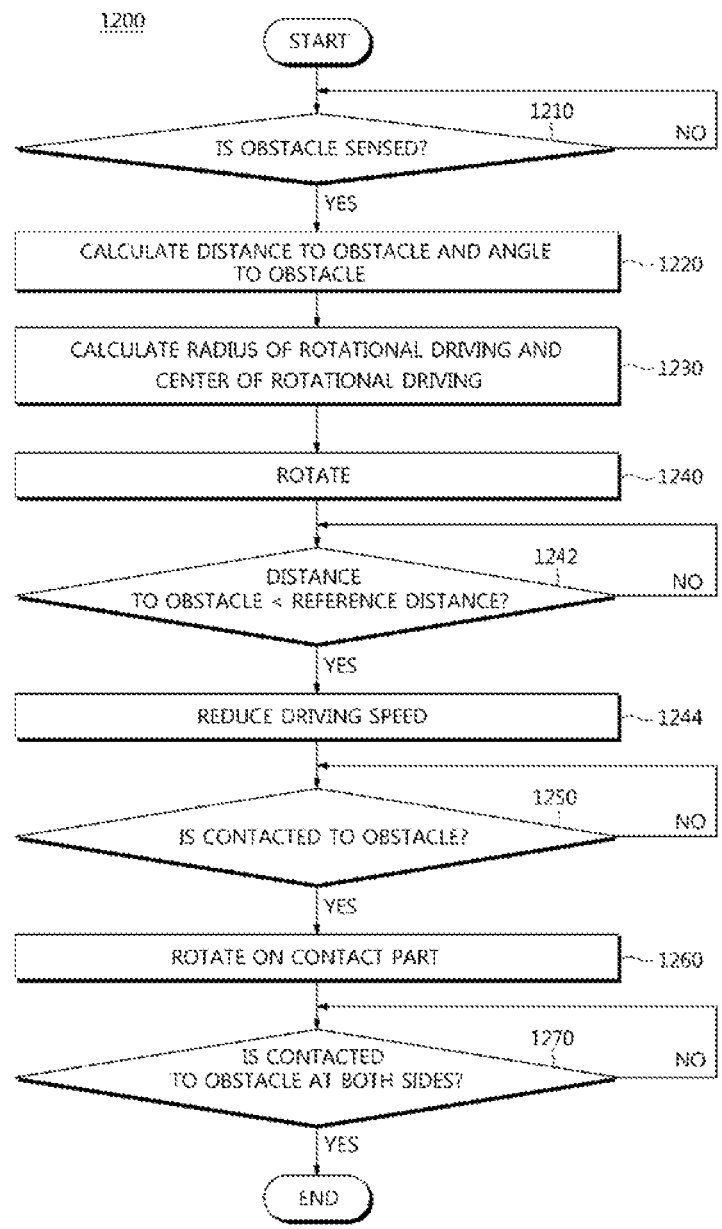
[Fig. 19]

[Fig. 20a]
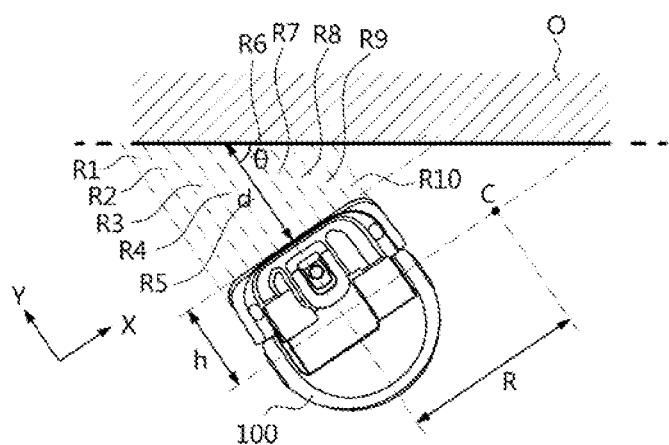
[Fig. 20b]
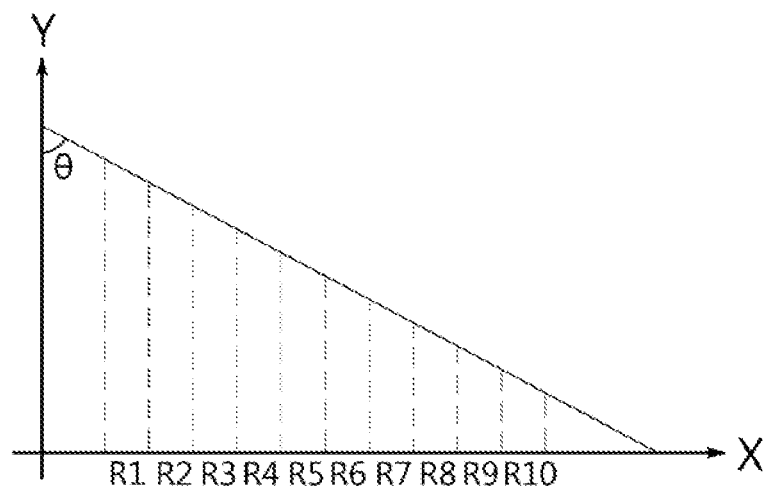

[Fig. 21a]
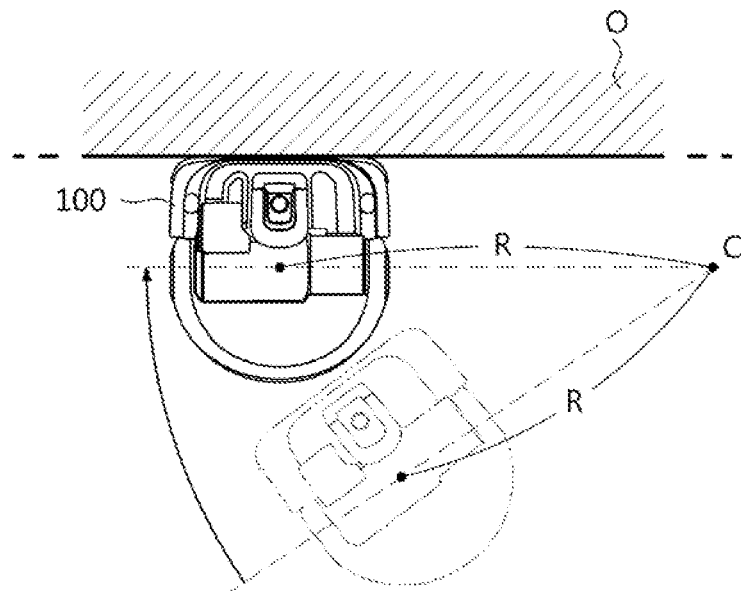
[Fig. 21b]
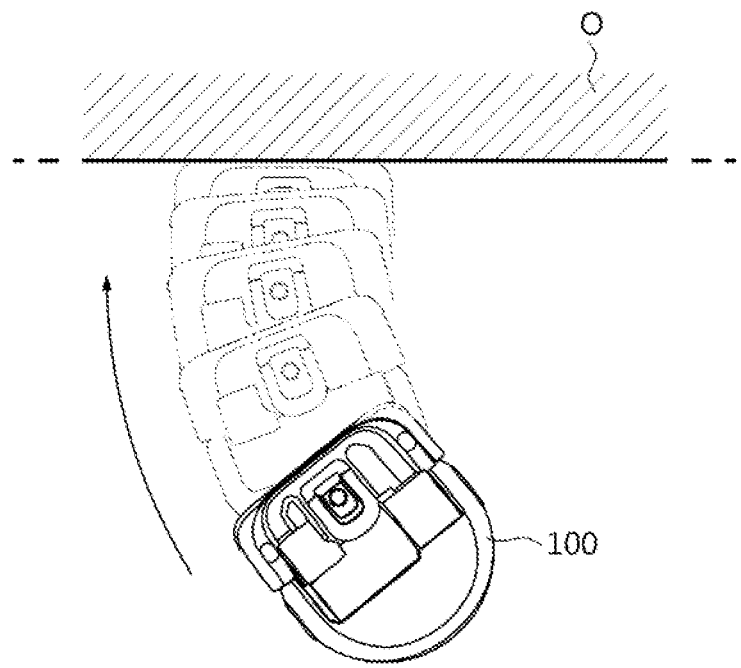

[Fig. 22]
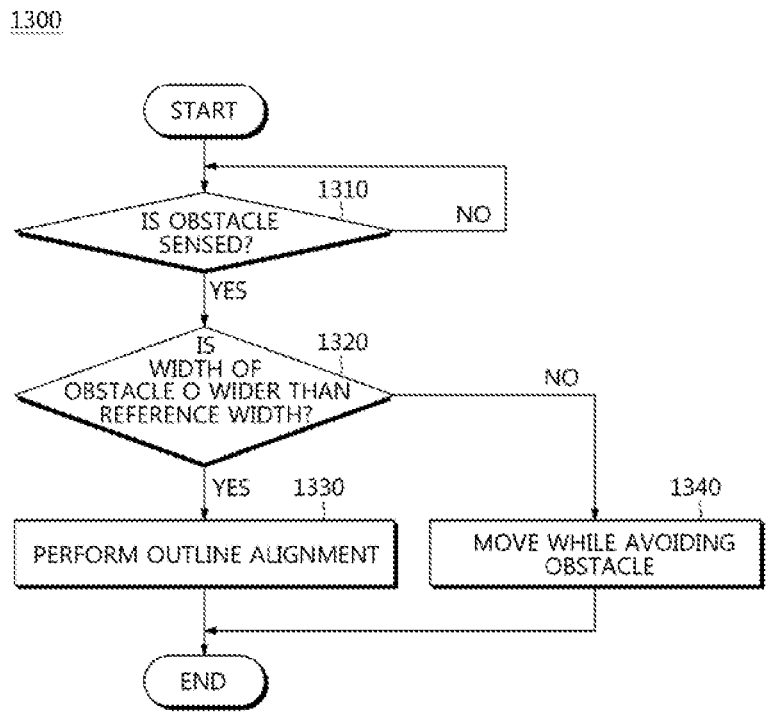
[Fig. 23a]
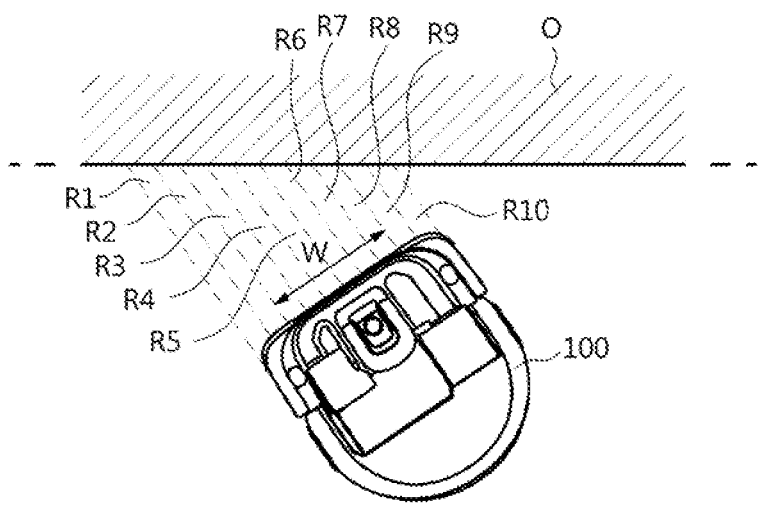

[Fig. 23b]
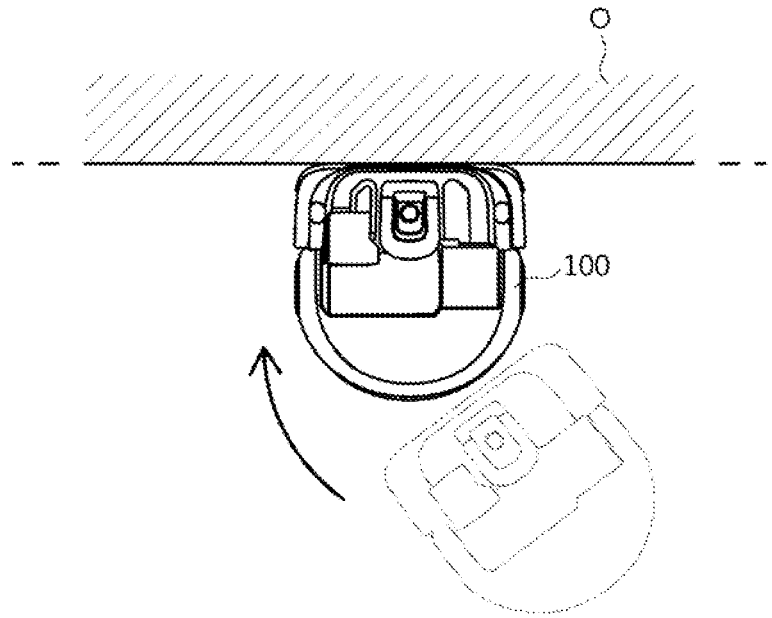
[Fig. 24a]
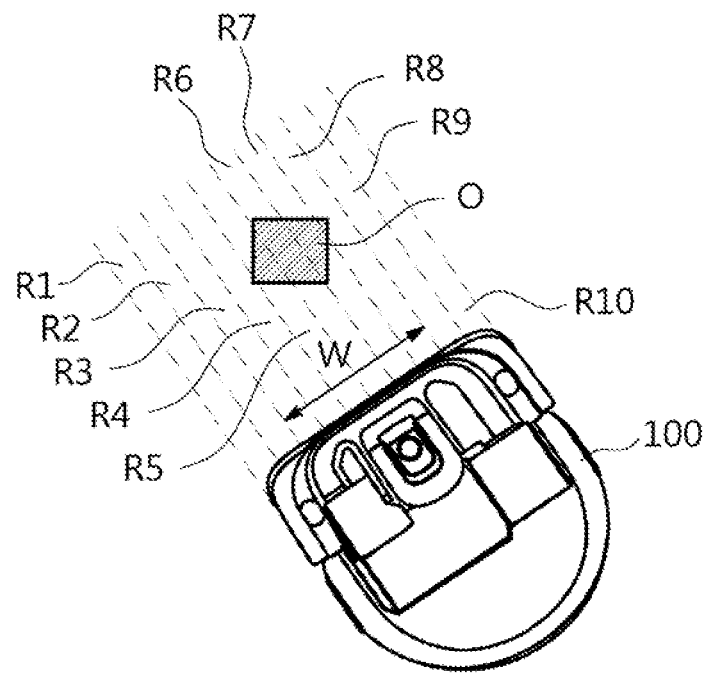

[Fig. 24b]
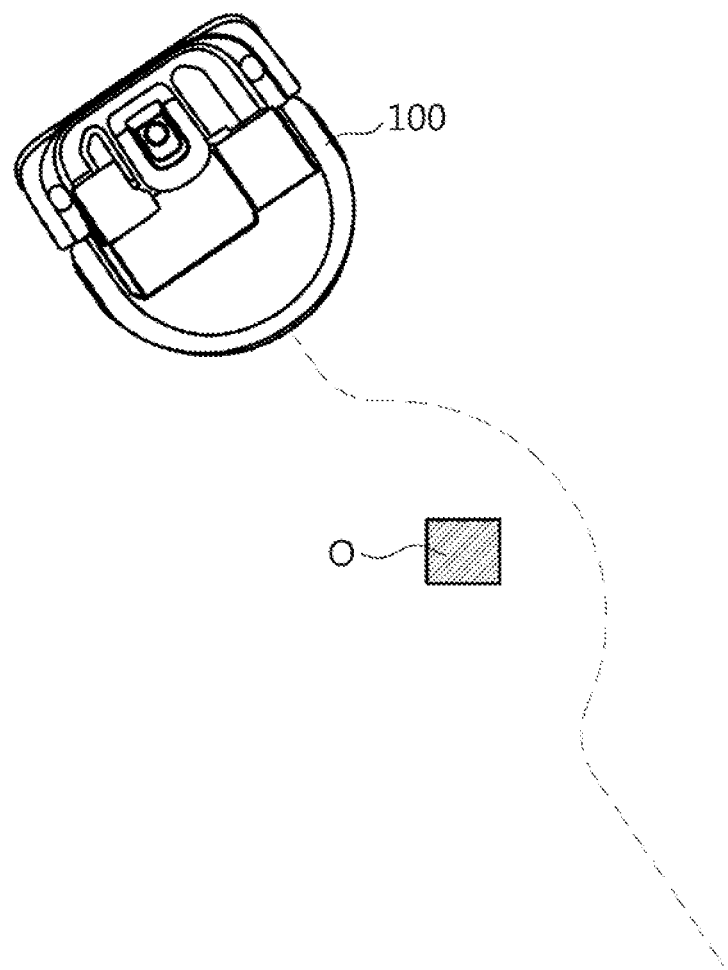

[Fig. 25]
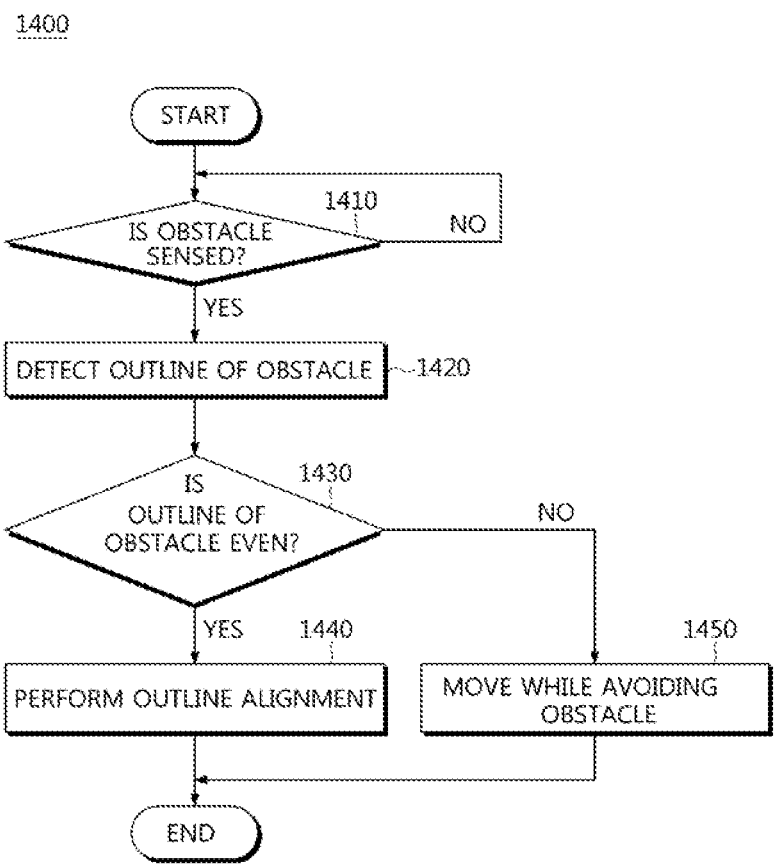
[Fig. 26a]
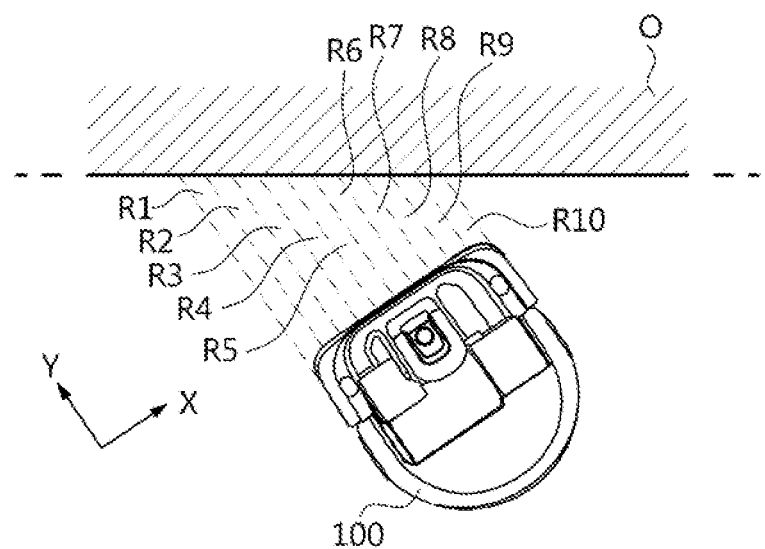

[Fig. 26b]
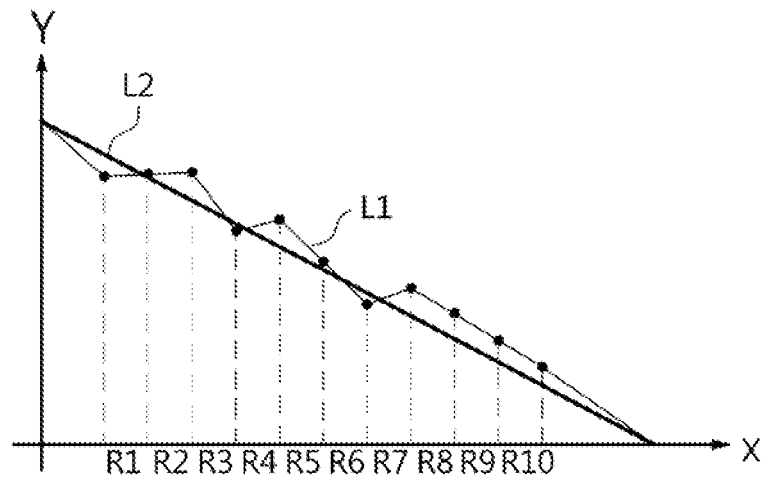
[Fig. 26c]
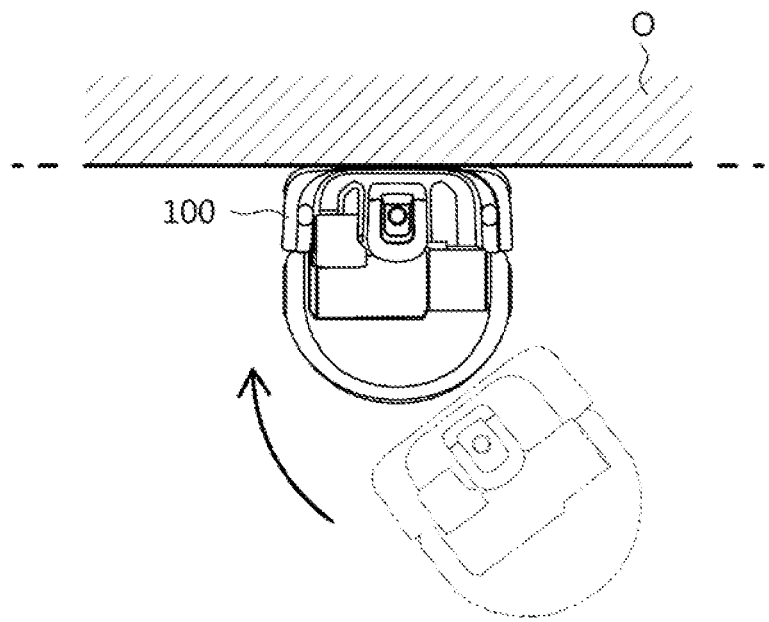

[Fig. 27a]
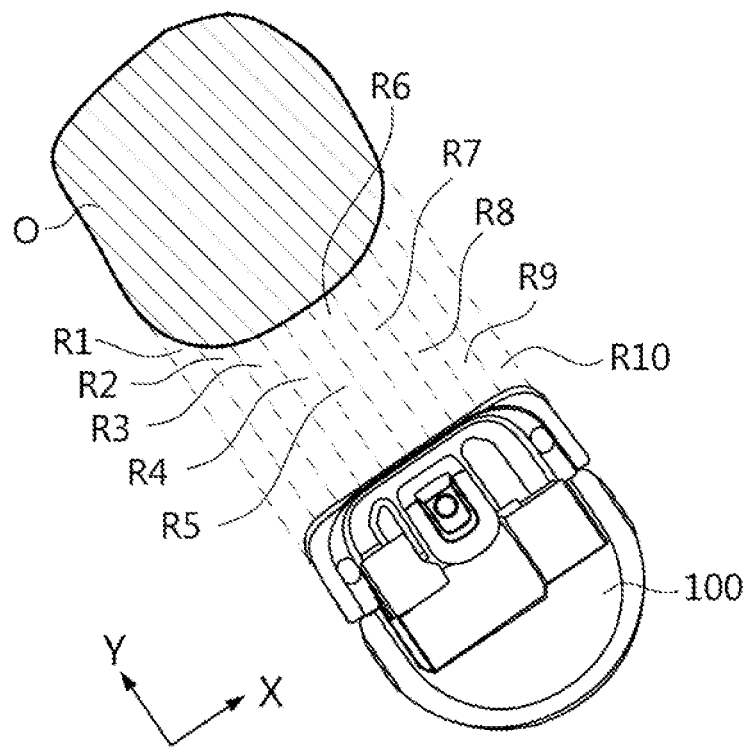
[Fig. 27b]
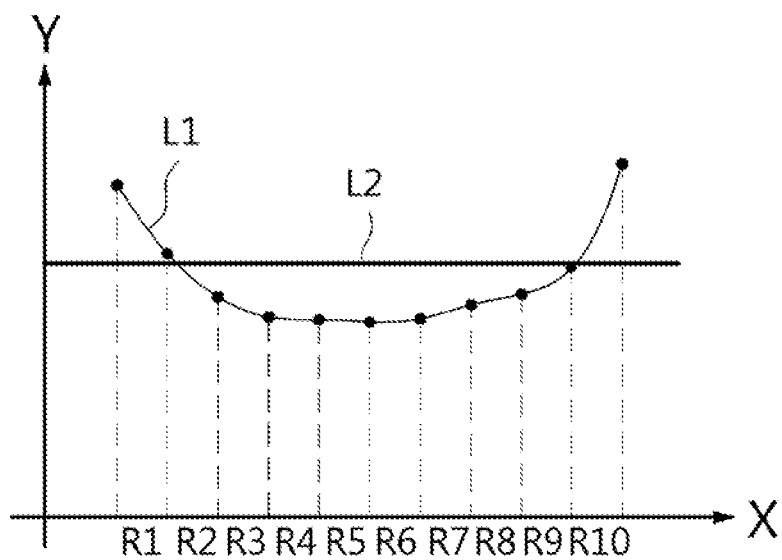

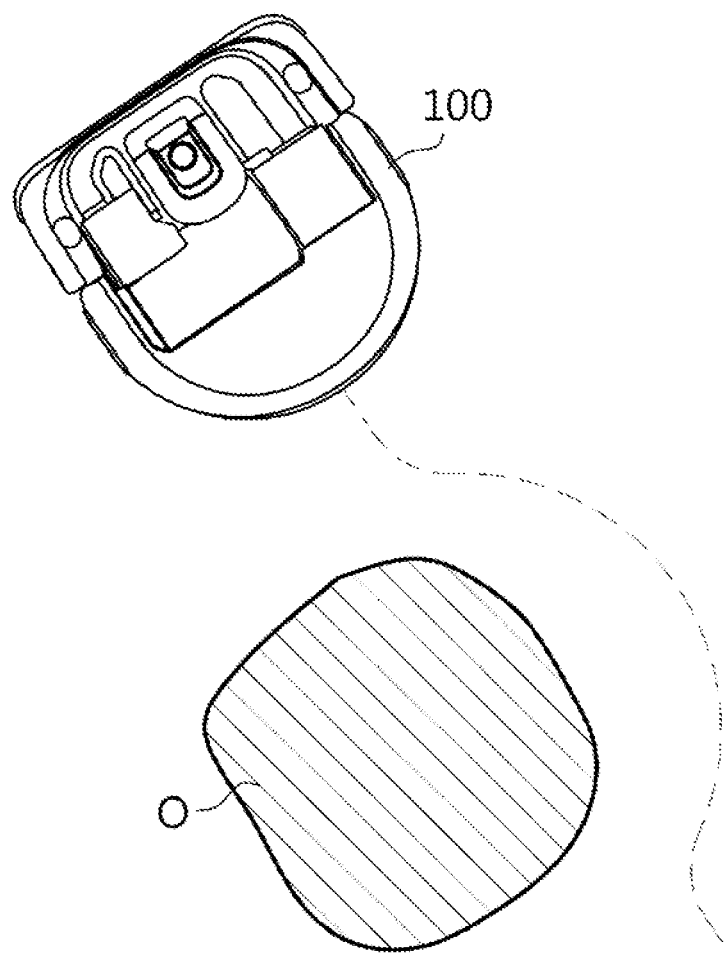
[Fig. 27c]

[Fig. 28a]
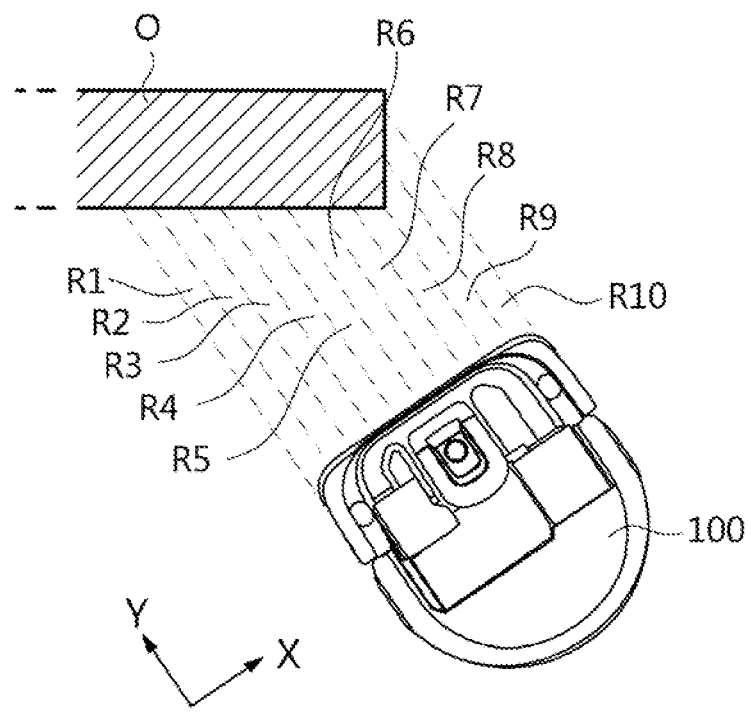
[Fig. 28b]
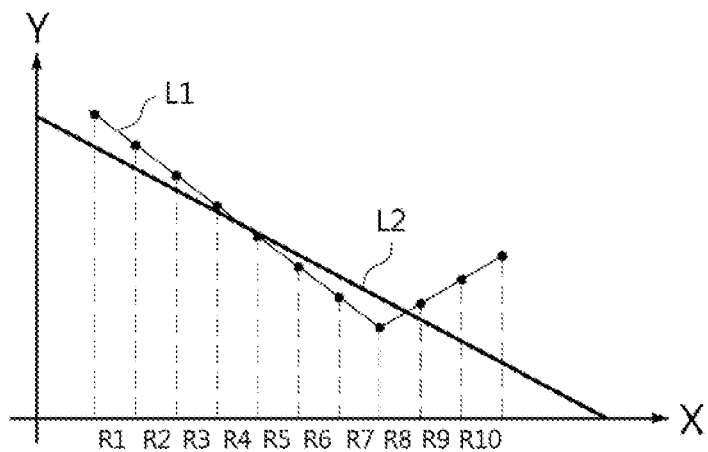

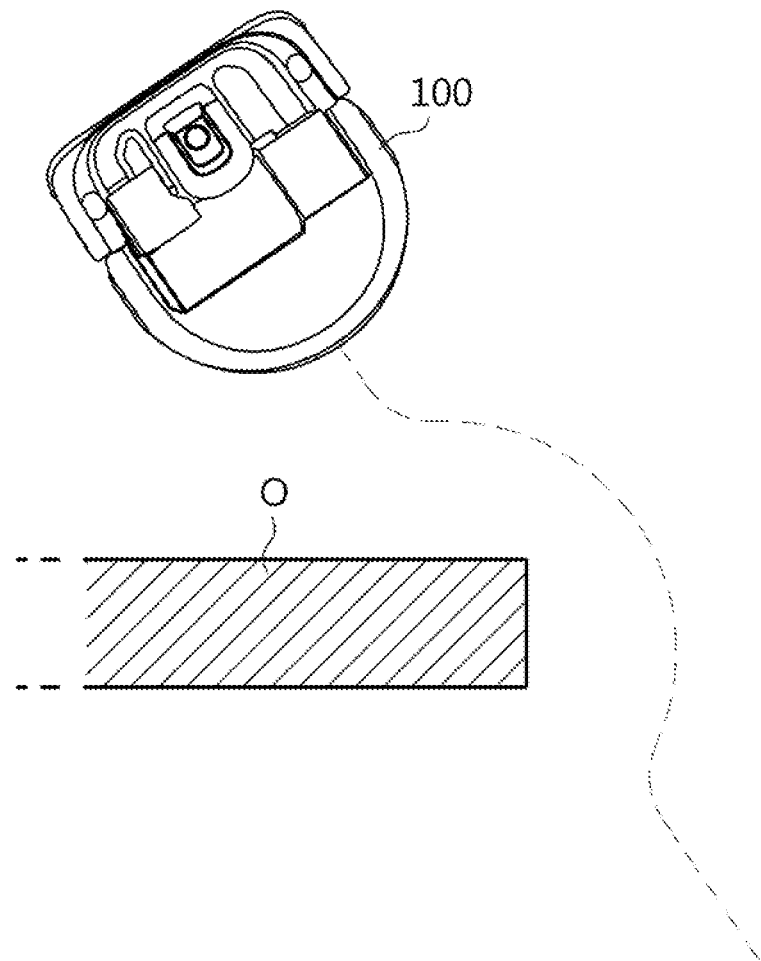
[Fig. 28c]

[Fig. 29]
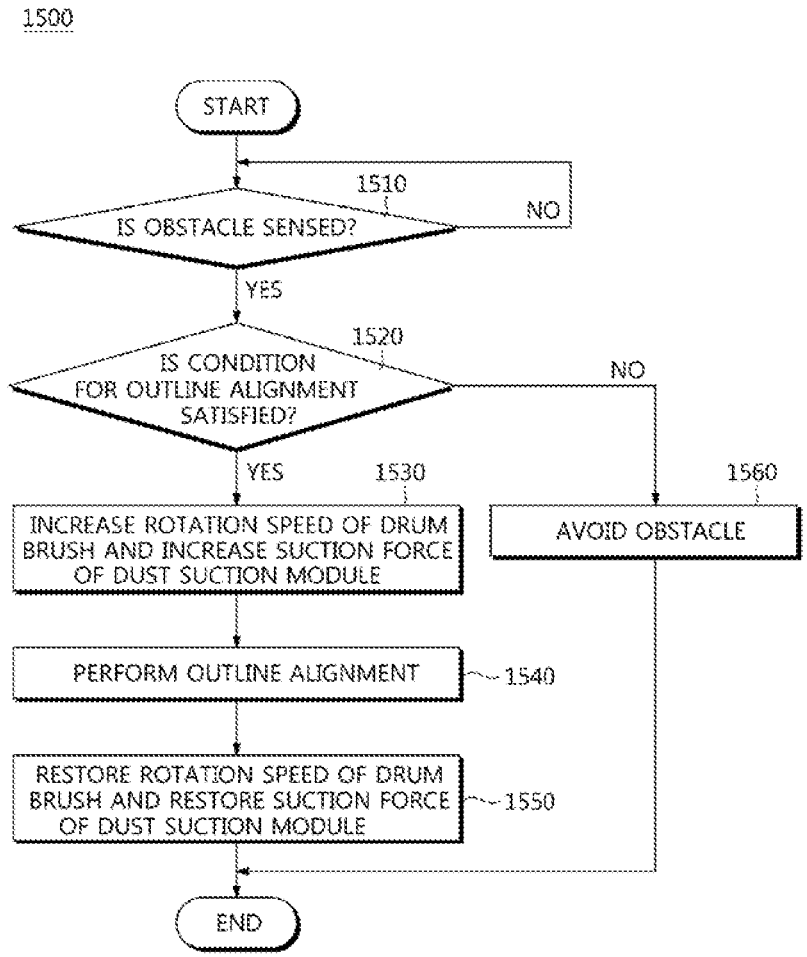
[Fig. 30a]
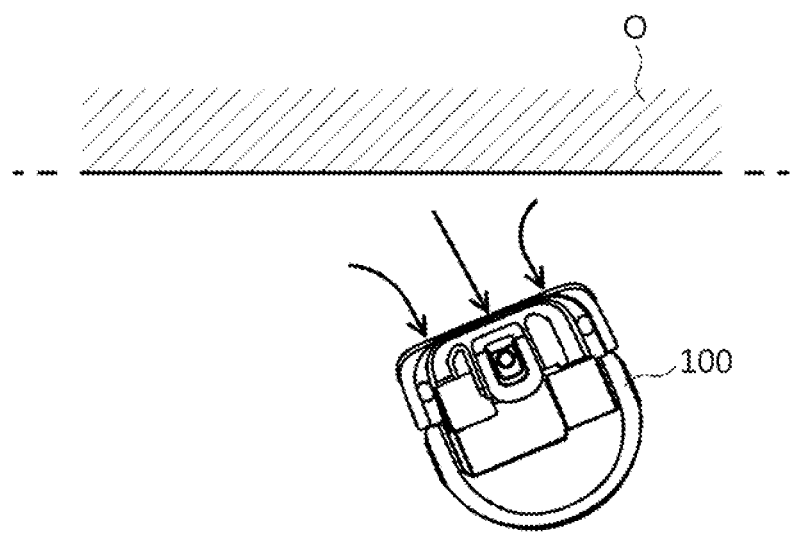

[Fig. 30b]
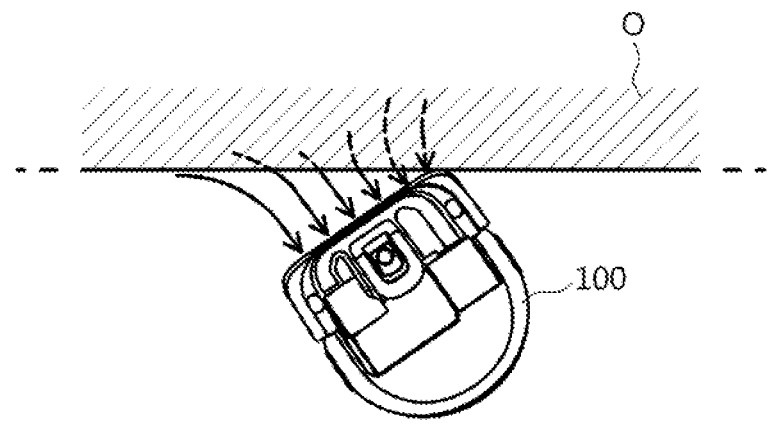
[Fig. 31]
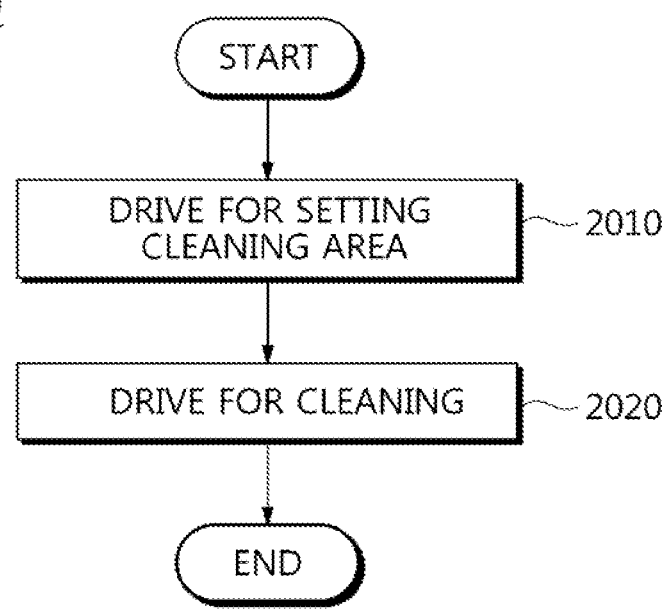

[Fig. 32a]
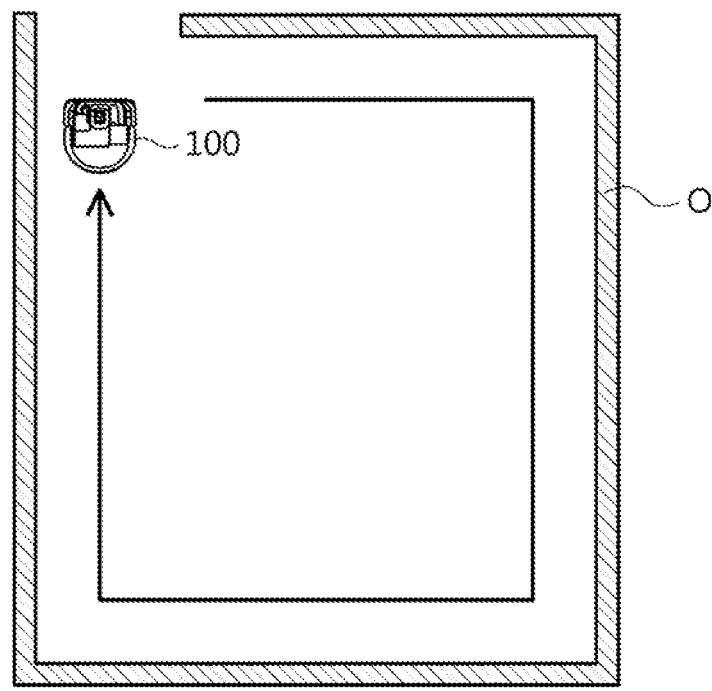
[Fig. 32b]
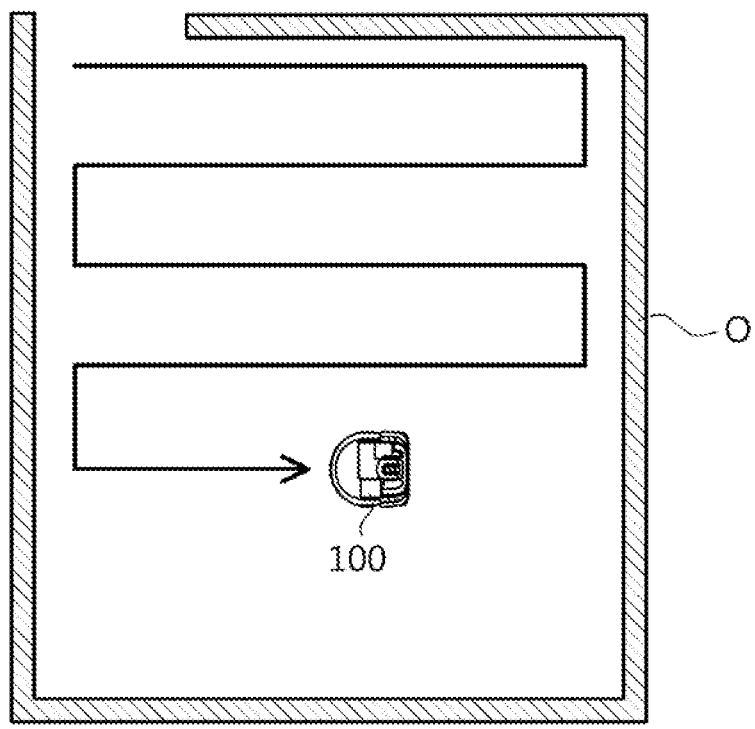

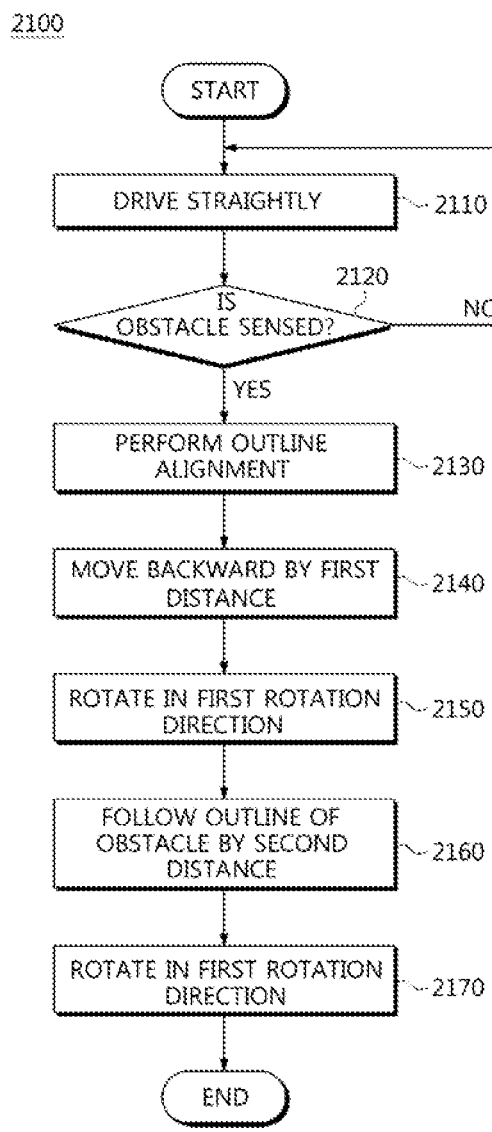
[Fig. 33]

[Fig. 34a]
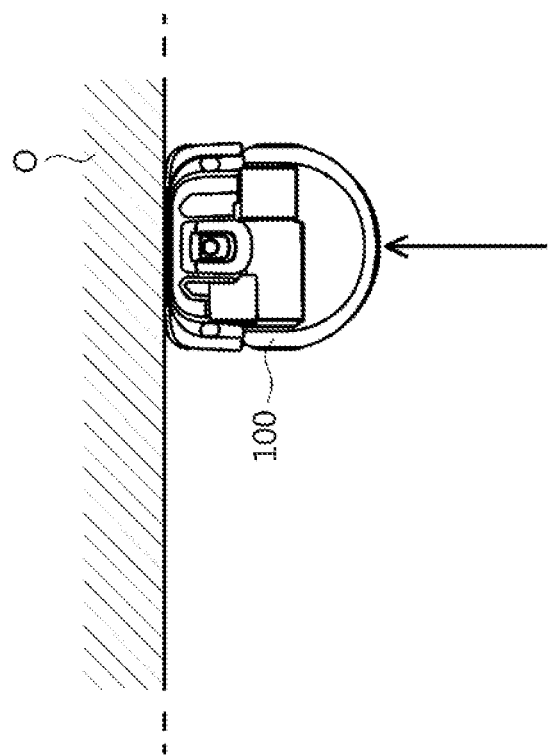

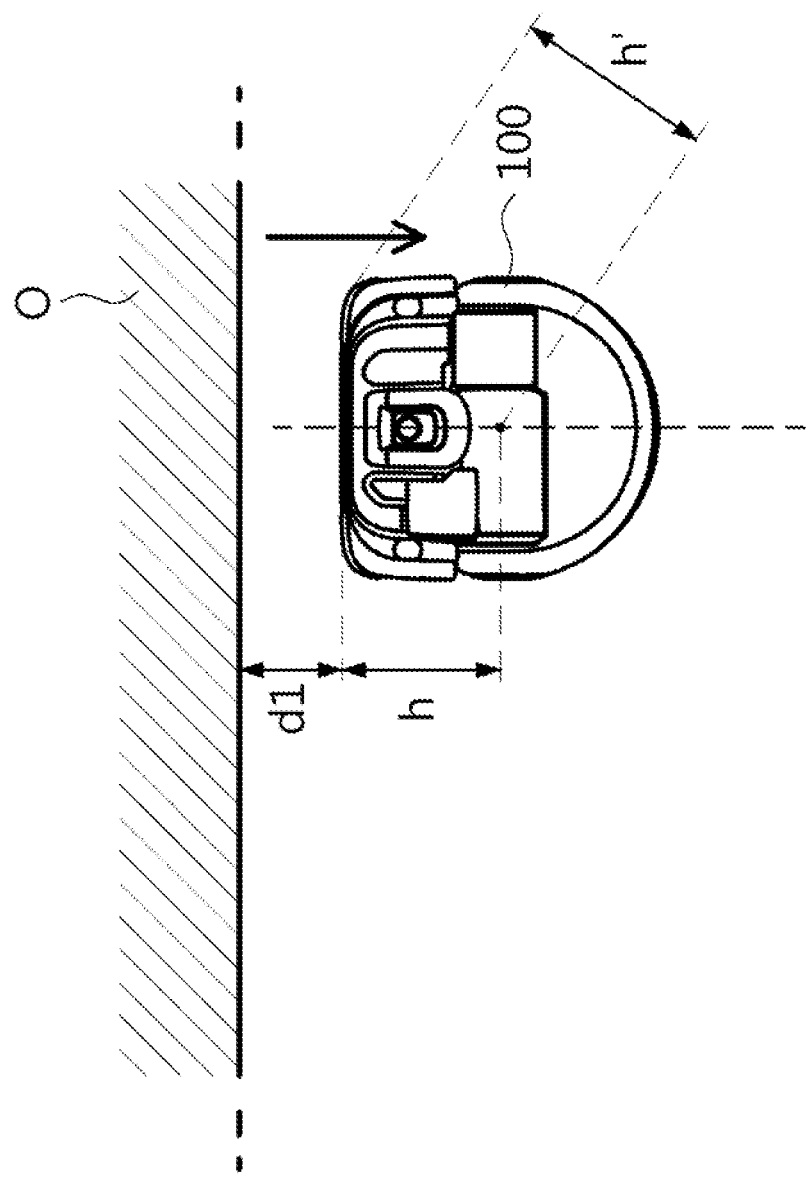
[Fig. 34b]

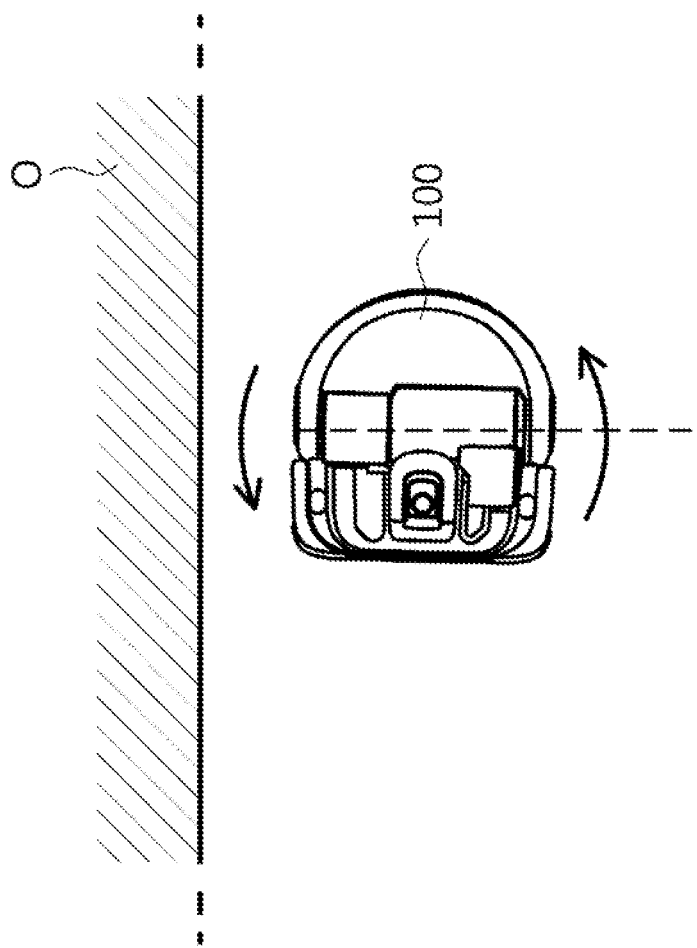
[Fig. 34c]

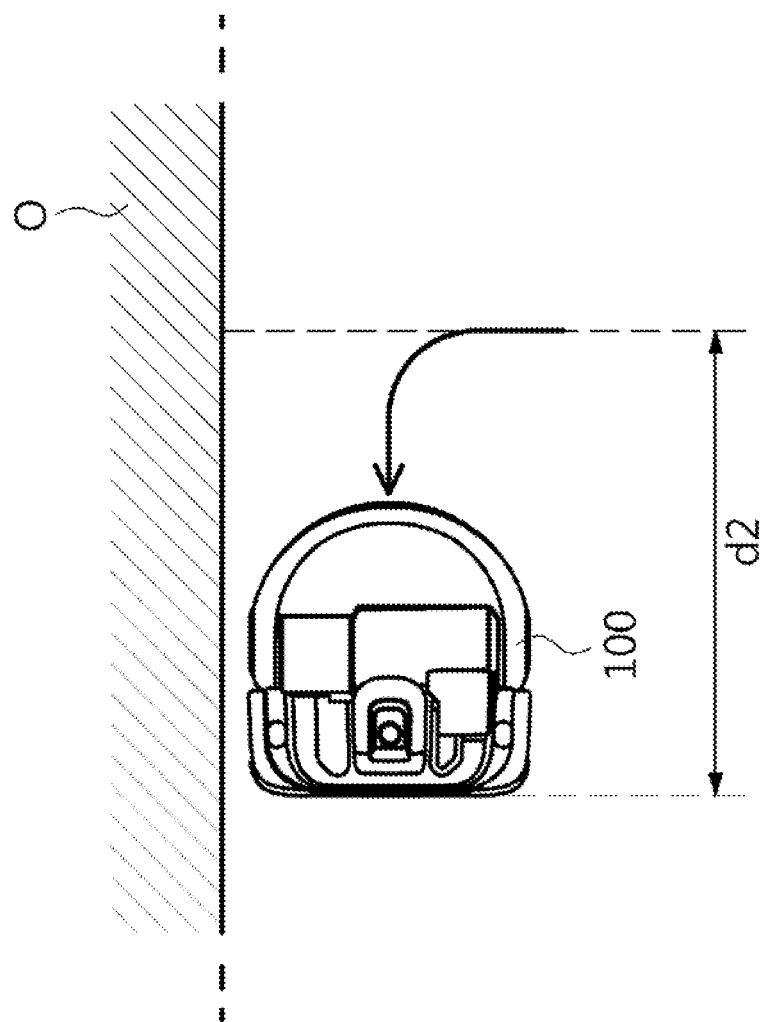
[Fig. 34d]

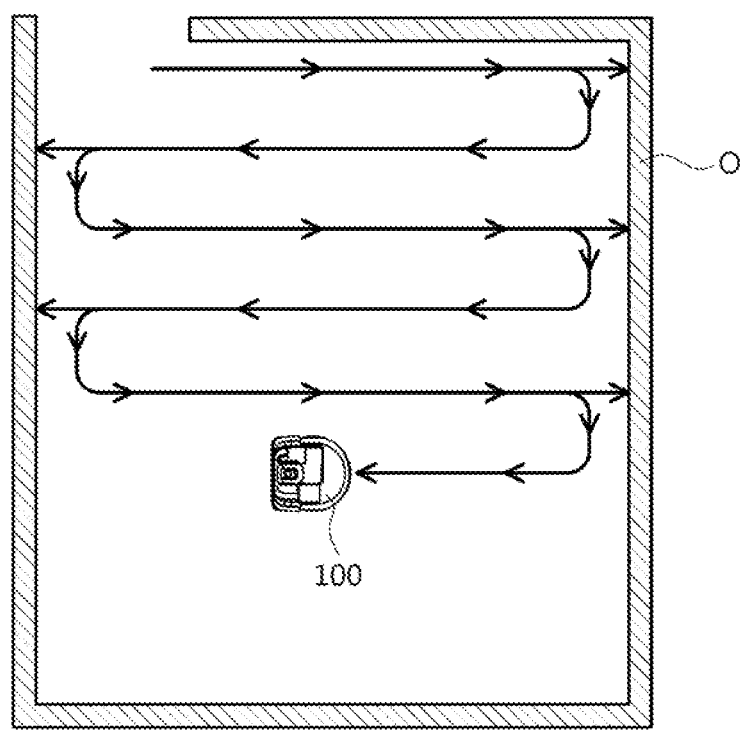
[Fig. 35]

[Fig. 36]
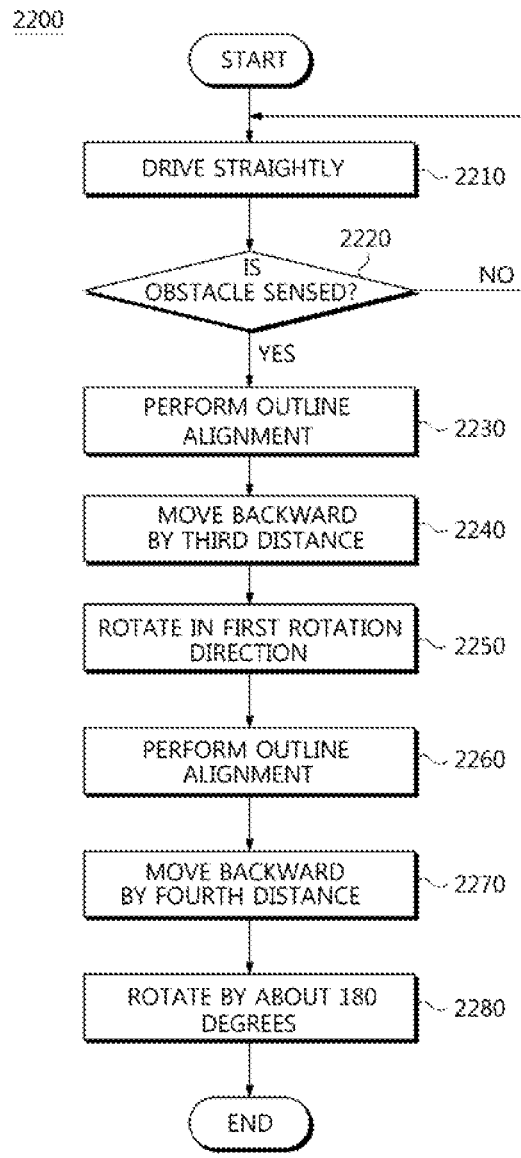

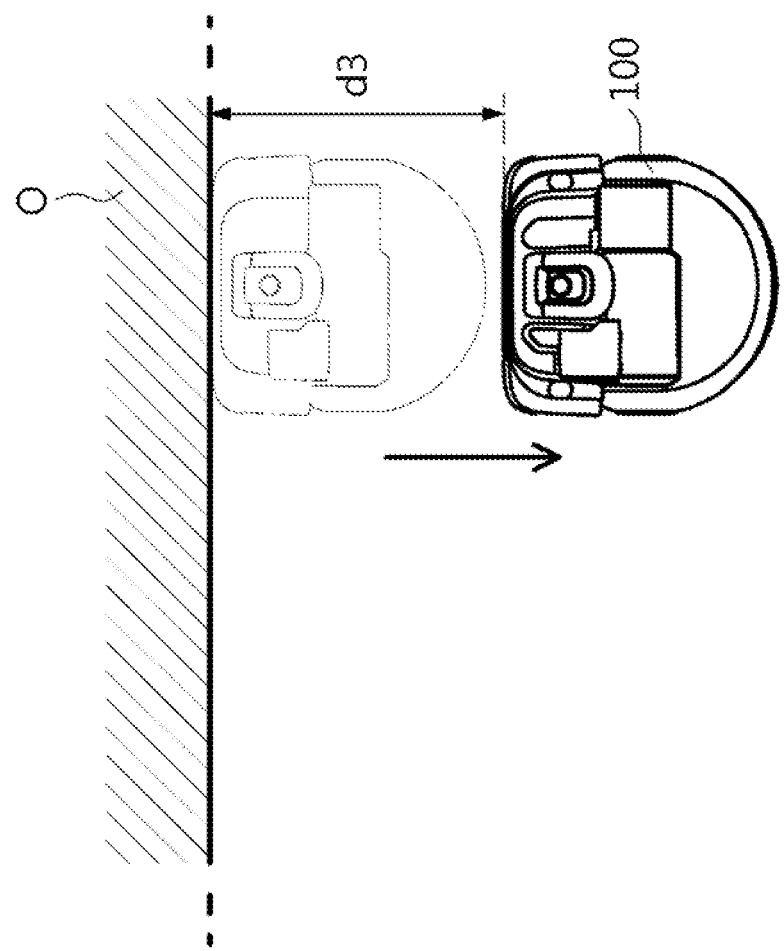
[Fig. 37a]

[Fig. 37b]
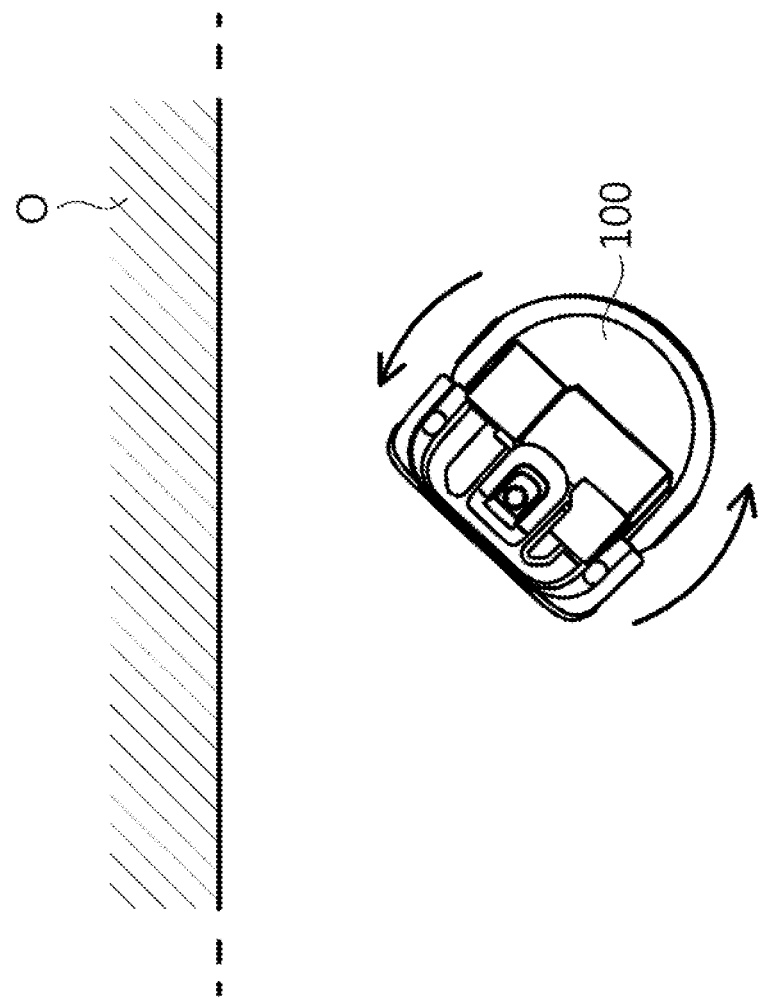

[Fig. 37c]
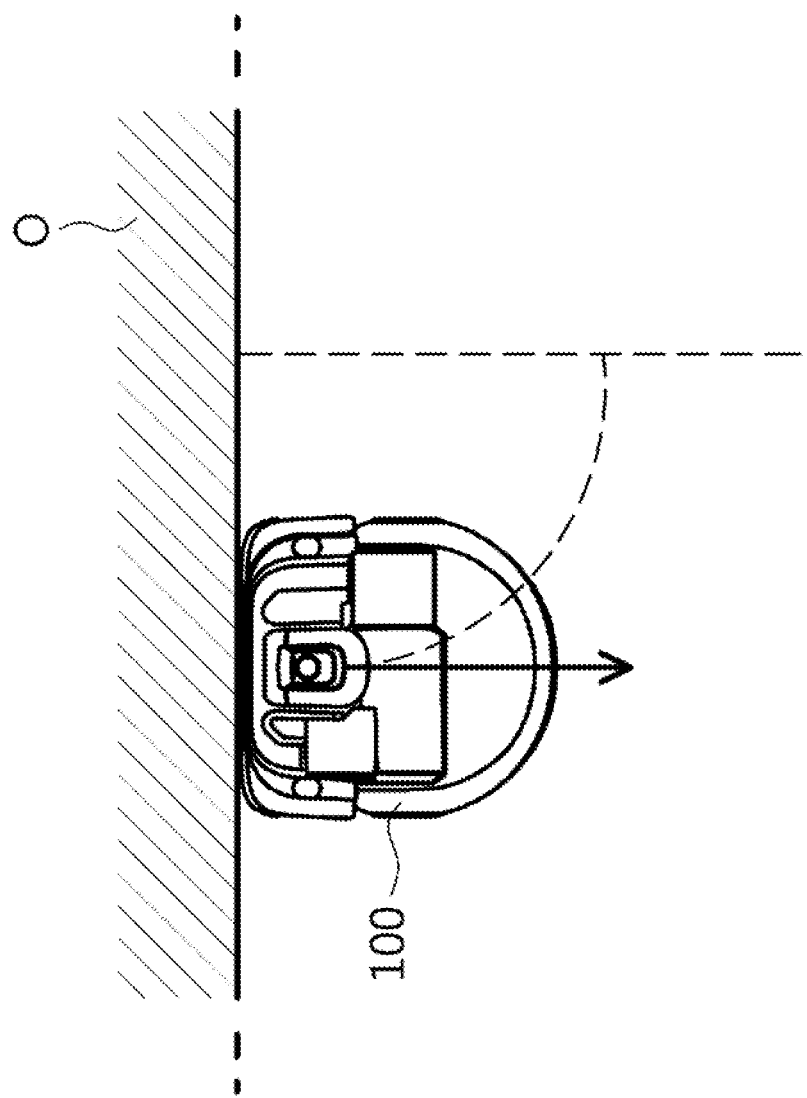

[Fig. 37d]
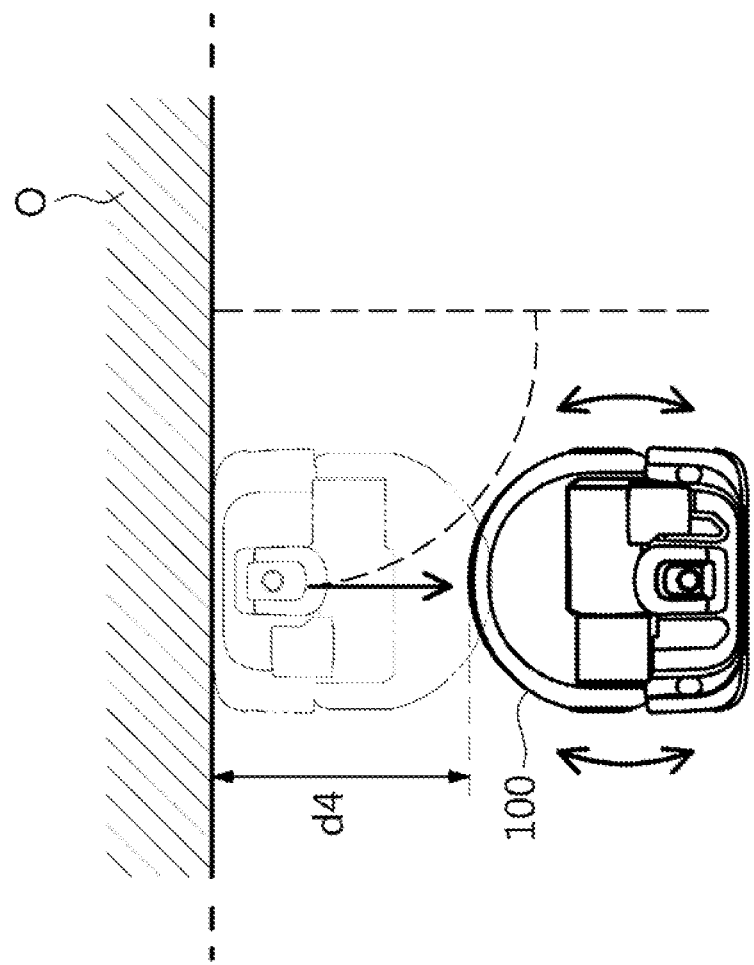

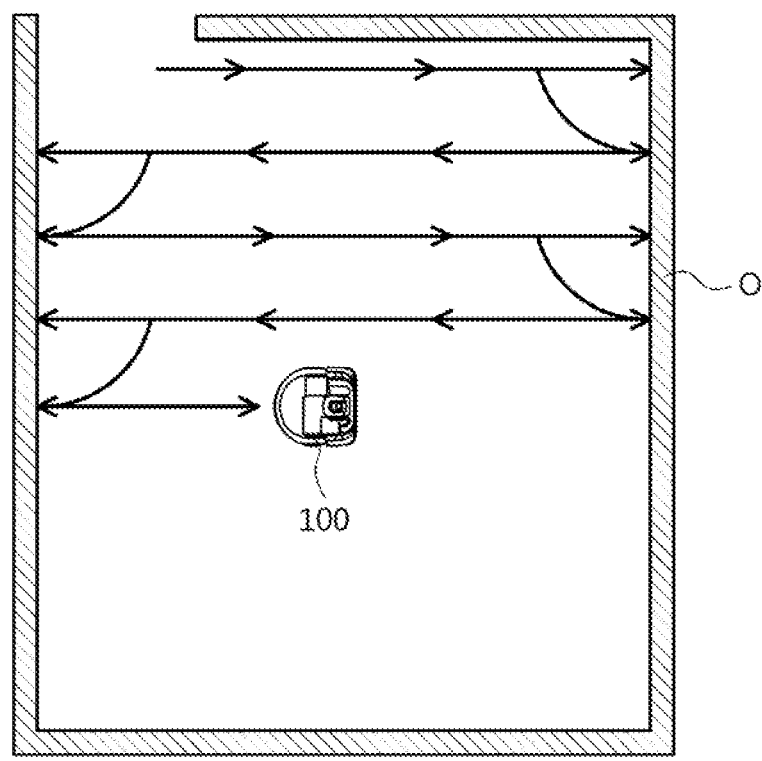
[Fig. 38]

[Fig. 39]
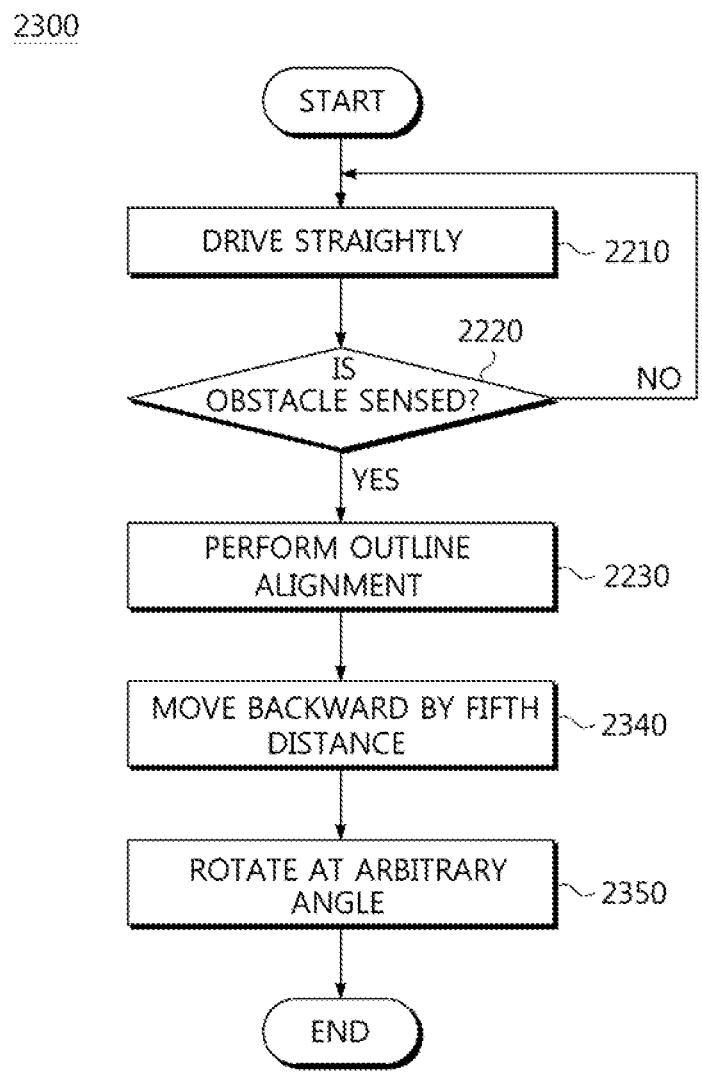

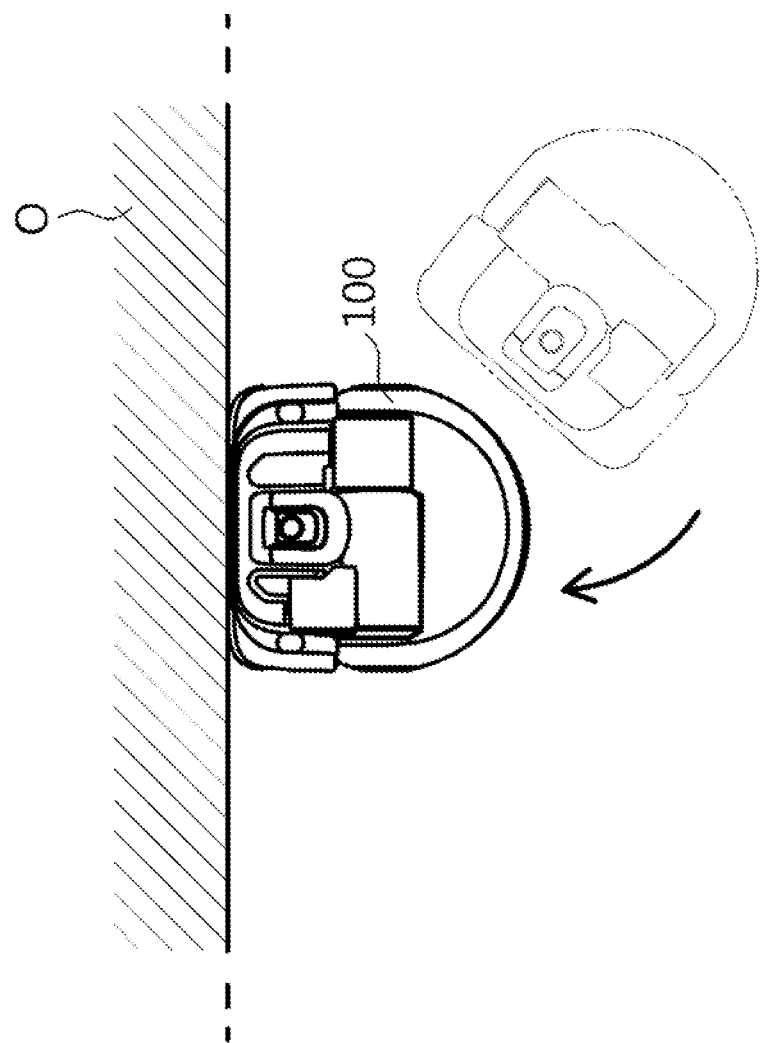
[Fig. 40a]

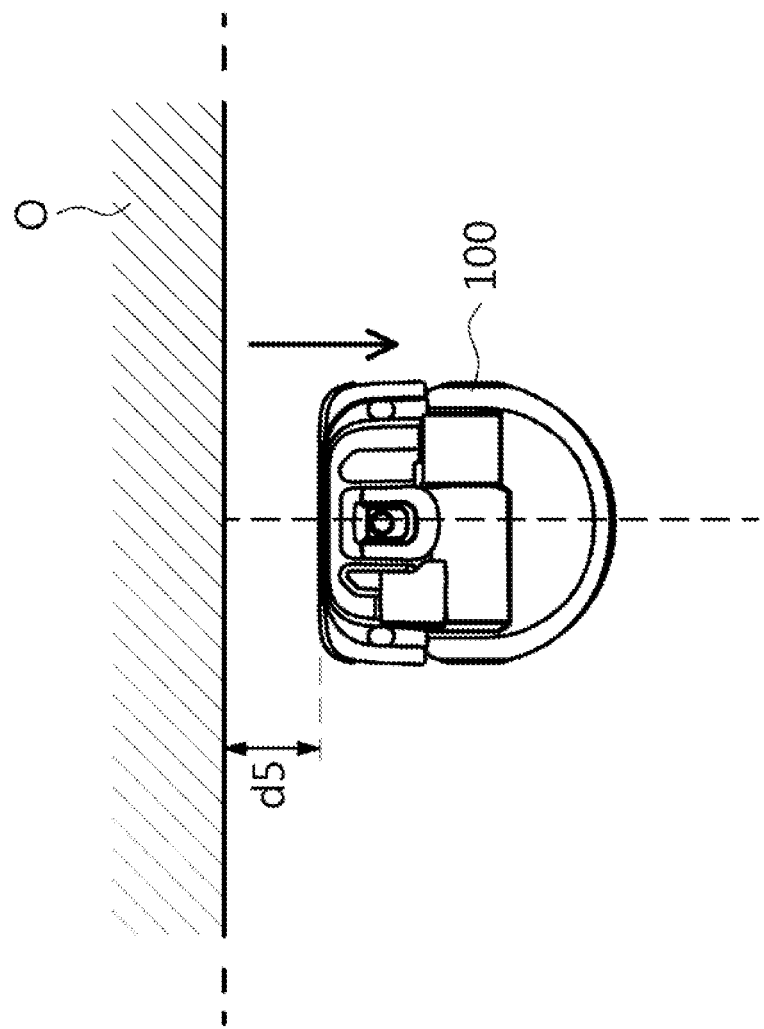
[Fig. 40b]

[Fig. 40c]
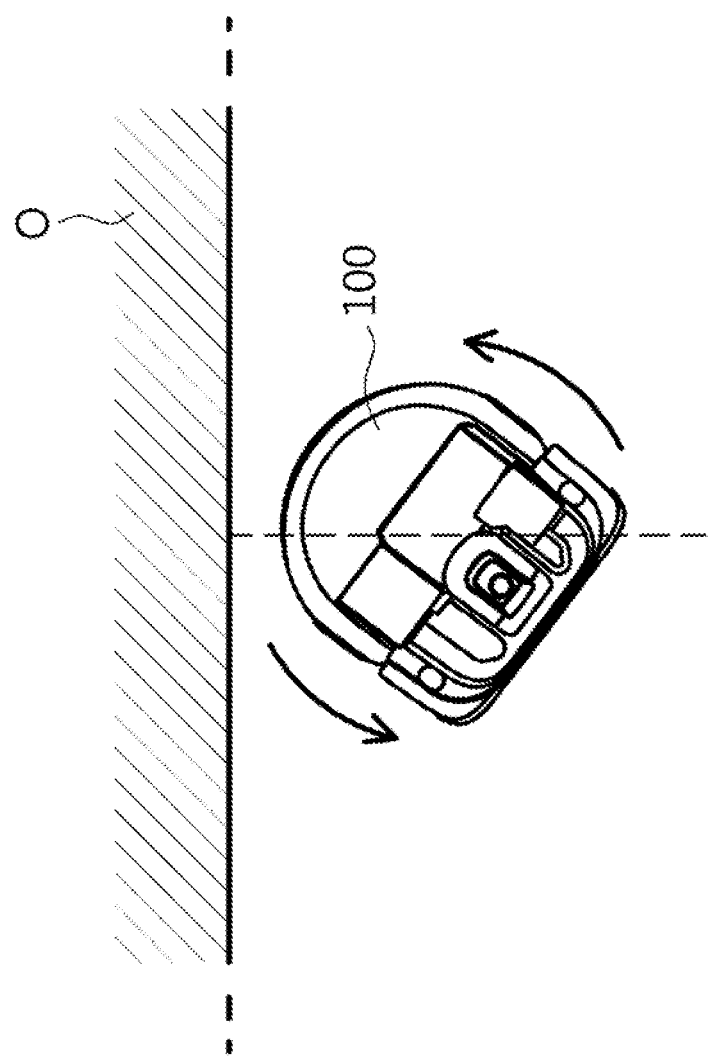

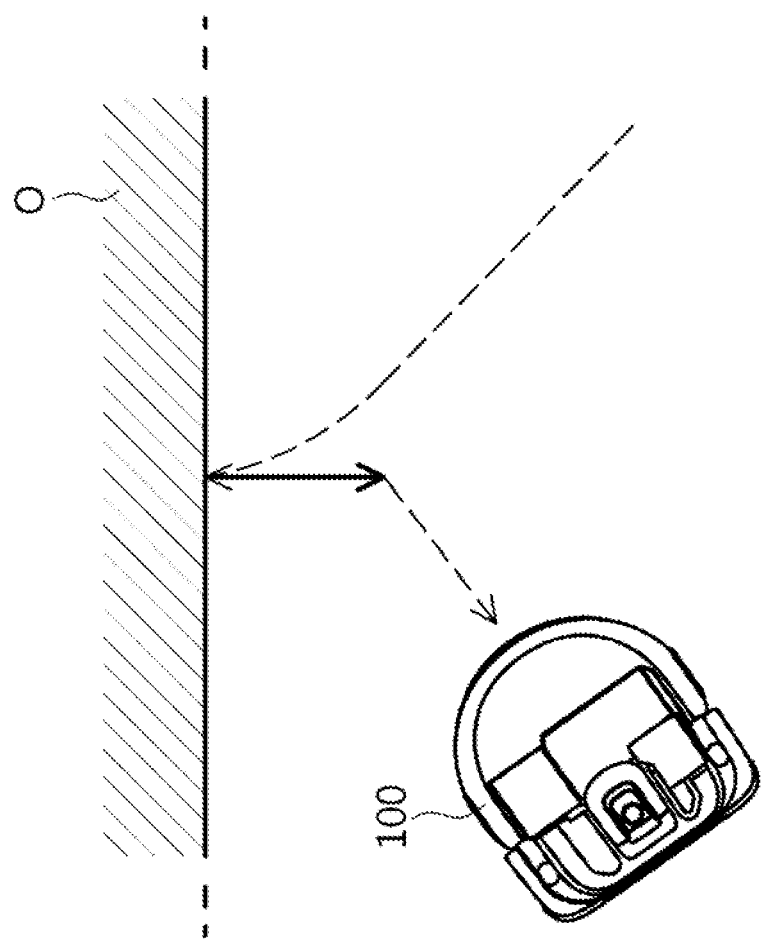
[Fig. 40d]

[Fig. 41]
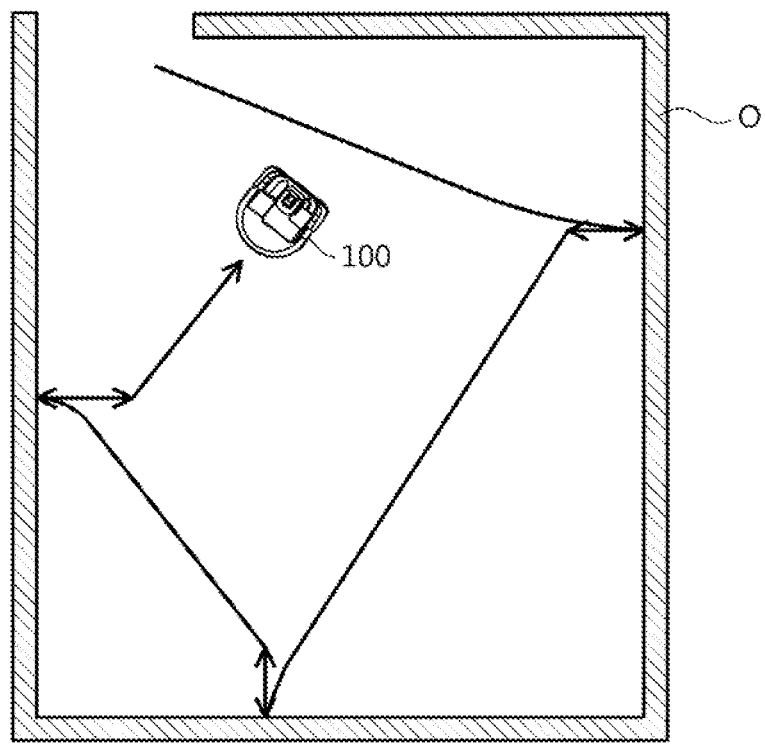
[Fig. 42]
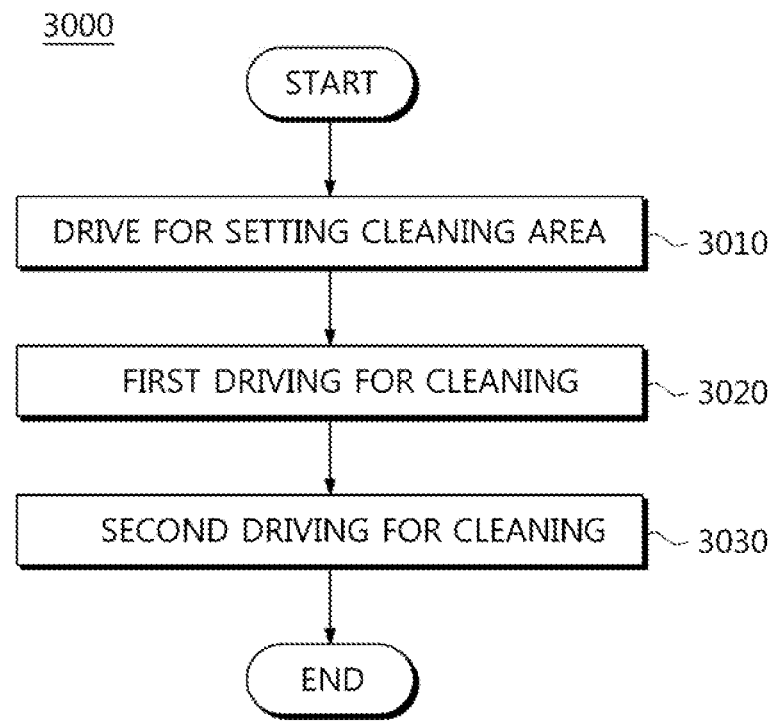

[Fig. 43a]
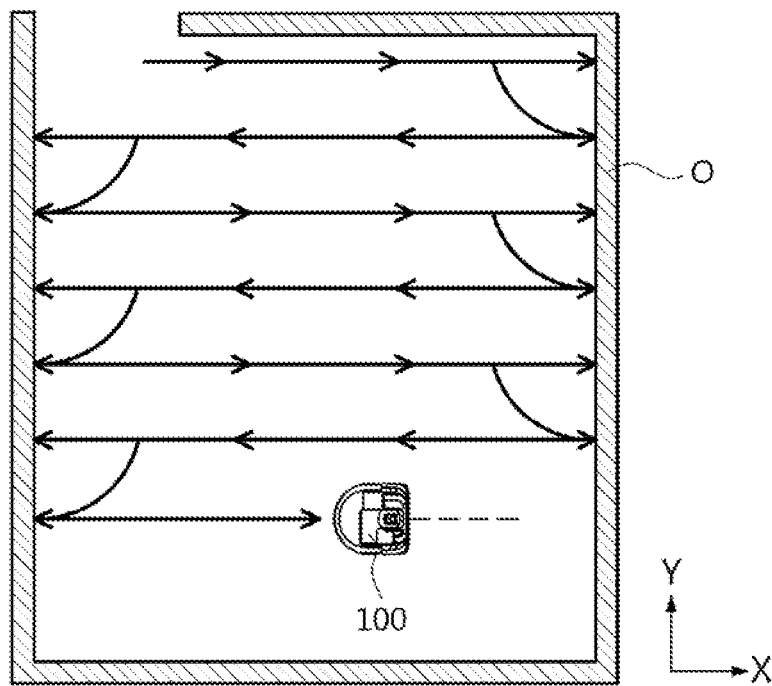
[Fig. 43b]
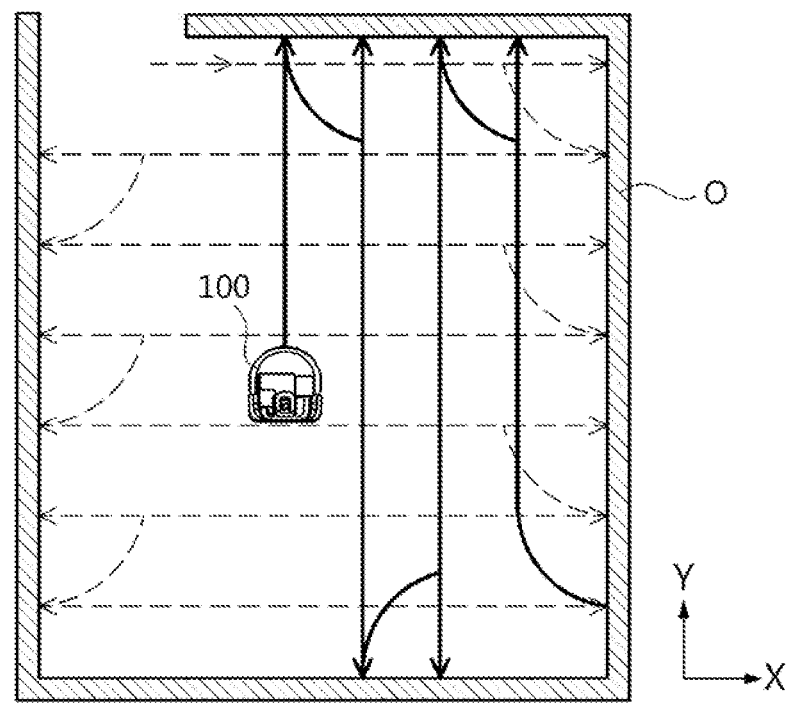

[Fig. 44]
4000
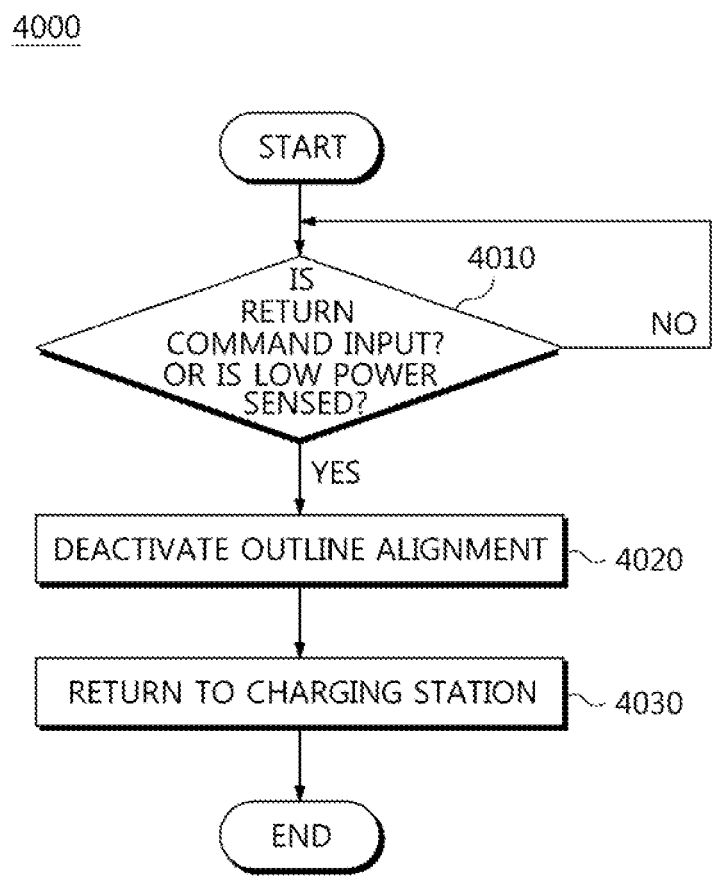

[Fig. 45]
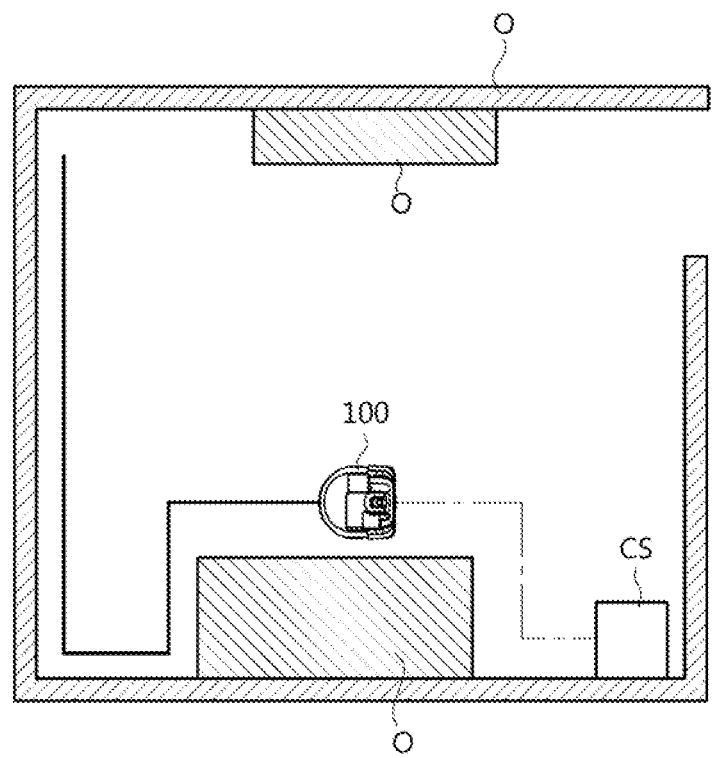

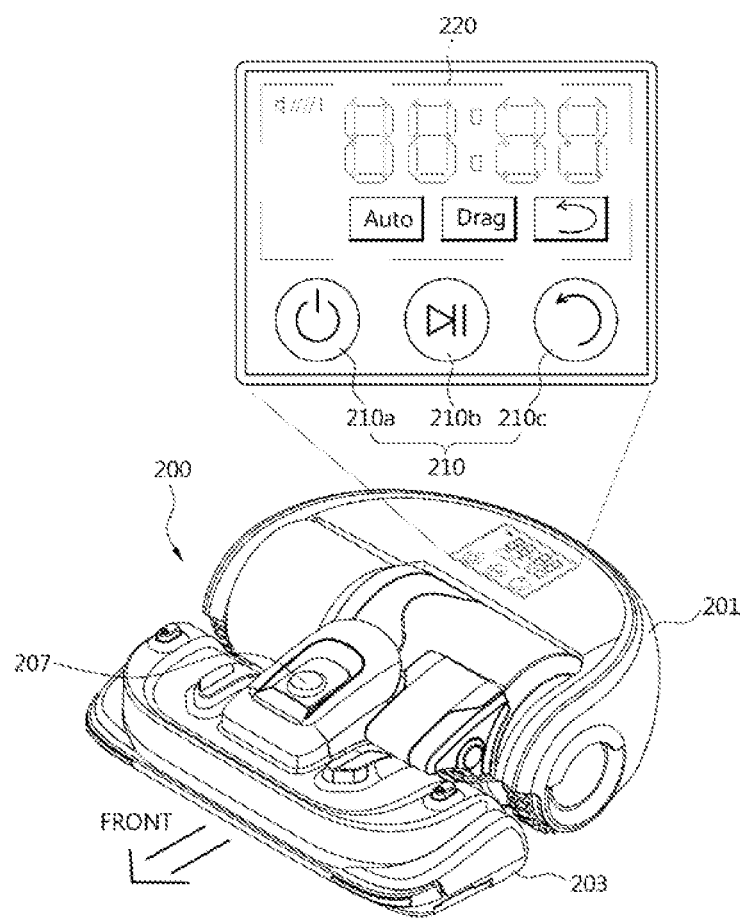
[Fig. 46]

[Fig. 47]
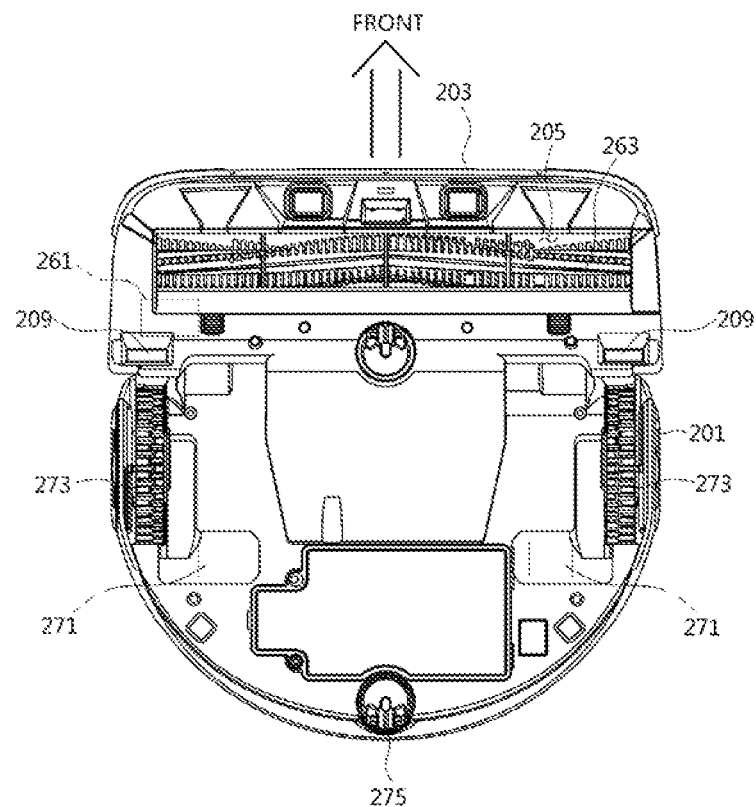
[Fig. 48]
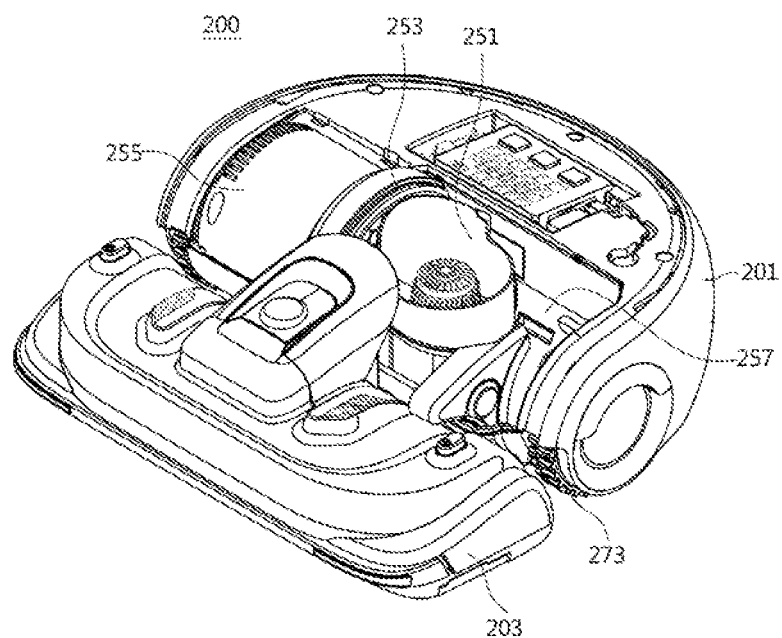

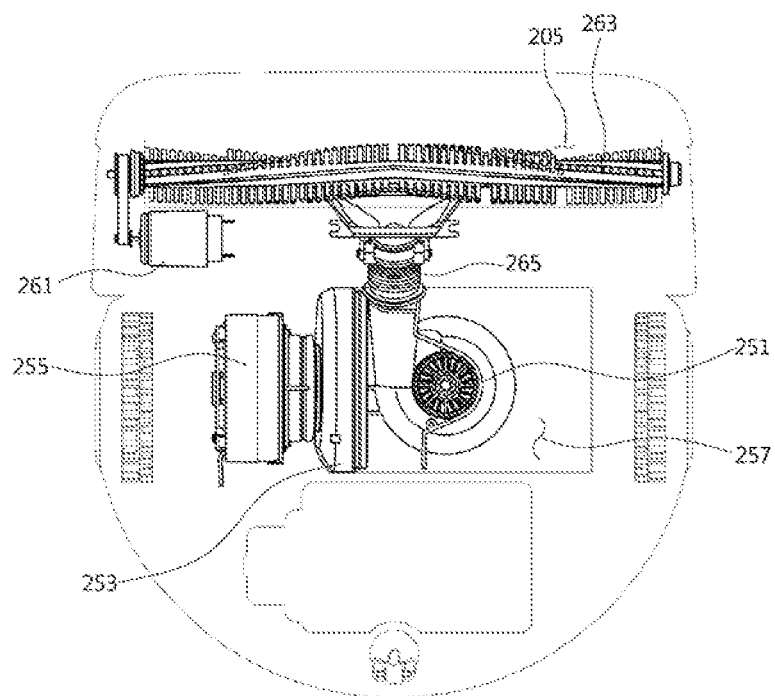
[Fig. 49]

[Fig. 50]
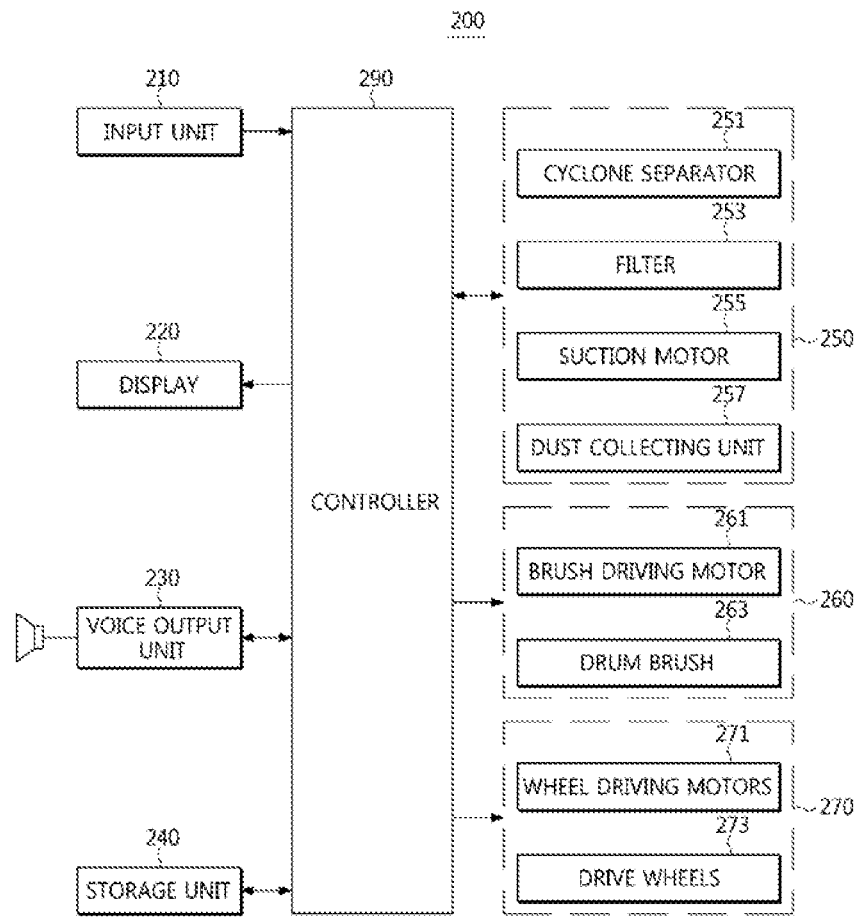
[Fig. 51]
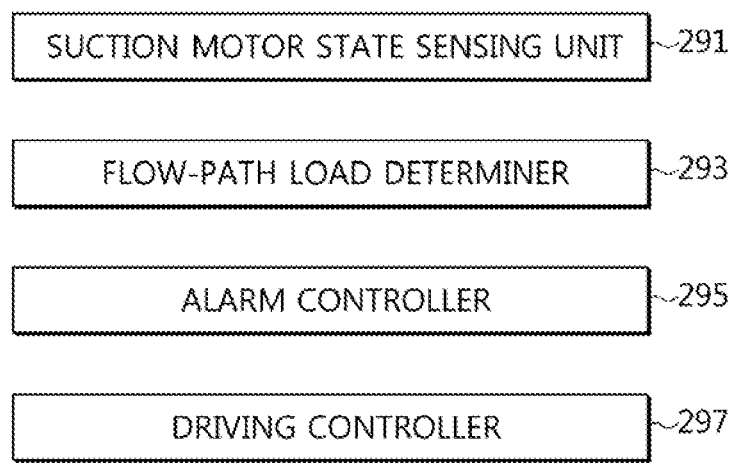

[Fig. 52]
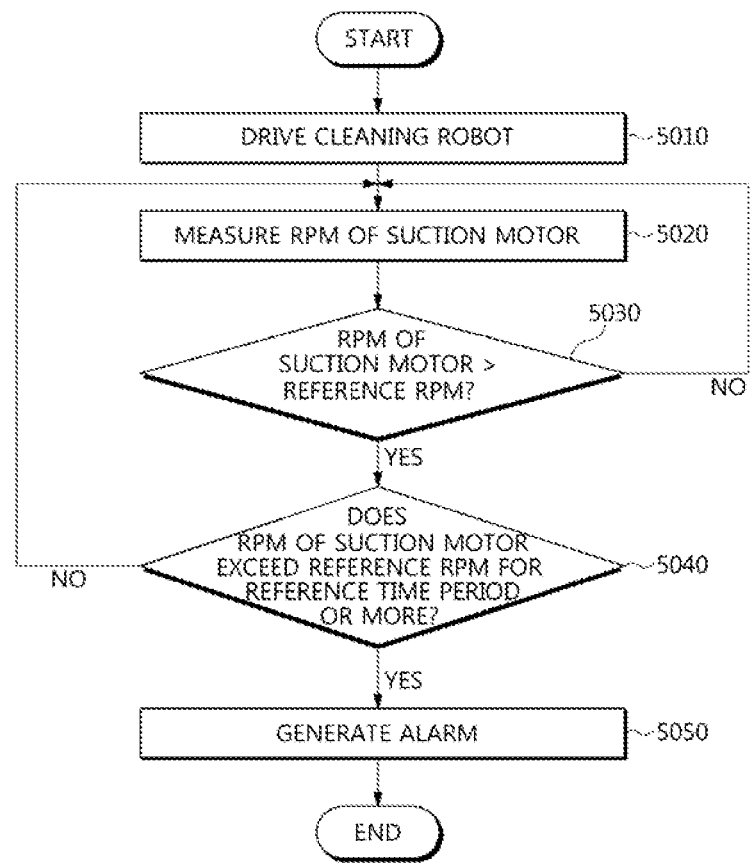

[Fig. 53]
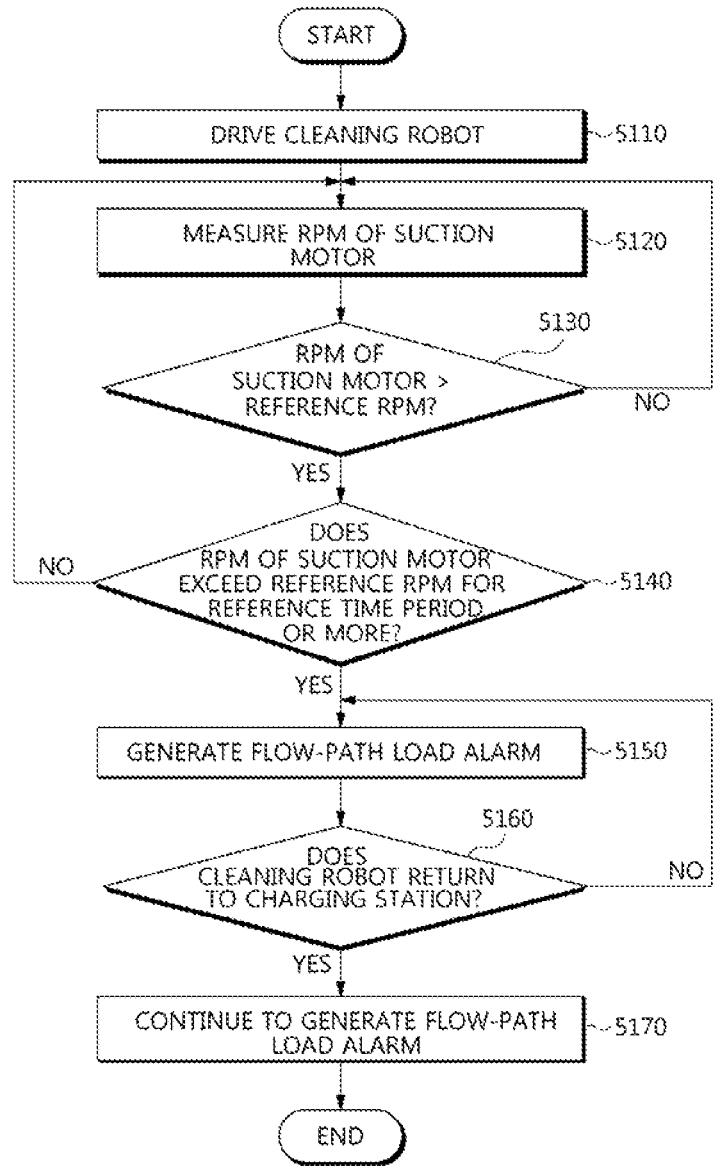

[Fig. 54]
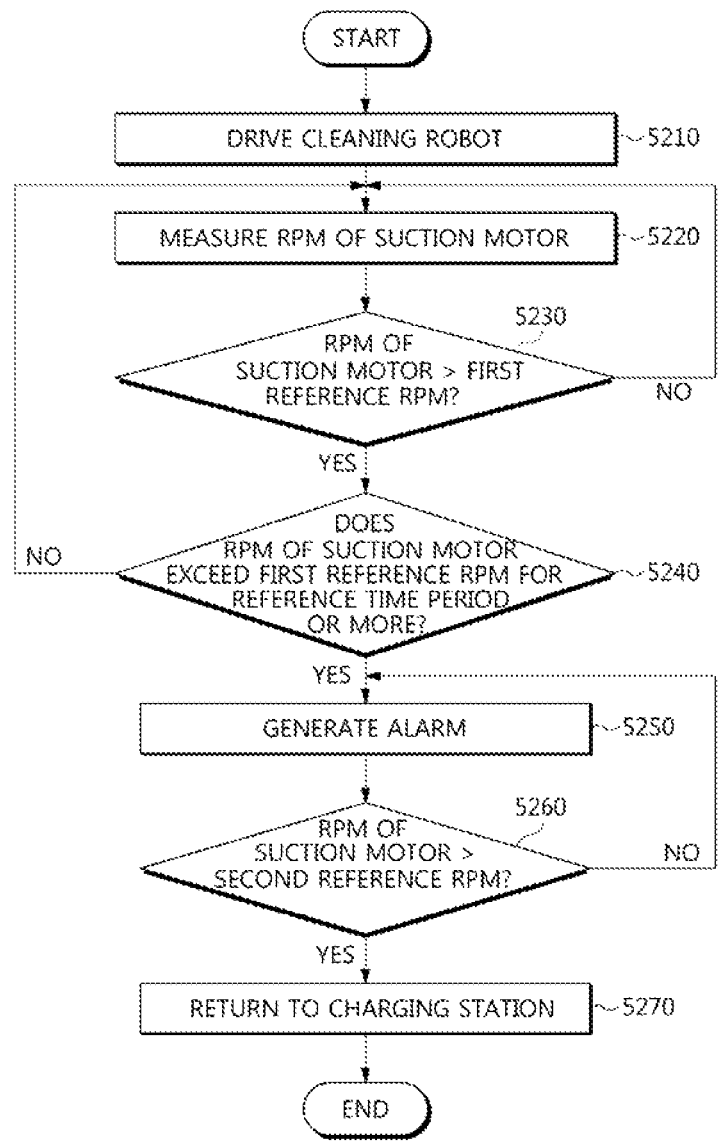

CLEANING ROBOT AND CONTROLLING METHOD THEREOF

CROSS-REFERENCE TO RELATED APPLICATION

This application is a U.S. national stage application, which claims the benefit under 35 USC § 371 of PCT International Patent Application No. PCT/KR2015/005574 filed Jun. 3, 2015 which claims foreign priority benefit under 35 USC § 119 of Korean Patent Application No. 10-2014-0081798, filed on Jul. 1, 2014 and Korean Patent Application No. 10-2014-0081749, filed on Jul. 1, 2014, the entire contents of which are incorporated herein by reference.

TECHNICAL FIELD

The disclosure relates to a cleaning robot and a controlling method thereof, and more particularly, to a cleaning robot of automatically travelling across a floor to remove dust existing on the floor, and a controlling method of the cleaning robot.

BACKGROUND ART

A cleaning robot is equipment to automatically travel across a floor without a user's intervention to suck foreign materials such as dust existing on the floor, thereby automatically cleaning the floor. That is, the cleaning robot travels across a floor to clean the floor.

A cleaning robot according to the related art has a nearly circular main body for easy direction changes. However, due to the nearly circular main body, the cleaning robot could not effectively clean corners or perimeters that the cleaning robot cannot reach.

In order to overcome the problem, a cleaning robot with a side brush protruding from the main body to sweep up dust has been developed.

However, the cleaning robot with the side brush has a problem that the side brush gets tangled with wires, hair, threads, etc. during rotation, which may lead to a failure in the cleaning robot.

Also, the cleaning robot collects dust in a dust collecting unit, and rings an alarm for notifying that the dust collecting unit needs to be emptied if an amount of dust collected in the dust collecting unit reaches a predetermined amount. However, due to various foreign materials including dust sucked into the cleaning robot, clogging may occur in a flow path extending from a dust sucking opening to the dust collecting unit, which applies a load to the cleaning robot.

DISCLOSURE

Technical Problem

An aspect of the present disclosure is to provide a cleaning robot which is capable of minimizing a collision impact with an obstacle.

Another aspect of the present disclosure is to provide a cleaning robot which is capable of effectively cleaning the perimeter of an obstacle on a floor.

Technical Solution

In accordance with an aspect of the present disclosure, there is provided a cleaning robot including: a driving unit configured to move the cleaning robot; an obstacle sensor configured to sense an obstacle; and a controller configured to control, if a distance between the cleaning robot and the obstacle is shorter than or equal to a reference distance when the cleaning robot travels, the driving unit to reduce a driving speed of the cleaning robot so that the cleaning robot contacts the obstacle.

The controller may control the driving unit to reduce the driving speed of the cleaning robot from a first driving speed to a second driving speed.

The controller may control the driving unit to reduce the driving speed of the cleaning robot stepwisely.

The controller may control the driving unit to reduce the driving speed of the cleaning robot gradually.

If a width of the obstacle is wider than or equal to a reference width, the controller may control the driving unit to rotate the cleaning robot on a center of rotation calculated according to the distance to the obstacle.

If the width of the obstacle is narrower than the reference width, the controller may control the driving unit to move the cleaning robot parallel to an outline of the obstacle.

If a degree at which an outline of the obstacle deviates from a straight line is smaller than a reference value, the controller may control the driving unit to rotate the cleaning robot on a center of rotation calculated according to the distance to the obstacle.

If the degree at which the outline of the obstacle deviates from a straight line is greater than or equal to the reference value, the controller may control the driving unit to move the cleaning robot parallel to the outline of the obstacle.

The cleaning robot may further include a contact sensor configured to sense a contact to the obstacle, wherein if a contact to the obstacle is sensed, the controller may control movement of the cleaning robot so that a front outline of the cleaning robot is aligned to an outline of the obstacle.

If a contact to the obstacle is sensed, the controller may control the driving unit to rotate the cleaning robot on a contact part of the cleaning robot contacting the obstacle.

In accordance with another aspect of the present disclosure, there is provided a cleaning robot including: a main body having at least one surface formed to be flat; a driving unit configured to move the main body; a contact sensor configured to sense a contact of the main body to an obstacle; and a controller configured to control, if a contact of the main body to the obstacle is sensed, movement of the main body so that the flat surface of the main body is aligned to an outline of the obstacle.

If a contact of the main body to the obstacle is sensed, the controller may control the driving unit to rotate the cleaning robot on a contact part of the cleaning robot contacting the obstacle.

If the flat surface of the main body is aligned to the outline of the obstacle, the controller may control the driving unit to move the cleaning robot backwards and forwards several times.

The cleaning robot may further include an obstacle sensor configured to sense the obstacle without contacting the obstacle, wherein if a condition for outline alignment is satisfied, the controller may control movement of the cleaning robot so that the flat surface of the main body is aligned to the outline of the obstacle.

The controller may control the driving unit to rotate the main body on a center of rotation calculated according to a distance to the obstacle.

If a width of the obstacle is wider than or equal to a reference width, the controller may control movement of the cleaning robot so that the flat surface of the main body is aligned to the outline of the obstacle.

If a degree at which the outline of the obstacle deviates from a straight line is smaller than a reference value, the controller may control movement of the cleaning robot so that the flat surface of the main body is aligned to the outline of the obstacle.

The cleaning robot may further include a cleaning unit configured to suck dust existing on a floor, wherein a condition for outline alignment is satisfied, the controller increases a suction force of the cleaning unit.

The contact sensor may include: a bumper disposed in front of the main body, and contacting the obstacle; a bumper switch configured to output a contact sensed signal if the bumper contacts the obstacle; and an external force transferring member configured to transfer an external force applied from the obstacle to the bumper to the bumper switch.

If the bumper contacts the obstacle, the bumper may press the external force transferring member.

If the external force transferring member is pressed by the bumper, the external force transferring member may rotate on a center of rotation to press the bumper switch.

If the bumper switch is pressed by the external force transferring member, the bumper switch may output the contact sensed signal.

The bumper switch may be inclined at 30 to 60 degrees with respect to a front direction of the cleaning robot.

In accordance with another aspect of the present disclosure, there is provided a cleaning robot including: a main body having at least one surface formed to be flat; a driving unit configured to move the main body; a sensing unit configured to sense an obstacle; and a controller configured to control, if the obstacle is sensed, movement of the main body so that the flat surface of the main body contacts the obstacle.

If the obstacle is sensed, the controller may control the driving unit to rotate the cleaning robot on a center of rotation calculated based on a distance to the obstacle and a direction in which the obstacle exists.

The cleaning robot may further include a contact sensor configured to sense a contact of the main body to the obstacle, wherein if a contact of a part of the main body to the obstacle is sensed, the controller may control the driving unit to rotate the main body on the part of the main body contacting the obstacle.

The contact sensor may include: a bumper disposed in front of the cleaning robot, and contacting the obstacle; a bumper switch configured to output, if the bumper contacts the obstacle, a contact sensed signal; and an external force transferring member configured to transfer an external force applied from the obstacle to the bumper to the bumper switch.

In accordance with another aspect of the present disclosure, there is provided a control method of a cleaning robot including: driving the cleaning robot; reducing a driving speed of the cleaning robot so that the cleaning robot contacts an obstacle, if a distance between the cleaning robot and the obstacle is shorter than or equal to a reference distance; and if a contact of the cleaning robot to the obstacle is sensed, moving the cleaning robot so that a front outline of the cleaning robot is aligned to an outline of the obstacle.

The reducing of the driving speed of the cleaning robot may include reducing the driving speed of the cleaning robot from a first driving speed to a second driving speed.

The reducing of the driving speed of the cleaning robot may include reducing the driving speed of the cleaning robot stepwisely.

The control method may further include moving the cleaning robot parallel to the outline of the obstacle if an outline of the cleaning robot is aligned to the outline of the obstacle.

The control method may further include moving the cleaning robot so that an outline of the cleaning robot is aligned to a first outline of the obstacle, and then the outline of the cleaning robot is aligned to a second outline of the obstacle.

The control method may further include: if a return command is input from a user, or if low power of a battery is sensed, returning the cleaning robot to a charging station; and deactivating operation of aligning the front outline of the cleaning robot to the outline of the obstacle, when the cleaning robot returns to the charging station.

In accordance with another aspect of the present disclosure, there is provided a cleaning robot including: a drum brush configured to scatter dust existing on a floor; a suction motor configured to generate a suction force to collect the scattered dust in a dust collecting unit through a dust suction opening; and a controller configured to determine, if a revolutions per minutes (RPM) of the suction motor acquired from the suction motor exceeds a reference RPM for a predetermined time period, that a load is generated at a part of a flow-path from the dust suction opening to the dust collecting unit, and to generate a flow-path load alarm.

The cleaning robot may include a cyclone separator configured to separate dust from air entered through the dust suction opening; and a filter configured to filter out dust from the air separated by the cyclone separator.

The suction motor may be a Brushless Direct Current (BLDC) motor.

The controller may include a suction motor state sensing unit configured to sense the RPM of the suction motor; and a flow-path load determiner configured to compare the RPM of the suction motor to a reference RPM to determine whether the RPM of the suction motor exceeds the reference RPM, to determine, if the RPM of the suction motor exceeds the reference RPM, whether the RPM of the suction motor exceeds the reference RPM for a reference time period or more, and to determine, if the RPM of the suction motor exceeds the reference RPM for the reference time period or more, that a load is generated at a part of the flow-path from the dust suction opening to the dust collecting unit.

The cleaning robot may further include: a display unit configured to display information related to operation that is performed on the cleaning robot, in the form of text; and a voice output unit configured to output information related to operation that is performed on the cleaning robot, in the form of voice.

The controller may include an alarm controller configured to display a flow-path load state in the form of text through the display unit, or to output a flow-path load state in the form of voice through the voice output unit.

The alarm controller may continue to generate the flow-path load alarm for a predetermined time period, when the cleaning robot returns to a charging station.

The alarm controller may continue to generate the flow-path load alarm until a signal requesting turning-off of the flow-path load alarm is received, when the cleaning robot returns to the charging station.

The controller may include a driving controller configured to control driving of the cleaning robot.

The cleaning robot may include a brush driving motor configured to rotate the drum brush.

In accordance with another aspect of the present disclosure, there is provided a control method of a cleaning robot including: measuring a revolutions per minutes (RPM) of a suction motor if the cleaning robot is driven; comparing the RPM of the suction motor to a reference RPM; determining, if the RPM of the suction motor exceeds the reference RPM, whether the RPM of the suction motor exceeds the reference RPM for a reference time period or more; determining, if the RPM of the suction motor exceeds the reference RPM for the reference time period or more, that a load is generated at a part of a flow-path from the dust suction opening to the dust collecting unit; and generating a flow-path load alarm.

The suction motor may be a BLDC motor.

The generating of the flow-path load alarm may include generating the flow-path load alarm in the form of text or voice.

When the cleaning robot returns to the charging station, the cleaning robot may continue to generate the flow-path load alarm for a predetermined time period.

When the cleaning robot returns to the charging station, the cleaning robot may continue to generate the flow-path load alarm until a signal requesting turning-off of the flow-path load alarm is received.

The control method may further include: after the generating of the flow-path load alarm, comparing the RPM of the suction motor to a second reference RPM; and if the RPM of the suction motor exceeds the second reference RPM, returning the cleaning robot to the charging station.

Advantageous Effects

According to one aspect of the present disclosure, the cleaning robot may reduce a driving speed before colliding with an obstacle to minimize a collision impact with the obstacle.

According to another aspect of the present disclosure, by aligning the front outline of the cleaning robot to the outline of an obstacle, it is possible to effectively clean an edge of a floor.

According to still another aspect of the present disclosure, since a flow-path load is sensed by measuring a RPM of a suction motor, it is possible to accurately sense a load of the flow-path rather than when a user determines through his/her naked eyes that the filter or the flow-path should be cleaned, resulting in maintaining a dust suction force of the cleaning robot at an appropriate level.

BRIEF DESCRIPTION OF THE DRAWINGS

FIG. 1 is a block diagram briefly showing a control configuration of a cleaning robot according to an embodiment of the present disclosure;

FIG. 2 including FIGS. 2A, 2B and 2C is a view for describing operations of a cleaning robot according to an embodiment of the present disclosure;

FIG. 3 is a block diagram showing a control configuration of a cleaning robot according to an embodiment of the present disclosure;

FIG. 4 shows an external appearance of a cleaning robot according to an embodiment of the present disclosure;

FIG. 5 shows a bottom of a cleaning robot according to an embodiment of the present disclosure;

FIG. 6 shows the inside of a main body of a cleaning robot according to an embodiment of the present disclosure;

FIG. 7 shows an example of an obstacle sensor included in a cleaning robot according to an embodiment of the present disclosure;

FIG. 8 shows the obstacle sensor included in the cleaning robot of FIG. 7 when the obstacle sensor emits light;

FIG. 9 shows an example in which the obstacle sensor included in the cleaning robot of FIG. 7 receives light reflected from an obstacle;

FIG. 10 shows another example of an obstacle sensor included in a cleaning robot according to an embodiment of the present disclosure;

FIG. 11 shows an example of a contact sensor included in a cleaning robot according to an embodiment of the present disclosure;

FIG. 12 shows a case in which the entire of a bumper included in a cleaning robot according to an embodiment of the present disclosure contacts an obstacle;

FIG. 13 shows a case in which the front left part of the bumper included in the cleaning robot of FIG. 12 contacts an obstacle;

FIG. 14 shows a case in which the left, side part of the bumper included in the cleaning robot of FIG. 12 contacts an obstacle;

FIG. 15 is a flowchart illustrating an example of an outline alignment method of a cleaning robot according to an embodiment of the present disclosure;

FIG. 16 including FIGS. 16A and 16B shows a cleaning robot that performs the outline alignment method illustrated in FIG. 15;

FIG. 17 is a flowchart illustrating another example of an outline alignment method of a cleaning robot according to an embodiment of the present disclosure;

FIG. 18 including FIGS. 18A, 18B and 18C shows a cleaning robot that performs the outline alignment method illustrated in FIG. 17;

FIG. 19 is a flowchart illustrating still another example of an outline alignment method of a cleaning robot according to an embodiment of the present disclosure;

FIG. 20 including FIGS. 20A and 20B shows a cleaning robot that calculates a radius of rotation according to the outline alignment method illustrated in FIG. 19;

FIG. 21 including FIGS. 21A and 21B shows a cleaning robot that calculates a radius of rotation according to the outline alignment method illustrated in FIG. 19;

FIG. 22 is a flowchart illustrating an example of a method in which a cleaning robot according to an embodiment of the present disclosure determines whether to perform outline alignment;

FIG. 23 including FIGS. 23A and 23B shows a cleaning robot that performs outline alignment according to the method illustrated in FIG. 22;

FIG. 24 including FIGS. 24A and 24B shows a cleaning robot that does not perform outline alignment according to the method illustrated in FIG. 22;

FIG. 25 is a flowchart illustrating another example of a method in which a cleaning robot according to an embodiment of the present disclosure determines whether to perform outline alignment;

FIG. 26 including FIGS. 26A, 26B and 26C shows a cleaning robot that performs outline alignment according to the method illustrated in FIG. 25;

FIG. 27 including FIGS. 27A, 27B, 27C and 28 including FIGS. 28A, 28B and 28C show a cleaning robot that does not perform outline alignment according to the method illustrated in FIG. 25;

FIG. 29 is a flowchart illustrating an example of a method in which a cleaning robot according to an embodiment of the present disclosure cleans the perimeter of an obstacle intensively while performing outline alignment;

FIG. 30 including FIGS. 30A and 30B shows a cleaning robot that cleans according to the method illustrated in FIG. 29;

FIG. 31 is a flowchart illustrating an example of an automatic cleaning method in which a cleaning robot according to an embodiment of the present disclosure cleans a floor automatically;

FIG. 32 including FIGS. 32A and 32B shows a cleaning robot that cleans a floor automatically according to the automatic cleaning method illustrated in FIG. 31;

FIG. 33 is a flowchart illustrating an example of a driving method of a cleaning robot according to an embodiment of the present disclosure;

FIG. 34 including FIGS. 34A, 34B, 34C and 34D, and 35 show a driving path of a cleaning robot according to the driving method illustrated in FIG. 33;

FIG. 36 is a flowchart illustrating another example of a driving method of a cleaning robot according to an embodiment of the present disclosure;

FIG. 37 including FIGS. 37A, 37B, 37C, 37D and 38 show a driving path of a cleaning robot according to the driving method illustrated in FIG. 36;

FIG. 39 is a flowchart illustrating still another example of a driving method of a cleaning robot according to an embodiment of the present disclosure;

FIG. 40 including FIGS. 40A, 40B, 40C, 40D and 41 show a driving path of a cleaning robot according to the driving method illustrated in FIG. 39;

FIG. 42 is a flowchart illustrating another example of an automatic cleaning method in which a cleaning robot according to an embodiment of the present disclosure cleans a floor automatically;

FIG. 43 including FIGS. 43A and 43B shows a cleaning robot that cleans a floor automatically according to the automatic cleaning method illustrated in FIG. 42;

FIG. 44 is a flowchart illustrating an example of a return method in which a cleaning robot according to an embodiment of the present disclosure returns to a charging station;

FIG. 45 shows a cleaning robot that returns to a charging station according to the return method illustrated in FIG. 44;

FIG. 46 shows an external appearance of a cleaning robot according to another embodiment of the present disclosure;

FIG. 47 shows a bottom of a cleaning robot according to another embodiment of the present disclosure;

FIG. 48 shows the inside of a main body of a cleaning robot according to another embodiment of the present disclosure;

FIG. 49 shows the insides of a main body and a sub body of a cleaning robot according to another embodiment of the present disclosure;

FIG. 50 is a block diagram showing a control configuration of a cleaning robot according to another embodiment of the present disclosure;

FIG. 51 is a block diagram showing a configuration of a controller of FIG. 50;

FIG. 52 is a flowchart illustrating an example of a control method of a cleaning robot according to another embodiment of the present disclosure;

FIG. 53 is a flowchart illustrating another example of a control method of a cleaning robot according to another embodiment of the present disclosure; and FIG. 54 is a flowchart illustrating still another example of a control method of a cleaning robot according to another embodiment of the present disclosure.

BEST MODE

Embodiments described in this specification and configurations shown in the drawings are only preferred examples of the present disclosure, and various modifications capable of substituting the embodiments and drawings of the present specification may be made at the time when the present application is filed.

Hereinafter, embodiments of the present disclosure will be described in detail with reference to the accompanying drawings.

FIG. 1 is a block diagram briefly showing a control configuration of a cleaning robot according to an embodiment of the present disclosure, and FIG. 2 is a view for describing operations of the cleaning robot according to an embodiment of the present disclosure.

Referring to FIGS. 1 and 2, a cleaning robot 100 according to an embodiment of the present disclosure may include a contact sensor 150 to sense a contact to an obstacle or a wall, a driving unit 160 to move the cleaning robot 100, and a controller 110 to control the driving unit 160 according to a contact sensed signal from the contact sensor 150.

The contact sensor 150 may sense a contact/collision of the cleaning robot 100 to/with an obstacle or a wall that interferes with driving of the cleaning robot 100. Also, if a collision with an obstacle or a wall is sensed, the contact sensor 150 may provide a contact sensed signal to the controller 110.

For example, if the cleaning robot 100 contacts an obstacle O as shown in FIG. 2B, the contact sensor 150 may sense a contact of the cleaning robot 100 to the obstacle O, and transfer a contact sensed signal to the controller 110.

Also, the contact sensor 150 may output a predetermined contact sensed signal according to a contact part of the cleaning robot 100 contacting the obstacle O.

The driving unit 160 may move the cleaning robot 100 using drive wheels, a motor, etc., according to a driving control signal from the controller 110.

The controller 110 may control the driving unit 160 according to a contact sensed signal from the contact sensor 150.

For example, when no contact sensed signal is received, the controller 110 may control the driving unit 160 to move the cleaning robot 100 along a driving path for cleaning a floor, and if a contact sensed signal is received, the controller 110 may control the driving unit 160 so that the front part of the cleaning robot 100 contacts an obstacle O.

The cleaning robot 100 may travel in various patterns under the control of the controller 110.

More specifically, when the cleaning robot 100 does neither approach nor contact an obstacle O, the cleaning robot 100 may travel across a floor to clean the floor, as shown in FIG. 2A.

If the cleaning robot 100 approaches or contacts an obstacle O, as shown in FIG. 2B, the cleaning robot 100 may move to contact the obstacle O at the front part, as shown in FIG. 2C.

In other words, the cleaning robot 100 may align its front outline to the outline of the obstacle O.

As such, if the cleaning robot 100 cleans the floor after contacting the obstacle O, the cleaning robot 100 can suck in dust existing along the outline of the obstacle O. Since a major part of dust on the floor exists along the outline of the obstacle O, the cleaning robot 100 capable of removing dust existing along the outline of the obstacle O can improve cleaning performance.

The above description relates to operation in which the front outline of the cleaning robot 100 is aligned to the outline of an obstacle O. However, any part of the cleaning robot 100 having an even outline that can be aligned to the outline of an obstacle O may be aligned to the outline of the obstacle O.

So far, the configuration and operation of the cleaning robot 100 have been briefly described.

Hereinafter, the configuration and operation of the cleaning robot 100 will be described in more detail.

FIG. 3 is a block diagram showing a control configuration of the cleaning robot 100 according to an embodiment of the present disclosure, FIG. 4 shows an external appearance of the cleaning robot 100 according to an embodiment of the present disclosure, FIG. 5 shows a bottom of the cleaning robot 100 according to an embodiment of the present disclosure, and FIG. 6 shows the inside of a main body of the cleaning robot 100 according to an embodiment of the present disclosure.

The external appearance of the cleaning robot 100 shown in FIG. 4 is only exemplary, and the cleaning robot 100 may have any other appearance.

Referring to FIGS. 3 to 6, the cleaning robot 100 may be composed of a main body 101 and a sub body 103. The main body 101 may be in the shape of a nearly semi-circular pillar, and the sub body 103 may be in the shape of a rectangle, as shown in FIG. 4.

Also, components for performing functions of the cleaning robot 100 may be installed in the insides and outsides of the main body 101 and the sub body 103.

More specifically, the cleaning robot 100 may include a contact sensor 150, a driving unit 160, a controller 110, a user interface 120 for interfacing with a user, an image acquiring unit 130 to acquire images about surroundings of the cleaning robot 100, a non-contact obstacle sensor 140 to sense an obstacle O in a non-contact fashion, a cleaning unit 170 to clean a floor, and a storage unit 180 to store programs and various data.

The user interface 120 may be mounted on the main body 101 of the cleaning robot 100, as shown in FIG. 4. The user interface 120 may include an input button group 121 to receive control commands from a user, and a display unit 123 to display operation information of the cleaning robot 100.

The input button group 121 may include a power button 121a to turn on/off the cleaning robot 100, a start/stop button 121b to start or stop operating the cleaning robot 100, and a return button 121c to return the cleaning robot 100 to a charging station (not shown).

Also, each button of the input button group 121 may be a push switch or a membrane switch to sense a pressure from a user, or a touch switch to sense a contact of a user's body part.

The display unit 123 may display information about the cleaning robot 100 in response to a control command input by a user. For example, the display unit 123 may display an operation state of the cleaning robot 100, a power on/off state of the cleaning robot 100, a cleaning mode selected by a user, information about returning to a charging station, etc.

The display unit 123 may be a Light Emitting Diode (LED) display or an Organic Light Emitting Diode (OLED) display capable of self-light emitting, or a Liquid Crystal Display (LCD).

Although not shown in the drawings, the user interface 120 may include a touch screen panel (TSP) to receive a control command from a user, and to display operation information corresponding to the received control command.

More specifically, the touch screen panel may include a display to display operation information and a control command input by a user, a touch panel to detect coordinates that a user's body part contacts, and a touch screen controller to determine the control command input by the user based on information about the coordinates detected by the touch panel.

The image acquiring unit 130 may include a camera module 131 to acquire images about surroundings of the cleaning robot 100.

The camera module 131 may be mounted on the upper surface of the sub body 103 of the cleaning robot 100. The camera module 131 may include a lens to focus light emitted upward from the cleaning robot 100, and an image sensor to convert light into an electrical signal.

The image sensor may be a Complementary Metal Oxide Semiconductor (CMOS) sensor or a Charge Coupled Device (CCD) sensor.

The camera module 131 may convert an image (hereinafter, referred to as an "upper image") about surroundings of the cleaning robot 100 into an electrical signal that can be processed by the controller 110, and transfer the electrical signal corresponding to the upper image to the controller 110. The upper image provided by the image acquiring unit 130 may be used by the controller 110 to detect a position of the cleaning robot 100.

The obstacle sensor 140 may sense an obstacle O that interferes with movement of the cleaning robot 100, in a non-contact fashion.

Herein, the obstacle O means any object that protrudes from the floor to interfere with movement of the cleaning robot 100. The obstacle O may include a wall and furniture, such as table, sofa, etc.

The obstacle sensor 140 may include a light emission module 141 to emit light forward, and a light reception module 143 to receive light reflected from an obstacle O and the like.

The cleaning robot 100 may use light such as infrared light to sense an obstacle O, however, the cleaning robot 100 may use ultrasonic waves or radio waves to sense an obstacle O.

Details about the configuration and operation of the obstacle sensor 140 will be described in more detail, later.

The contact sensor 150 may detect existence of an obstacle O through a contact to the obstacle O.

The contact sensor 150 may include a bumper 151 to contact an obstacle O, and a bumper switch 153 to output a contact sensed signal according to a contact of the bumper 151 to an obstacle O.

The configuration and operation of the contact sensor 150 will be described in more detail, later.

The driving unit 160 may move the cleaning robot 100, and may include wheel driving motors 161a and 161b, drive wheels 163a and 163b, and a castor wheel 165, as shown in FIG. 5.

The drive wheels 163a and 163b may be disposed at both sides of the bottom of the main body 101. The drive wheels 163a and 163b may include a left drive wheel 163a disposed to the left of the cleaning robot 100 and a right drive wheel 163b disposed to the right of the cleaning robot 100, when seen from the front part of the cleaning robot 100.

The drive wheels 163a and 163b may move the cleaning robot 100 by receiving rotating forces from the wheel driving motors 161a and 161b.

The wheel driving motors 161a and 161b may generate rotating forces for rotating the drive wheels 163a and 163b. The wheel driving motors 161a and 161b may include a left driving motor 161a to rotate the left drive wheel 163a, and a right driving motor 161b to rotate the right drive wheel 163b.

The left and right driving motors 161a and 161b may respectively receive driving control signals from the controller 110 to operate independently.

The left and right drive wheels 163a and 163b can rotate independently by the left and right driving motors 161a and 161b that operate independently.

Since the left and right drive wheels 163a and 163b can rotate independently, the cleaning robot 100 can travel in various ways, such as forward driving, backward driving, rotational-driving, standing-driving, etc.

For example, if both the left and right drive wheels 163a and 163b rotate in a first direction, the cleaning robot 100 may straightly move forward, and if both the left and right drive wheels 163a and 163b rotate in a second direction, the cleaning robot 100 may straightly move backward.

Also, if the left and right drive wheels 163a and 163b rotate at different speeds in the same direction, the cleaning robot 100 may turn to the right or left, and if the left and right drive wheels 163a and 163b rotate in different directions, the cleaning robot 100 may rotate clockwise or counterclockwise at the same place.

The castor wheel 165 may be disposed on the bottom of the main body 101, and the rotation shaft of the castor wheel 165 may rotate according to a movement direction of the cleaning robot 100. The castor wheel 165 whose rotation shaft rotates according to a movement direction of the cleaning robot 100 may help the cleaning robot 100 travel at its stable position, without interfering with driving of the cleaning robot 100.

Also, the driving unit 160 may further include a gear module (not shown) to reduce rotating forces of the wheel driving motors 161a and 161b and to transfer the rotating forces to the drive wheels 163a and 163b, and a rotation sensor (not shown) to detect rotational displacements and rotation speeds of the wheel driving motors 161a and 161b or the drive wheels 163a and 163b.

The cleaning unit 170 may include a drum brush 173 to scatter dust on a floor, a brush driving motor 171 to rotate the drum brush 173, a dust suction module 175 to suck the scattered dust, and a dust cartridge 177 to store the sucked dust.

The drum brush 173 may be disposed in a dust suction opening 103a formed in the bottom of the sub body 103, and rotate on a rotating shaft that is disposed horizontally to the bottom of the sub body 103 to scatter dust on a floor into the dust suction opening 103a.

The brush driving motor 171 may be disposed adjacent to the drum brush 173 to rotate the drum brush 173 according to a cleaning control signal from the controller 110.

The dust suction module 175 may be disposed in the main body 101 as shown in FIG. 6 to suck dust scattered by rotations of the drum brush 173 into the dust cartridge 177.

Also, the dust suction module 175 may include a dust suction fan (not shown) to generate a suction force for sucking dust into the dust cartridge 177, and a dust suction motor (not shown) to rotate the dust suction fan.

The dust cartridge 177 may be installed in the main body 101, as shown in FIG. 6, to store dust sucked by the dust suction module 175.

The cleaning unit 170 may include a dust guide pipe to guide dust sucked through the dust suction opening 103a of the sub body 103 to the dust cartridge 177 installed in the main body 101.

The storage unit 180 may store control programs and control data to control the cleaning robot 100, and map information about a floor acquired when the cleaning robot 100 travels.

The storage unit 180 may act as an auxiliary memory to assist a memory 115 included in the controller 110. The storage unit 180 may be non-volatile storage medium in which stored data is not deleted even when the cleaning robot 100 is powered off.

The storage unit 180 may include a semiconductor device driver 181 to store data in a semiconductor device, and a magnetic disk drive 183 to store data in a magnetic disk.

The controller 110 may control overall operations of the cleaning robot 100.

More specifically, the controller 110 may include an input/output interface 117 to enable data transmission/reception between various components included in the cleaning robot 100 and the controller 110, the memory 115 to store programs and data, a graphic processor 113 to perform image processing, a main processor 111 to perform operations according to the programs and data stored in the memory 115, and a system bus 119 acting as a path for data transmission/reception between the input/output interface 117, the memory 115, the graphic processor 113, and the main processor 111.

The input/output interface 117 may receive images acquired by the image acquiring unit 130, the results of obstacle sensing by the obstacle sensor 140, the results of contact sensing by the contact sensor 150, etc., and transfer the received images or the received results of sensing to the main processor 111, the graphic processor 113, and/or the memory 115 through the system bus 119.

Also, the input/output interface 117 may transfer various control signals output from the main processor 111 to the driving unit 160 or the cleaning unit 170.

The memory 115 may load and store control programs and control data for controlling operations of the cleaning robot 100 from the storage unit 180, or may temporarily store images acquired by the image acquiring unit 130, the results of obstacle sensing by the obstacle sensor 140, the results of contact sensing by the contact sensor 150, etc.

The memory 115 may be a volatile memory, such as Static Random Access Memory (SRAM) or Dynamic Random Access Memory (DRAM). However, the memory 115 may be a non-volatile memory, such as flash memory or Erasable Programmable Read Only Memory (EPROM).

The graphic processor 113 may convert an image acquired by the image acquiring unit 130 into a format that can be stored in the memory 115 or the storage unit 180, or the graphic processor 113 may change the resolution or size of an image acquired by the image acquiring unit 130.

Also, if the obstacle sensor 150 includes an image sensor, the graphic processor 113 may convert an image acquired by the obstacle sensor 150 into a format that can be processed by the main processor 111.

The main processor 111 may process the results of sensing by the image acquiring unit 130, the obstacle sensor 140, and/or the contact sensor 150 according to programs and data stored in the memory 115, or may perform operations for controlling the driving unit 160 and the cleaning unit 170.

For example, the main processor 111 may calculate a location of the cleaning robot 100 based on an image acquired by the image acquiring unit 130, or may calculate a direction in which an obstacle exists, a distance to the obstacle, and a size of the obstacle based on an image acquired by the obstacle sensor 150.

Also, the main processor 111 may perform an operation for determining whether to make a detour around an obstacle O or to contact the obstacle O according to a direction in which an obstacle O exists, a distance to the obstacle O, and a size of the obstacle O. If the main processor 111 determines that the cleaning robot 100 needs to make a detour around the obstacle O, the main processor 11 may calculate a driving path for making a detour around the obstacle O, and if the main processor 111 determines that the cleaning robot 100 needs to contact the obstacle O, the main processor 111 may calculate a driving path for aligning the cleaning robot 100 to the obstacle O.

Also, the main processor 111 may generate driving control data that is to be provided to the driving unit 160 so that the cleaning robot 100 can move along the calculated driving path.

The controller 110 may control the driving unit 150 to make the cleaning robot 100 travel across a floor, and may control the cleaning unit 170 to make the cleaning robot 100 clean the floor.

Also, the controller 110 may detect a location and size of an obstacle O based on an obstacle sensed signal received from the obstacle sensor 140 or a contact sensed signal received from the contact sensor 150, and determine whether to contact the obstacle O based on the location and size of the obstacle O.

Also, the controller 110 may control the driving unit 160 to align the front outline of the cleaning robot 100 to the outline of an obstacle O in order to clean the perimeter of the obstacle O on a floor.

Operations of the cleaning robot 100, which will be described below, can be interpreted as operations according to control operations of the controller 110.

Hereinafter, the obstacle sensor 140 will be described in detail.

FIG. 7 shows an example of the obstacle sensor 140 included in the cleaning robot 100 according to an embodiment of the present disclosure, FIG. 8 shows the obstacle sensor 140 included in the cleaning robot 100 of FIG. 7 when the obstacle sensor emits light, and FIG. 9 shows an example in which the obstacle sensor 140 included in the cleaning robot 100 of FIG. 7 receives light reflected from an obstacle.

The obstacle sensor 140 may include, as described above, the light emission module 141 and the light reception module 143.

Referring to FIG. 7, the light emission module 141 may include a light source 141a to emit light, and a wide-angle lens 141b to diffuse the emitted light in a direction that is parallel to a floor.

The light source 141a may be a Light Emitting Diode (LED) or a Light Amplification by Simulated Emission of Radiation (LASER) diode to emit light in all directions.

The wide-angle lens 141b may be made of a material capable of transmitting light, and diffuse light emitted from the light source 141a in a direction that is parallel to a floor, through refraction or total reflection.

Light emitted from the light emission module 141 through the wide-angle lens 141b may diffuse in a fan shape forward from the cleaning robot 100, as shown in FIG. 8.

Also, the obstacle sensor 140 may include a plurality of light emission modules 141 so as to minimize an area which light emitted from the light emission modules 141 does not reach, as shown in FIGS. 7 and 8.

The light reception module 143 may include a reflection mirror 143a to centralize light reflected from an obstacle O, and an image sensor 143b to receive light reflected by the reflection mirror 143a.

The reflection mirror 143a may be mounted on the image sensor 143b, as shown in FIGS. 7 and 9, and may have a conical shape such that the vertex of the reflection mirror 143a faces the image sensor 143b. The reflection mirror 143a may reflect light reflected from the obstacle O toward the image sensor 143b.

The image sensor 143b may be positioned below the reflection mirror 143a, and receive light reflected by the reflection mirror 143a. More specifically, the image sensor 143b may acquire a 2Dimensional (2D) image formed on the reflection mirror 143a according to light reflected from an obstacle O. That is, the image sensor 143b may be a 2D image sensor in which optical sensors are arranged two-dimensionally.

The image sensor 143b may be an image sensor that can receive light of the same wavelength as that of light emitted from the light source 143a of the light emission module 141. For example, if the light source 141a emits light of an infrared range, the image sensor 143b may also be an image sensor that can acquire an image of an infrared range.

Also, the image sensor 143b may be a Complementary Metal Oxide Semiconductor (CMOS) sensor or a Charge Coupled Device (CCD) sensor.

There may be provided a plurality of light reception modules 143, and the number of the light reception modules 143 may be different from that of the light emission modules 141. As described above, since the light emission module 141 uses the wide-angle lens 141a to diffuse light emitted from the light source 141a in all directions, and the light reception module 143 uses the reflection mirror 143a to centralize the light emitted in all directions on the image sensor 143b, the obstacle sensor 140 may include a plurality of light emission modules 141 and a plurality of light reception modules 143, wherein the number of the light emission modules 141 is different from the number of the light reception modules 143.

The principle that the obstacle sensor 140 senses an obstacle O will be briefly described below.

The light emission module 141 may emit light forward from the cleaning robot 100, as shown in FIG. 9.

If there is no obstacle O in front of the cleaning robot 100, light emitted from the light emission module 141 may be transmitted forward from the cleaning robot 100, and the light reception module 143 may receive no light reflected from an obstacle O.

If there is an obstacle O in front of the cleaning robot 100, light emitted from the light emission module 141 may be reflected from the obstacle O. At this time, the light emitted from the light emission module 141 is reflected in all directions from the obstacle O, which is called "diffused reflection".

A part of the light (hereinafter, referred to as reflection light) reflected from the obstacle O may be directed to the light reception module 143 of the robot cleaner 100.

The reflection light directed to the light reception module 143 may be reflected by the reflection mirror 143a, and then transmitted to the image sensor 143b. The image sensor 143b may receive the reflection light reflected from the reflection mirror 143a.

Since the reflection light has been reflected from various areas of the obstacle O, the image sensor 143b may acquire a reflection light image, and the obstacle sensor 140 may calculate a direction in which the obstacle O exists, a distance to the obstacle O, etc., based on the reflection light image.

More specifically, an angle at which light reflected from the obstacle O is incident to the reflection mirror 143a may depend on a distance between the light emission module 143 and the obstacle O. Also, light incident to the reflection mirror 143a at different incident angles may be received at different locations of the image sensor 143*b*. As a result, a location at which the image sensor 143*b* receives reflection light may depend on a distance between the light emission module 143 and the obstacle O. That is, a reflection light image that is acquired by the image sensor 143*b* may depend on a distance between the light emission module 143 and the obstacle O.

For example, light reflected from an obstacle O that is distant from the cleaning robot 100 may be incident to the reflection mirror 143*a* at a great incident angle, so that a reflection light image may be formed at a location that is distant from the vertex of the reflection mirror 143*a*. Also, light reflected from an obstacle O that is close to the cleaning robot 100 may be incident to the reflection mirror 143*a* at a small incident angle, so that a reflection light image may be formed at a location that is close to the vertex of the reflection mirror 143*a*.

Also, a location of the reflection mirror 143*a* to which light reflected from an obstacle O is incident may depend on a direction in which the obstacle O exists. Also, reflection light reflected from different locations of the reflection mirror 143*a* may be received at different locations of the image sensor 143*b*. As a result, a location at which the image sensor 143*b* receives reflection light may depend on a direction in which an obstacle O exists. That is, a reflection light image that is acquired by the image sensor 143*b* may depend on a direction in which an obstacle O exists with respect to the cleaning robot 100.

As such, the cleaning robot 100 may calculate a direction in which an obstacle O exists and a distance to the obstacle O according to a reflection light image received by the image sensor 143*b*.

So far, the light emission module 141 including the light source 141*a* and the wide-angle lens 141*b*, and the light reception module 143 including the reflection mirror 143*a* and the image sensor 143*b* have been described, however, examples of the light emission module 141 and the light reception module 143 are not limited to these.

For example, the obstacle sensor 140 may calculate a distance to an obstacle O based on the intensity of light reflected from the obstacle O, or based on a time taken for light emitted from the obstacle sensor 140 to be reflected from the obstacle O and then return to the obstacle sensor 140.

FIG. 10 shows another example of the obstacle sensor 140 included in the cleaning robot 100 according to an embodiment of the present disclosure;

As shown in FIG. 10, the light emission module 141 may include a light source 141*c* to emit light forward from the cleaning robot 100, and the light reception module 143 may include a light sensor 143*c* to receive light reflected from the obstacle O.

The light source 141*c* may emit nearly straight light forward from the cleaning robot 100, and the light sensor 143*c* may be disposed to correspond to the light source 141*c* to receive light reflected from an obstacle O.

The cleaning robot 100 may calculate a distance to an obstacle O based on the intensity of received light or a reflection time of received light.

Also, in order to detect obstacles O located in all directions in front of the cleaning robot 100, the obstacle sensor 140 may include a plurality of light emission modules 141 and a plurality of light reception modules 143, as shown in FIG. 10.

Hereinafter, the contact sensor 150 will be described in detail.

FIG. 11 shows an example of the contact sensor 150 included in the cleaning robot 100 according to an embodiment of the present disclosure.

Referring to FIG. 11, the contact sensor 150 may include a bumper 151, a plurality of bumper switches 153*a* and 153*b*, a plurality of external power transfer members 155*a* and 155*b*, a plurality of bumper restoring members 157*a* and 157*b*, and a plurality of slip preventing members 159*a* and 159*b*.

The bumper 151 may be disposed on the head part of the sub body 103, as shown in FIG. 11, in such a way to be movable with respect to the sub body 103.

The bumper 151 may move in a rear, left, or right direction by an external force F to thus transfer the external force F to the external force transferring members 155*a* and 155*b* and the bumper switches 153*a* and 153*b*.

Also, the bumper 151 may include a left protrusion 151*c* to transfer an external force F applied from the left to the left external force transferring member 155*a*, and a right protrusion 151*d* to transfer an external force F applied from the right to the right external force transferring member 155*b*.

The bumper 151 may transfer an external force F applied from the left or right, as well as an external force F applied from the front, to the external force transferring members 155*a* and 155*b*, through the left protrusion 151*c* and the right protrusion 151*d*.

The bumper switches 153*a* and 153*b* may include a left bumper switch 153*a* disposed at the left part of the sub body 103, and a right bumper switch 153*b* disposed at the right part of the sub body 103.

If the left part of the bumper 151 contacts an obstacle O, the left bumper switch 153*a* may output a left contact sensed signal. More specifically, the left bumper switch 153*a* may be turned on or off according to an external force F that is generated when the left part of the bumper 151 contacts an obstacle O.

If the right part of the bumper 151 contacts an obstacle O, the right bumper switch 153*b* may output a right contact sensed signal. More specifically, the right bumper switch 153*b* may be turned on or off according to an external force F that is generated when the right part of the bumper 151 contacts an obstacle O.

In order to sense an external force F applied to the bumper 151 at the left or right surface, each of the left and right bumper switches 153*a* and 153*b* may be installed diagonally, as shown in FIG. 11.

More specifically, each of the left and right bumper switches 153*a* and 153*b* may be installed such that the bumper switch 153*a* or 153*b* is pressed at a first reference angle α with respect to the front direction of the cleaning robot 100. Herein, the first reference angle α may range from 10 degrees to 60 degrees, and preferably, the first reference angle α may be 45 degrees.

The external force transferring members 155*a* and 155*b* may be rotatably disposed on external transferring rotation shafts 103*e* and 103*f*. The external force transferring members 155*a* and 155*b* may rotate by an external force F transferred to the bumper 151 to press the bumper switches 153*a* and 153*b*.

The external force transferring members 155*a* and 155*b* may include a left external force transferring member 155*a* and a right external force transferring member 155*b* in correspondence to the left and right bumper switches 153*a* and 153*b*. The left external force transferring member 155*a* may press the left bumper switch 153*a* by an external force applied from the front left part or the left part of the cleaning robot 100, and the right external force transferring member 155*b* may press the right bumper switch 153*b* by an external force applied from the front right part or the right part of the cleaning robot 100.

The slip preventing members 159*a* and 159*b* may prevent the bumper 151 from slipping due to an external force F applied diagonally from the front part of the cleaning robot 100.

For example, when an external force F is applied at an angle of 45 degrees with respect to the front part of the cleaning robot 100 from the left part of the cleaning robot 100, the external force F may be transferred to both the left external force transferring member 155*a* and the right external force transferring member 155*b* due to slipping of the bumper 151. In this case, both the left bumper switch 153*a* and the right bumper switch 153*b* may transfer contact sensed signals to the controller 110, and the controller 110 may make a wrong determination that both the left and right parts of the cleaning robot 100 contact an obstacle O.

Accordingly, the slip preventing members 159*a* and 159*b* may be provided to prevent the bumper 151 from slipping.

The slip preventing members 159*a* and 159*b* may include a left slip preventing member 159*a* disposed at the left part of the sub body 103, and a right slip preventing member 159*b* disposed at the right part of the sub body 103.

Also, the left and right slip preventing members 159*a* and 159*b* may include a plurality of bumper fixing plates 151*a* and 151*b* fixed at the bumper 151 to restrict movement of the bumper 151, and a plurality of bumper fixing protrusions 103*a* and 103*b* fixed at the sub body 103 to restrict movement of the bumper 151, respectively.

The bumper fixing plates 151*a* and 151*b* may include a plurality of bumper fixing holes into which the bumper fixing protrusions 103*a* and 103*b* are inserted. The diameters of the bumper fixing holes may be larger than those of the bumper fixing protrusions 103*a* and 103*b* so that the bumper 151 can move within a predetermined range.

Also, a plurality of slip preventing protrusions for preventing the bumper 151 from slipping may be formed on the inner circumference surfaces of the bumper fixing holes, and a plurality of slip preventing grooves corresponding to the slip preventing protrusions may be formed on the outer circumference surfaces of the bumper fixing protrusions 103*a* and 103*b*.

Due to the slip preventing protrusions and the slip preventing grooves, the bumper 151 may be prevented from slipping. More specifically, if an external force F is applied from the front part of the cleaning robot 100, the slip preventing protrusions may be inserted into the slip preventing grooves to prevent the bumper 151 from slipping.

The bumper restoring members 157*a* and 157*b* may restore the bumper 151 moved by an external force F to its original position.

The bumper restoring members 157*a* and 157*b* may be configured with elastic members such as springs, and may include a left bumper restoring member 157*a* disposed in the left part of the sub body 103, and a right bumper restoring member 157*b* disposed in the right part of the sub body 103.

One ends of the bumper restoring members 157*a* and 157*b* may be coupled with elastic member fixing protrusions 103*c* formed in the sub body 103, and the other ends of the bumper restoring members 157*a* and 157*b* may be coupled with bumper fixing plates 151*a* and 151*b* formed in the bumper 151.

If an external force F is applied to the bumper 151 from the front part of the cleaning robot 100, the bumper 151 and the bumper fixing plates 151*a* and 151*b* may move backward, and the bumper restoring members 157*a* and 157*b* may expand. Thereafter, if the external force F is removed, the bumper restoring members 157*a* and 157*b* may contract by an elastic force so that the bumper 151 and the bumper fixing plates 151*a* and 151*b* may return to their original positions.

So far, the configuration of the contact sensor 150 has been described.

Hereinafter, operations of the contact sensor 150 will be described.

FIG. 12 shows a case in which the entire of the bumper 151 included in the cleaning robot 100 according to an embodiment of the present disclosure contacts an obstacle O, FIG. 13 shows a case in which the front left part of the bumper 151 included in the cleaning robot 100 of FIG. 12 contacts an obstacle O, and FIG. 14 shows a case in which the left, side part of the bumper 151 included in the cleaning robot 100 of FIG. 12 contacts an obstacle O.

If the cleaning robot 100 contacts an obstacle O, an external force F may be applied to the bumper 151. Then, the bumper 151 may move backward by the external force F. At this time, the movement of the bumper 151 may be restricted by the bumper fixing holes and the bumper fixing protrusions 103*a* and 103*b*.

When the bumper 151 moves backward, the bumper 151 may press the external force transferring members 155*a* and 155*b*, and the external force transferring members 155*a* and 155*b* pressed by the bumper 151 may rotate on the external force transferring rotation shafts 103*e* and 103*f*. Also, the external force transferring members 155*a* and 155*b* may rotate to press the bumper switches 153*a* and 153*b*, and the bumper switches 153*a* and 153*b* pressed by the external force transferring members 155*a* and 155*b* may output contact sensed signals.

The controller 110 may detect a contact of the cleaning robot 100 to the obstacle O through the contact sensed signals output from the bumper switches 153*a* and 153*b*.

For example, if the cleaning robot 100 contacts an obstacle O at the front part, an external force F may be uniformly applied to the left and right parts of the bumper 151, as shown in FIG. 12.

In this case, the left and right parts of the bumper 151 may uniformly move backward, and the bumper 151 moved backward may press both the left external force transferring member 155*a* and the right external force transferring member 155*b*. The left external force transferring member 155*a* and the right external force transferring member 155*b* pressed by the bumper 151 may press the left bumper switch 153*a* and the right bumper switch 153*b*, respectively, and the left bumper switch 153*a* and the right bumper switch 153*b* may output a left contact sensed signal and a right contact sensed signal, respectively.

If the controller 110 receives the left contact sensed signal and the right contact sensed signal at the same time, the controller 110 may determine that both sides of the front part of the cleaning robot 100 contact an obstacle O.

As another example, if the front left part of the cleaning robot 100 contacts an obstacle O, an external force F may be applied from the left part of the bumper 151 toward the center of the cleaning robot 100.

In this case, the left part of the bumper 151 may move backward, while the right part of the bumper 151 may be maintained at its position. That is, the bumper 151 may be inclined to the left. At this time, the bumper 151 may not slip to the right although it moves backward, due to the slip preventing members 159*a* and 159*b*.

The bumper 151 moved backward at the left part may press the left external force transferring member 155*a*. The left external force transferring member 155a pressed by the bumper 151 may press the left bumper switch 153a, and the left bumper switch 153a may output a left contact sensed signal.

If the controller 110 receives the left contact sensed signal, the controller 110 may determine that the left part of the cleaning robot 100 contacts an obstacle O.

Also, since the controller 110 can determine a location of an obstacle O through the obstacle sensor 140, the controller 110 may determine that the front left part of the cleaning robot 100 contacts an obstacle O, based on the location of the obstacle O.

As another example, if the left side of the cleaning robot 100 contacts an obstacle O, an external force F may be applied in parallel to the bumper 151 from the left side of the bumper 151.

In this case, the entire part of the bumper 151 may move to the right, and when the bumper 151 moves to the right, the left protrusion 151c formed in the inner surface of the bumper 151 may press the left external force transferring member 155a. The left external force transferring member 155a pressed by the left protrusion 151c of the bumper 151 may press the left bumper switch 153a, and the left bumper switch 153a may output a left contact sensed signal.

If the controller 110 may receive the left contact sensed signal, the controller 110 may determine that the left side of the cleaning robot 100 contacts an obstacle O.

Also, since the controller 110 can determine a location of the obstacle O through the obstacle sensor 140, the controller 110 may determine that the left side of the cleaning robot 100 contacts an obstacle O, based on the location of the obstacle O.

So far, the configuration of the cleaning robot 100 according to an embodiment of the present disclosure has been described.

Hereinafter, operations of the cleaning robot 100 according to an embodiment of the present disclosure will be described.

The cleaning robot 100 according to an embodiment of the present disclosure may travel across a floor to remove dust existing on the floor. More specifically, the cleaning robot 100 may perform outline alignment in order to effectively clean an area (that is, the edge of a floor) at which a floor encounters the outline of an obstacle O.

FIG. 15 is a flowchart illustrating an example of an outline alignment method 1000 of the cleaning robot 100 according to an embodiment of the present disclosure, and FIG. 16 shows the cleaning robot 100 that performs the outline alignment method 1000 illustrated in FIG. 15.

Hereinafter, an example of an outline alignment method 1000 of the cleaning robot 100 will be described with reference to FIGS. 15 and 16.

The cleaning robot 100 may determine whether it contacts an obstacle O, in operation 1010.

The cleaning robot 100 may sense a contact to an obstacle O in various ways.

For example, the cleaning robot 100 may sense a contact to an obstacle O through the contact sensor 150.

If the cleaning robot 100 contacts an obstacle O, the bumper 151 may be pressed by the obstacle O, and the bumper switches 153a and 153b may transfer a contact sensed signal to the controller 110. The controller 110 may determine a part of the cleaning robot 100 contacting the obstacle O, based on the contact sensed signal.

More specifically, if a contact sensed signal is received from the left bumper switch 153a, the controller 110 may determine that the front left part of the cleaning robot 100 contacts an obstacle O, and if a contact sensed signal is received from the right bumper switch 153b, the controller 110 may determine that the front right part of the cleaning robot 100 contacts an obstacle O.

Also, if contact sensed signals are received from both the left bumper switch 153a and the right bumper switch 153b, the controller 110 may determine that the entire front part of the cleaning robot 100 contacts an obstacle O.

As another example, the cleaning robot 100 may sense a contact to an obstacle O based on rotations of the drive wheels 163a and 163b.

As described above, the drive wheels 163a and 163b may include the left drive wheel 163a and the right drive wheel 163b that rotate independently. Also, each of the left and right drive wheels 163a and 163b may include a rotation sensor for sensing a rotation.

The controller 110 may determine whether the cleaning robot 100 contacts an obstacle O and a direction in which the cleaning robot 100 contacts the obstacle O, based on rotations of the left and right drive wheels 163a and 163b. In other words, if no rotation of the drive wheels 163a and 163b is sensed, or if rotation speed of the drive wheels 163a and 163b is significantly lower than rotation speed instructed by the controller 110, the controller 110 may determine that the cleaning robot 100 contacts the obstacle O at the corresponding part.

More specifically, if no rotation of the left drive wheel 163a is sensed, the controller 110 may determine that the front left part of the cleaning robot 100 contacts an obstacle O, and if no rotation of the right drive wheel 163b is sensed, the controller 110 may determine that the front right part of the cleaning robot 100 contacts an obstacle O.

Also, if no rotation of the left and right drive wheels 163a and 163b is sensed, the controller 110 may determine that the entire front part of the cleaning robot 100 contacts an obstacle O.

If a contact to an obstacle O is sensed ("Yes" in operation 1010), the cleaning robot 100 may rotate on the contact part of the cleaning robot 100 contacting the obstacle O, in operation 1020.

As described above, the cleaning robot 100 may determine whether it contacts an obstacle O and the contact part of the cleaning robot 100 contacting the obstacle O, based on a contact sensed signal received from the contact sensor 150 or rotations of the drive wheels 163a and 163b.

If the contact part of the cleaning robot 100 is determined, the cleaning robot 100 may rotate on the contact part.

For example, as shown in FIG. 16A, if the cleaning robot 100 determines that the front right part contacts an obstacle O, the cleaning robot 100 may rotate on the front right part.

More specifically, if a contact sensed signal is received from the right bumper switch 153b of the contact sensor 150, the controller 110 may control the driving unit 160 to stop rotating the right drive wheel 163b and continue to rotate the left drive wheel 163a.

If no rotation of the right drive wheel 163b is sensed, or if rotation speed of the right drive wheel 163b is significantly lower than rotation speed of the left drive wheel 163a, the controller 110 may control the driving unit 160 to stop rotating the right drive wheel 163b and continue to rotate the left drive wheel 163a.

As another example, as shown in FIG. 16B, if the front left part of the cleaning robot 100 contacts an obstacle O, the cleaning robot 100 may rotate on the front left part.

More specifically, if a contact sensed signal is received from the left bumper switch 153a of the contact sensor 150, the controller 110 may control the driving unit 160 to stop rotating the left drive wheel 163a and continue to rotate the right drive wheel 163b.

Or, if no rotation of the left drive wheel 163a is sensed, or if rotation speed of the left drive wheel 163a is significantly lower than rotation speed of the right drive wheel 163b, the controller 110 may control the driving unit 160 to stop rotating the left drive wheel 163a and continue to rotate the right drive wheel 163b.

In summary, when one side of the front part of the cleaning robot 100 contacts an obstacle O, the cleaning robot 100 may stop rotating the drive wheel 163a or 163b that is close to the contact area of the cleaning robot 100, and continue to rotate the drive wheel 163a or 163b that is opposite to the contact area of the cleaning robot 100.

Thereafter, the cleaning robot 100 may determine whether both sides of the front part of the cleaning robot 100 contact the obstacle O, in operation 1030.

The cleaning robot 100 may determine whether both sides of the front part contact the obstacle O, based on a contact sensed signal of the contact sensor 150 or rotations of the drive wheels 163a and 163b.

For example, if contact sensed signals are received from both the left bumper switch 153a and the right bumper switch 153b of the contact sensor 150, the controller 110 may determine that both sides of the front part of the cleaning robot 100 contact an obstacle O. In other words, the controller 110 may determine that the front outline of the cleaning robot 100 is aligned to the outline of an obstacle O.

As another example, if no rotation of the left and right drive wheels 163a and 163b is sensed, or if rotation speeds of the left and right drive wheels 163a and 163b are significantly lower than rotation speed instructed by the controller 110, the controller 110 may determine that both sides of the front part of the cleaning robot 100 contact an obstacle O.

If one side of the front part of the cleaning robot 100 contacts the obstacle O ("No" in operation 1030), the cleaning robot 100 may continue to rotate on the contact part of the cleaning robot 100.

If both sides of the front part of the cleaning robot 100 contact the obstacle O ("Yes" in operation 1030), the cleaning robot 100 may terminate outline alignment with the obstacle O.

Since the front part of the cleaning robot 100 has a nearly even shape, the front part (the bumper 150) of the cleaning robot 100 may be aligned to the obstacle O if both sides of the front part of the cleaning robot 100 contact the obstacle O.

Also, in order to effectively clean an edge of a floor that encounters the outline of an obstacle O, the cleaning robot 100 may align the outline of the front part of the cleaning robot 100 to the outline of the obstacle O, and then clean the edge of the floor for a predetermined time period without moving to another place.

As such, if the outline of the front part of the cleaning robot 100 is aligned to the outline of the obstacle O, it is possible to effectively remove dust existing on the edge of the floor that encounters the obstacle O, through the dust suction opening 103a provided in the bottom of the sub body 103.

FIG. 17 is a flowchart illustrating another example of an outline alignment method 1100 of the cleaning robot 100 according to an embodiment of the present disclosure, and FIG. 18 shows the cleaning robot 100 that performs the outline alignment method 1100 illustrated in FIG. 17.

Hereinafter, another example of an outline alignment method 1100 of the cleaning robot 100 will be described with reference to FIGS. 17 and 18. In the following description, descriptions about the same operations of the cleaning robot 100 as described above will be briefly given.

The cleaning robot 100 may determine whether it contacts the obstacle O, in operation 1110.

As described above in operation 1010 of FIG. 15, the cleaning robot 100 may sense a contact to an obstacle O, based on a contact sensed signal from the contact sensor 150 or rotations of the drive wheels 163a and 163b.

If a contact to an obstacle O is sensed ("Yes" in operation 1110), the cleaning robot 100 may rotate on the contact part of the cleaning robot 100 contacting the obstacle O, in operation 1120.

As described above in operation 1020 of FIG. 15, the cleaning robot 100 may determine a contact part of the cleaning robot 100 contacting the obstacle O, based on a contact sensed signal from the contact sensor 150 or rotations of the drive wheels 163a and 163b, and rotate on the contact part of the cleaning robot 100 so that the front outline of the cleaning robot 100 is aligned to the outline of the obstacle O.

For example, as shown in FIG. 18A, if the front right part of the cleaning robot 100 contacts an obstacle O, the cleaning robot 100 may rotate clockwise on the front right part of the cleaning robot 100.

Thereafter, the cleaning robot 100 may determine whether both sides of the front part of the cleaning robot 100 contact the obstacle O, in operation 1130.

As described above in operation 1030 of FIG. 15, the cleaning robot 100 may determine whether both sides of the front part of the cleaning robot 100 contact the obstacle O, based on a contact sensed signal from the contact sensor 150 or rotations of the drive wheels 163a and 163b.

If one side of the front part of the cleaning robot 100 contacts the obstacle O ("No" in operation 1130), the cleaning robot 100 may continue to rotate on the contact part of the cleaning robot 100.

If both sides of the front part of the cleaning robot 100 contact the obstacle O ("Yes" in operation 1130), the cleaning robot 100 may move backwards and forwards predetermined times, in operation 1140.

At an edge of a floor that encounters the outline of an obstacle O, dust may be easily accumulated. If the front outline of the cleaning robot 100 is aligned to the outline of an obstacle O, it is possible to effectively remove dust existing on the edge of the floor that encounters the obstacle O, through the dust suction opening 103a provided in the bottom of the sub body 103.

Accordingly, in order to effectively clean the edge of a floor that encounters the outline of an obstacle O, the cleaning robot 100 may align the outline of its front part to the outline of the obstacle O, and then repetitively move backwards and forwards.

For example, after both sides of the front part of the cleaning robot 100 contact the obstacle O, the cleaning robot 100 may move backward by a predetermined distance as shown in FIG. 18B, or for a predetermined time period.

Thereafter, the cleaning robot 100 may move toward the obstacle O so that the front outline of the cleaning robot 100 is aligned to the outline of the obstacle O, as shown in FIG. 18C.

The cleaning robot 100 may move backwards and forwards predetermined times.

As such, if the cleaning robot 100 repetitively moves backwards and forwards after the front outline of the cleaning robot 100 is aligned to the outline of the obstacle O, it is possible to more effectively remove dust existing on the edge of the floor that encounters the obstacle O, through the dust suction opening 103*a* provided in the bottom of the sub body 103.

FIG. 19 is a flowchart illustrating still another example of an outline alignment method 1200 of the cleaning robot 100 according to an embodiment of the present disclosure, FIG. 20 shows the cleaning robot 100 that calculates a radius of rotation according to the outline alignment method 1200 illustrated in FIG. 19, and FIGS. 21A and 21B show the cleaning robot 100 that performs the outline alignment method 1200 illustrated in FIG. 19.

Hereinafter, still another example of an outline alignment method 1200 of the cleaning robot 100 will be described with reference to FIGS. 19 to 21B. In the following description, descriptions about the same operations of the cleaning robot 100 as described above will be briefly given.

The cleaning robot 100 may sense an obstacle O ahead, in operation 1210.

The cleaning robot 100 may sense an obstacle O ahead using the obstacle sensor 140.

As described above, the obstacle sensor 140 may emit light such as infrared light forward from the cleaning robot 100, and receive reflection light reflected from an obstacle O to thereby sense the obstacle O. Also, the controller 110 of the cleaning robot 100 may calculate a distance to the obstacle O according to a reflection light image acquired through the image sensor 143*b*.

If an obstacle O is sensed in front of the cleaning robot 100 ("Yes" in operation 1210), the cleaning robot 100 may detect a distance d to the obstacle O, and an angle θ of the outline of the obstacle O with respect to a movement direction of the cleaning robot 100, in operation 1220.

More specifically, the controller 110 of the cleaning robot 100 may calculate a distance d to the obstacle O located in front of the cleaning robot 100 using the obstacle sensor 140.

As described above, the controller 110 may calculate a distance d to the obstacle O, based on a reflection light image created on the image sensor 143*b* of the obstacle sensor 140 by light reflected from the obstacle O.

Also, the controller 110 may calculate an angle θ of the outline of the obstacle O with respect to a movement direction of the cleaning robot 100, using the obstacle sensor 140.

For example, as shown in FIG. 20A, the controller 110 may divide the forward area of the cleaning robot 100 into a plurality of regions R1, R2, . . . , R10, and calculate distances from the cleaning robot 100 to the obstacle O in the individual regions R1, R2, . . . , R10 using the obstacle sensor 140.

Thereafter, the controller 110 may calculate an angle θ of the obstacle O with respect to a movement direction of the cleaning robot 100, based on the distances from the cleaning robot 100 to the obstacle O in the individual regions R1, R2, . . . , R10, as shown in FIG. 20B.

Thereafter, the cleaning robot 100 may calculate a radius R of rotational driving and a center C of rotational driving, in order to align the front outline of the cleaning robot 100 to the outline of the obstacle O, in operation 1230.

At this time, the controller 110 may calculate a radius R of rotational driving and a center C of rotational driving for aligning the front outline of the cleaning robot 100 to the outline of the obstacle O, based on the distance d between the cleaning robot 100 and the obstacle O, the angle θ of the outline of the obstacle O with respect to the movement direction of the cleaning robot 100, and a pre-stored distance h between the bumper 151 and the drive wheels 163*a* and 163*b*.

If the cleaning robot 100 rotates on the center C of rotational driving, both sides of the front part of the cleaning robot 100 may contact the obstacle O so that the cleaning robot 100 can be aligned to the outline of the obstacle O.

Thereafter, the cleaning robot 100 may rotate on the calculated center C of rotational driving, in operation 1240.

More specifically, the controller 110 may control the driving unit 160 so that the cleaning robot 200 reduces driving speed and rotates on the center C of rotational driving calculated in operation 1230, as shown in FIG. 21A.

The driving unit 160 may move the left drive wheel 163*a* and the right drive wheel 163*b* to different positions according to the radius R of rotational driving.

For example, if the center C of rotational driving is located to the right of the cleaning robot 100, as shown in FIG. 21A, the driving unit 160 may make rotation speed of the left drive wheel 163*a* higher than rotation speed of the right drive wheel 163*b*. Also, if the radius R of rotational driving is great, the driving unit 160 may decrease a difference between rotation speed of the left drive wheel 163*a* and rotation speed of the right drive wheel 163*b*, and if the radius R of rotational driving is small, the driving unit 160 may increase a difference between rotation speed of the left drive wheel 163*a* and rotation speed of the right drive wheel 163*b*.

During the rotational driving, the cleaning robot 100 may determine whether a distance to the obstacle O is shorter than a reference distance, in operation 1242.

As described above, the cleaning robot 100 may sense an obstacle O ahead using the obstacle sensor 140, and calculate a distance to the obstacle O.

The cleaning robot 100 may compare the distance to the obstacle O to a reference distance to determine whether the distance to the obstacle O is shorter than the reference distance.

The reference distance may depend on a driving speed of the cleaning robot 100. The reference distance may be set to an appropriate distance required for sufficiently reducing a driving speed of the cleaning robot 100. For example, the reference distance may be decided within a range from 10 cm to 12 cm according to the driving speed of the cleaning robot 100.

If the distance to the obstacle O is not shorter than the reference distance ("No" in operation 1242), the cleaning robot 100 may continue rotational driving.

If the distance to the obstacle O is shorter than the reference distance ("Yes" in operation 1242), the cleaning robot 100 may continue rotational driving while reducing the driving speed, in operation 1244.

In order to minimize an impact that is applied to the cleaning robot 100 due to a contact of the cleaning robot 100 to the obstacle O, the cleaning robot 100 may reduce its driving speed, as shown in FIG. 21B.

For example, if the cleaning robot 100 approaches an obstacle O within the reference distance when travelling at a first speed for cleaning, the cleaning robot 100 may reduce the first speed to a second speed that is lower than the first speed.

The controller 110 of the cleaning robot 100 may control the driving unit 160 to reduce a rotation speed of the wheel driving motor 161.

While the cleaning robot 100 reduces the speed, the driving speed of the cleaning robot 100 may have various profiles.

For example, when a distance between the cleaning robot 100 and an obstacle O is shorter than the reference distance, the cleaning robot 100 may reduce a driving speed to a second speed, and maintain the second speed until the front part of the cleaning robot 100 contacts the obstacle O.

As another example, when a distance between the cleaning robot 100 and an obstacle O is shorter than a reference distance, the cleaning robot 100 may reduce a driving speed stepwisely. In other words, if a distance between the cleaning robot 100 and an obstacle O reaches a first reference distance, the cleaning robot 100 may reduce a driving speed to a second driving speed, if a distance between the cleaning robot 100 and the obstacle O reaches a second reference distance, the cleaning robot 100 may reduce the second driving speed to a third driving speed, and if a distance between the cleaning robot 100 and the obstacle O reaches a third reference distance, the cleaning robot 100 may reduce the third driving speed to a fourth driving speed.

As another example, when a distance between the cleaning robot 100 and an obstacle O is shorter than a reference distance, the cleaning robot 100 may reduce a driving speed gradually until the cleaning robot 100 contacts the obstacle O. In other words, the cleaning robot 100 may reduce a driving speed linearly according to a distance between the cleaning robot 100 and an obstacle O.

As such, by reducing the driving speed of the cleaning robot 100, it is possible to minimize an impact that is applied to the cleaning robot 100 when the cleaning robot 100 contacts an obstacle O.

Thereafter, the cleaning robot 100 may determine whether it contacts an obstacle O, in operation 1250.

As described above in operation 1010 of FIG. 15, the cleaning robot 100 may sense a contact to the obstacle O, based on a contact sensed signal from the contact sensor 150 or rotations of the drive wheels 163*a* and 163*b*.

If no contact to the obstacle O is sensed ("No" in operation 1250), the cleaning robot 100 may continue to rotate on the center C of rotational driving.

If a contact to the obstacle O is sensed ("Yes" in operation 1250), the cleaning robot 100 may move while rotating on the contact part of the cleaning robot 100 contacting the obstacle O, in operation 1260.

As described above in operation 1020 of FIG. 15, the cleaning robot 100 may determine the contact part of the cleaning robot 100, based on a contact sensed signal from the contact sensor 150 or rotations of the drive wheels 163*a* and 163*b*, and rotate on the contact part of the cleaning robot 100 to align the front outline of the cleaning robot 100 to the outline of the obstacle O.

Thereafter, the cleaning robot 100 may determine whether both sides of the front part of the cleaning robot 100 contact the obstacle O, in operation 1270.

As described above in operation 1030 of FIG. 15, the cleaning robot 100 may determine whether both sides of the front part of the cleaning robot 100 contact the obstacle O, based on a contact sensed signal from the contact sensor 150 or rotations of the drive wheels 163*a* and 163*b*.

If one side of the front part of the cleaning robot 100 contacts the obstacle O ("No" in operation 1270), the cleaning robot 100 may continue to rotate on the contact part of the cleaning robot 100.

If both sides of the front part of the cleaning robot 100 contact the obstacle O ("Yes" in operation 1270), the cleaning robot 100 may terminate outline alignment (1200).

As such, if the cleaning robot 100 contacts an obstacle O after sensing the obstacle O, the cleaning robot 100 can perform preparation operation for aligning the front outline of the cleaning robot 100 to the outline of the obstacle O before contacting the obstacle O, and reduce a time taken to perform outline alignment through the preparation operation.

Also, if the cleaning robot 100 senses an obstacle O and reduces a speed before contacting the obstacle O, an impact that is applied to the cleaning robot 100 when the cleaning robot 100 contacts the obstacle O can be reduced.

However, outline alignment is not always performed whenever an obstacle O is sensed. If outline alignment is performed when the width of an obstacle O is narrower than a reference width or when the outline of an obstacle O is uneven, cleaning efficiency may be degraded. In this case, no outline alignment may be performed.

FIG. 22 is a flowchart illustrating an example of a method 1300 in which the cleaning robot 100 according to an embodiment of the present disclosure determines whether to perform outline alignment, FIG. 23 shows the cleaning robot 100 that performs outline alignment according to the method 1300 illustrated in FIG. 22, and FIG. 24 shows the cleaning robot 100 that does not perform outline alignment according to the method 1300 illustrated in FIG. 22.

Hereinafter, an example of a method 1300 of determining whether to perform outline alignment will be described with reference to FIGS. 22, 23, and 24. In the following description, descriptions about the same operations of the cleaning robot 100 as described above will be briefly given.

The cleaning robot 100 may determine whether an obstacle O is sensed in front of the cleaning robot 100, in operation 1310.

As described above in operation 1210 of FIG. 19, the cleaning robot 100 may sense an obstacle O ahead using the obstacle sensor 140.

More specifically, the obstacle sensor 140 may emit light such as infrared light forward from the cleaning robot 100, and determine existence of reflection light reflected from an obstacle O to thereby detect existence of an obstacle O. Also, the obstacle sensor 140 may calculate a distance to the obstacle O according to a location of a reflection light image created on the image sensor 143*b*.

If an obstacle O is sensed in front of the cleaning robot 100 ("Yes" in operation 1310), the cleaning robot 100 may determine whether the width of the obstacle O is wider than a reference width w, in operation 1320.

The cleaning robot 100 may determine whether the width of the obstacle O is wider than a reference width w, using the obstacle sensor 140.

For example, the controller 110 may divide a forward area of the cleaning robot 100 into a plurality of regions, and detect the number of regions from which the obstacle O is detected.

More specifically, the controller 110 may divide a forward area of the cleaning robot 100 into 10 regions R1, R2, ..., R10. At this time, a sum of the widths of 6 regions among the 10 regions R1, R2, ..., R10 may be set to the reference width w.

Thereafter, the controller 110 may determine whether the obstacle O is detected from the individual regions R1, R2, ..., R10, and if the number of regions from which the obstacle O is detected is 6 or more, the controller 110 may determine that the width of the obstacle O is wider than the reference width w. Also, if the number of regions from which the obstacle O is detected is less than 6, the controller 110 may determine that the width of the obstacle O is narrower than the reference width w.

As another example, the cleaning robot 100 may acquire a reflection light image reflected from an obstacle O through the image sensor 143*b* of the obstacle sensor 140, calculate a width of the obstacle O based on the reflection light image, and compare the width of the obstacle O to the reference width w.

If the width of the obstacle O is wider than the reference width w ("Yes" in operation 1320), the cleaning robot 100 may perform outline alignment, in operation 1330.

For example, as shown in FIG. 23A, if an obstacle O is detected from 6 regions or more among the 10 regions R1, R2, ..., R10 divided from the forward area of the cleaning robot 100, the cleaning robot 100 may perform outline alignment of aligning the front outline of the cleaning robot 100 to the outline of the obstacle O, as shown in FIG. 23B.

More specifically, the cleaning robot 100 may perform outline alignment 1000, 1100, and 1200 as shown in FIG. 15, 17, or 19.

If the width of the obstacle O is narrower than the reference width w ("No" in operation 1320), the cleaning robot 100 may perform operation of avoiding the obstacle O, in operation 1340.

For example, if an obstacle O is detected from 6 regions or less among the 10 regions R1, R2, ..., R10 divided from the forward area of the cleaning robot 100, as shown in FIG. 24A, the cleaning robot 100 may perform outline following operation of moving along the outline of the obstacle O, as shown in FIG. 24B.

As another example, if an obstacle O is detected from 6 regions or less among the 10 regions R1, R2, ..., R10 divided from the forward area of the cleaning robot 100, as shown in FIG. 24A, the cleaning robot 100 may change its movement direction to perform outline bouncing operation of moving in an arbitrary direction.

There is high probability that an obstacle having a width that is narrower than the reference width w is a leg or the like of furniture, and there is low probability that dust is accumulated around the outline of the leg or the like of furniture.

Also, when the width of an obstacle O is significantly smaller than the width of the cleaning robot 100, cleaning efficiency does not greatly increase although outline alignment is performed.

For this reason, if the width of an obstacle O is narrower than the reference width w, the cleaning robot 100 may avoid the obstacle O quickly without performing outline alignment, thereby improving cleaning efficiency.

FIG. 25 is a flowchart illustrating another example of a method 1400 in which the cleaning robot 100 according to an embodiment of the present disclosure determines whether to perform outline alignment, FIG. 26 shows the cleaning robot 100 that performs outline alignment according to the method 1400 illustrated in FIG. 25, FIGS. 27 and 28 show the cleaning robot 100 that does not perform outline alignment according to the method 1400 illustrated in FIG. 25.

Hereinafter, another example of a method 1400 of determining whether to perform outline alignment will be described with reference to FIGS. 25 to 28. In the following description, descriptions about the same operations of the cleaning robot 100 as described above will be briefly given.

The cleaning robot 100 may determine whether an obstacle O is sensed in front of the cleaning robot 100, in operation 1410.

The cleaning robot 100 may determine whether an obstacle O is sensed ahead, using the obstacle sensor 140, as described above in operation 1210 of FIG. 19.

More specifically, the obstacle sensor 140 may emit light such as infrared light forward from the cleaning robot 100, and determine existence of reflection light reflected from an obstacle O to thereby detect existence of an obstacle O. Also, the obstacle sensor 140 may calculate a distance to the obstacle O according to a location of a reflection light image created on the image sensor 143*b*.

If an obstacle O is sensed in front of the cleaning robot 100 ("Yes" in operation 1410), the cleaning robot 100 may detect the outline of the obstacle O, in operation 1420.

The cleaning robot 100 may detect the outline of the obstacle O, using the obstacle sensor 140.

For example, as shown in FIGS. 26A, 27A, and 28A, the controller 110 may divide a forward area of the cleaning robot 100 into a plurality of regions R1, R2, ..., R10, and calculate distances between the cleaning robot 100 and the obstacle O in the individual regions R1, R2, ..., R10, using the obstacle sensor 140.

Also, the controller 110 may detect the outline L1 of the obstacle O based on the calculated distances between the cleaning robot 100 and the obstacle O in the individual regions R1, R2, ..., R10, as shown in FIGS. 26B, 27B, and 28B.

Thereafter, the cleaning robot 100 may determine whether the outline L1 of the obstacle O is even, in operation 1430.

More specifically, in order to determine whether the outline L1 of the obstacle O is even, the controller 110 may determine straightness of the outline L1 of the obstacle O, and determine whether the straightness of the outline L1 of the obstacle O is within a predetermined range. Herein, the straightness means a degree at which the outline of a section of an object deviates from a straight line, and the greater degree of deviation, the greater straightness.

In other words, the controller 110 may determine whether the outline L1 of the obstacle O is even, according to a degree at which the outline L1 of the obstacle O deviates from a straight line L2.

For example, the controller 110 may calculate an approximating line L2 based on the calculated distances between the obstacle O and the cleaning robot 100 in the individual regions R1, R2, ..., R10, as shown in FIGS. 26B, 27B, and 28B. More specifically, the controller 110 may calculate an approximating line L2 using a linear approximation method.

Also, the controller 110 may calculate differences between the distances to the obstacle O and the approximating line L2, and calculate an average value of the calculated differences.

The controller 110 may compare the average value of the calculated differences to a reference value to determine whether a straightness tolerance of the outline L1 of the obstacle O is smaller than a reference straightness tolerance. In other words, if the average value of the differences is smaller than the reference value, the controller 110 may determine that the outline of the obstacle O is even.

If the controller 110 determines that the outline of the obstacle O is even ("Yes" in operation 1430), the cleaning robot 100 may perform outline alignment, in operation 1440.

For example, if an object O having an even outline is sensed as shown in FIG. 26A, an outline L1 detected by the cleaning robot 100 may be a straight line that corresponds closely to the approximating line L2, as shown in FIG. 26B.

As such, if the outline L1 of the obstacle O detected by the cleaning robot 100 corresponds closely to the approximating line L2, the cleaning robot 100 may determine that the outline L1 of the obstacle O is even, and accordingly, the cleaning robot 100 may perform outline alignment of aligning the front outline of the cleaning robot 100 to the outline of the obstacle O, as shown in FIG. 26C.

More specifically, the cleaning robot 100 may perform outline alignment 1000, 1100, or 1200, as shown in FIG. 15, 17, or 19.

However, if the outline of the obstacle O is uneven ("No" in operation 1430), the cleaning robot 100 may perform operation of avoiding the obstacle O, in operation 1450.

For example, if an obstacle O having a round outline is sensed as shown in FIG. 27A, the outline L1 of the obstacle O detected by the cleaning robot 100 may have a shape of alphabetic character "U" as shown in FIG. 27B, and the outline L1 of the obstacle O detected by the cleaning robot 100 may deviate significantly from the approximating line L2.

As such, if the outline L1 of the obstacle O detected by the cleaning robot 100 deviates significantly from the approximating line L3, the cleaning robot 100 may determine that the outline L1 of the obstacle O is uneven, and accordingly, the cleaning robot 100 may perform outline following operation of moving along the outline of the obstacle O, as shown in FIG. 27C.

As another example, if the cleaning robot 100 moves toward an edge of an obstacle O, as shown in FIG. 28A, the outline L1 of the obstacle O detected by the cleaning robot 100 may have a shape of alphabet character "V" as shown in FIG. 28B, and the outline L1 of the obstacle O detected by the cleaning robot 100 may deviate significantly from the approximating line L2.

If the outline L1 of the obstacle O detected by the cleaning robot 100 deviates significantly from the approximating line L2, the cleaning robot 100 may determine that the outline L1 of the obstacle O is uneven, and accordingly, the cleaning robot 100 may perform outline following operation of moving along the outline of the obstacle O, as shown in FIG. 28C.

As such, when the outline of the obstacle O is uneven, the bumper 151 provided in the front part of the cleaning robot 100 does not match the outline of the obstacle O. Accordingly, although the cleaning robot 100 performs outline alignment, it is difficult to remove dust existing around the obstacle O.

For this reason, when the outline of an obstacle O is uneven, the cleaning robot 100 may avoid the obstacle O quickly without performing outline alignment, thereby improving cleaning efficiency.

FIG. 29 is a flowchart illustrating an example of a method 1500 in which the cleaning robot 100 according to an embodiment of the present disclosure cleans the perimeter of an obstacle intensively while performing outline alignment, and FIG. 30 shows the cleaning robot 100 that cleans according to the method 1500 illustrated in FIG. 29;

Hereinafter, a method 1500 in which the cleaning robot 100 cleans the perimeter of an obstacle intensively while performing outline alignment will be described with reference to FIGS. 29 and 30. In the following description, descriptions about the same operations of the cleaning robot 100 as described above will be briefly given.

The cleaning robot 100 may determine whether an obstacle O is sensed in front of the cleaning robot 100, in operation 1510.

As described above in operation 1210 of FIG. 19, the cleaning robot 100 may sense an obstacle O ahead, using the obstacle sensor 140.

More specifically, the obstacle sensor 140 may emit light such as infrared light forward from the cleaning robot 100, and receive reflection light reflected from an obstacle O to thereby sense the obstacle O. Also, the obstacle sensor 140 may calculate a distance to the obstacle O according to a location of a reflection light image created on the image sensor 143b.

If an obstacle O is sensed in front of the cleaning robot 100 ("Yes" in operation 1510), the cleaning robot 100 may determine whether a condition for outline alignment is satisfied, in operation 1520.

The condition for outline alignment is a condition for performing outline alignment as described above with reference to FIGS. 22 and 25. That is, the condition for outline alignment may include whether the width of an obstacle O is wider than a reference width w, whether the outline of an obstacle O is even, etc.

More specifically, if the width of the obstacle O is wider than or equal to the reference width w, and the outline of the obstacle O is even, the cleaning robot 100 may determine that the condition for outline alignment is satisfied, and if the width of the obstacle O is narrower than the reference width w, or the outline of the obstacle O is uneven, the cleaning robot 100 may determine that the condition for outline alignment is not satisfied.

If the cleaning robot 100 determines that the condition for outline alignment is not satisfied ("No" in operation 1520), the cleaning robot 100 may perform operation of avoiding the obstacle O, as described above, in operation 1560.

The reason is to improve cleaning efficiency by omitting unnecessary outline alignment when cleaning efficiency does not greatly increase due to outline alignment.

If the condition for outline alignment is satisfied ("Yes" in operation 1520), the cleaning robot 100 may increase a rotation speed of the drum brush 173, and increase a suction force of the dust suction module 175, in operation 1530.

More specifically, the controller 110 of the cleaning robot 100 may control the cleaning unit 170 to increase a rotation speed of the brush driving motor 171 for rotating the drum brush 173, and to increase a rotation speed of the dust suction motor (not shown) for driving the dust suction module 175.

If the rotation speed of the drum brush 173 increases, an amount of dust that is scattered into the dust suction opening 103a by the drum brush 173 may increase, and if the suction force of the dust suction module 175 increases, a larger amount of dust may be sucked into the dust cartridge 177.

When the cleaning robot 100 cleans a floor, the cleaning robot 100 may rotate the drum brush 173 at an appropriate speed, and maintain a suction force of the dust suction module 175 at an appropriate level in order to improve energy efficiency, as shown in FIG. 30A.

When the cleaning robot 100 cleans an edge of a floor that encounters an obstacle O, the cleaning robot 100 may increase a rotation speed of the drum brush 173, and increase a suction force of the dust suction module 175 in order to suck a larger amount of dust, as shown in FIG. 30B.

As a result, the cleaning robot 100 may improve cleaning efficiency in cleaning an edge of a floor that encounters an obstacle O.

Thereafter, the cleaning robot 100 may perform outline alignment, in operation 1540.

More specifically, the cleaning robot 100 may perform outline alignment 1000, 1100, or 1200, as shown in FIG. 15, 17, or 19.

If outline alignment terminates, the cleaning robot 100 may decrease the rotation speed of the drum brush 173 to its original speed, and decrease the suction force of the dust suction module 175 to its original suction force, in operation 1550.

As described above, since a larger amount of dust exists around an edge of a floor that encounters an obstacle O than the other area of the floor, cleaning efficiency can be improved by increasing a cleaning force when cleaning an edge of a floor that encounters an obstacle O.

FIG. 31 is a flowchart illustrating an example of an automatic cleaning method 2000 in which the cleaning robot 100 according to an embodiment of the present disclosure cleans a floor automatically, and FIG. 32 shows the cleaning robot 100 that cleans a floor automatically according to the automatic cleaning method 2000 illustrated in FIG. 31.

Hereinafter, an automatic cleaning method 2000 in which the cleaning robot 100 cleans a floor automatically will be described with reference to FIGS. 31 and 32. In the following description, descriptions about the same operations of the cleaning robot 100 as described above will be briefly given.

The cleaning robot 100 may perform cleaning area setting driving for setting a cleaning area, in operation 2010.

The cleaning robot 100 may travel across a floor along walls or obstacles O to check the size, shape, etc. of the floor, and divide the floor into one or more cleaning areas according to the size, shape, etc. of the floor, as shown in FIG. 32A.

Thereafter, the cleaning robot 100 may perform driving for cleaning the floor, in operation 2020.

The cleaning robot 100 may clean the floor while moving along a predetermined cleaning path as shown in FIG. 32B, or may clean the floor while moving in an arbitrary direction for a predetermined time period.

FIG. 33 is a flowchart illustrating an example of a driving method 2100 of the cleaning robot 100 according to an embodiment of the present disclosure, and FIGS. 34 and 35 show a driving path of the cleaning robot 100 according to the driving method illustrated in FIG. 33.

Hereinafter, an example of a driving method 2100 including outline alignment will be described with reference to FIGS. 33, 34, and 35. In the following description, descriptions about the same operations of the cleaning robot 100 as described above will be briefly given.

The cleaning robot 100 may perform straight driving, in operation 2110.

The controller 110 of the cleaning robot 100 may control the driving unit 140 so that the cleaning robot 100 performs straight driving at a predetermined speed, as shown in FIG. 34A. More specifically, the controller 110 may control the driving unit 160 to rotate the left and right drive wheels 163a and 163b at the same speed in the same direction.

Thereafter, the cleaning robot 100 may determine whether an obstacle O is sensed in front of the cleaning robot 100, in operation 2120.

The obstacle sensor 140 may emit light such as infrared light forward from the cleaning robot 100, and receive reflection light reflected from an obstacle O to thereby sense the obstacle O. Also, the obstacle sensor 140 may calculate a distance to the obstacle O according to a location of a reflection light image created on the image sensor 143b.

If no obstacle O is sensed in front of the cleaning robot 100 ("No" in operation 2120), the cleaning robot 100 may continue to perform straight driving.

However, if an obstacle O is sensed in front of the cleaning robot 100 ("Yes" in operation 2120), the cleaning robot 100 may perform outline alignment, in operation 2130.

Although not shown in the drawings, the cleaning robot 100 may determine whether a condition for outline alignment is satisfied, before performing outline alignment. More specifically, the cleaning robot 100 may determine whether the width of the obstacle O is wider than a reference width w, or whether the outline of the obstacle O is even.

If the condition for outline alignment is satisfied, the cleaning robot 100 may perform outline alignment. In the following description, for easy understanding, it is assumed that the condition for outline alignment is satisfied, and the cleaning robot 100 performs outline alignment.

If the condition for outline alignment is satisfied, the cleaning robot 100 may move backward by a first distance d1, in operation 2140.

More specifically, if the front outline of the cleaning robot 100 is aligned to the outline of the obstacle O, the cleaning robot 100 may move backward by the first distance d1, as shown in FIG. 34B.

The first distance d1 may be greater than a difference between a maximum length h' from the center of the cleaning robot 100 to the outline of the cleaning robot 100 and a length h from the center of the cleaning robot 100 to the front bumper 151 of the cleaning robot 100, so that the cleaning robot 100 can rotate at the same place without colliding with the obstacle O.

As another example, if a length from the center of the cleaning robot 100 to the front bumper 151 of the cleaning robot 100 is h, the first distance d1 may be set to $(\sqrt{2}-1) \times h$.

Thereafter, the cleaning robot 100 may rotate by about 90 degrees in a first rotation direction (clockwise or counterclockwise) at the same place, in operation 2150.

The controller 110 of the cleaning robot 100 may control the driving unit 160 so that the cleaning robot 100 rotates by about 90 degrees at the same place, as shown in FIG. 34C. More specifically, the controller 110 may control the driving unit 160 to rotate the left drive wheel 163a and the right drive wheel 163b at the same rotation speed in opposite directions.

Thereafter, the cleaning robot 100 may follow the outline of the obstacle O by a second distance d2, in operation 2160. That is, the cleaning robot 100 may move by the second distance d2 parallel to the outline of the obstacle O.

After the outline alignment is performed, a movement direction of the cleaning robot 100 may be perpendicular to the outline of the obstacle O. Accordingly, if the cleaning robot 100 moves backward by a short distance, and then rotates by about 90 degrees at the same place, a movement direction of the cleaning robot 100 may become parallel to the outline of the obstacle O, as shown in FIG. 34D.

As such, just after the outline alignment is performed, the cleaning robot 100 may be aligned in a direction that is parallel to the outline of the obstacle O, and follow the outline of the obstacle O. In other words, when following the outline of the obstacle O, the cleaning robot 100 can move parallel to the outline of the obstacle O without performing initial stabilization for moving parallel to the outline of the obstacle O.

Also, the second distance d2 may be the length of the drum brush 163 of the cleaning robot 100 or the width of the cleaning robot 100. If the second distance d2 is set to the length of the drum brush 163 of the cleaning robot 100 or the width of the cleaning robot 100, an area that is to be cleaned by the cleaning robot 100 through the next straight driving may overlap an area cleaned by the cleaning robot 100 through the previous straight driving.

Thereafter, the cleaning robot 100 may rotate by about 90 degrees in a first rotation direction (clockwise or counterclockwise) at the same place, in operation 2170.

The controller 110 of the cleaning robot 100 may control the driving unit 160 so that the cleaning robot 100 rotates by about 90 degrees in the first rotation direction at the same place.

Herein, the first rotation direction may be the same as the first rotation direction in which the cleaning robot 100 rotates in operation 2150.

Since the cleaning robot 100 rotates by 90 degrees after following the outline of the obstacle O, the cleaning robot 100 may face the opposite direction of the obstacle O.

Thereafter, the cleaning robot 100 may perform straight driving as in operation 2110.

By repeatedly performing the driving method 2100, the cleaning robot 100 may travel across a floor in a zigzag pattern to clean the floor, as shown in FIG. 35.

As described above, since the cleaning robot 100 performs outline alignment during cleaning in a zigzag pattern, the cleaning robot 100 may clean an edge of a floor that encounters an obstacle O.

Also, the cleaning robot 100 may follow the outline of an obstacle O during cleaning in the zigzag pattern, without performing initial stabilization of making a driving direction parallel to the outline of the obstacle O.

FIG. 36 is a flowchart illustrating another example of a driving method 2200 of the cleaning robot 100 according to an embodiment of the present disclosure, and FIGS. 37 and 38 show a driving path of the cleaning robot 100 according to the driving method 2200 illustrated in FIG. 36.

Hereinafter, another example of a driving method 2200 including outline alignment will be described with reference to FIGS. 36, 37, and 38. In the following description, descriptions about the same operations of the cleaning robot 100 as described above will be briefly given.

The cleaning robot 100 may perform straight driving, in operation 2210.

The controller 110 of the cleaning robot 100 may control the driving unit 140 so that the cleaning robot 100 performs straight driving at a predetermined speed.

Thereafter, the cleaning robot 100 may determine whether an obstacle O is sensed in front of the cleaning robot 100, in operation 2220.

The obstacle sensor 140 may emit light such as infrared light forward from the cleaning robot 100, and receive reflection light reflected from an obstacle O to thereby sense the obstacle O. Also, the controller 110 of the cleaning robot 100 may calculate a distance to the obstacle O according to a location of a reflection light image created on the image sensor 143*b*.

If no obstacle O is sensed in front of the cleaning robot 100 ("No" in operation 2220), the cleaning robot 100 may continue to perform straight driving.

If an obstacle O is sensed in front of the cleaning robot 100 ("Yes" in operation 2220), the cleaning robot 100 may perform outline alignment, in operation 2230.

If a condition for outline alignment is satisfied as described above, the cleaning robot 100 may perform outline alignment.

After the outline alignment is completed, the cleaning robot 100 may move backward by a third distance d3, in operation 2240.

More specifically, if the front outline of the cleaning robot 100 is aligned to the outline of the obstacle O, the cleaning robot 100 may move backward by the third distance d3, as shown in FIG. 37A.

Also, the third distance d3 may be set to a distance within which the obstacle sensor 140 can sense an obstacle O, so that the cleaning robot 100 can perform outline alignment later.

Thereafter, the cleaning robot 100 may rotate in a first rotation direction (clockwise or counterclockwise) at the same place, in operation 2250.

The controller 110 of the cleaning robot 100 may control the driving unit 160 so that the cleaning robot 100 rotates at the same place.

Also, an angle at which the cleaning robot 100 rotates at the same place may be smaller than 90 degrees, as shown in FIG. 37B. That is, the front part of the cleaning robot 100 may still face the obstacle O even after the cleaning robot 100 rotates at the same place, so that the cleaning robot 100 can perform outline alignment later.

Thereafter, the cleaning robot 100 may perform outline alignment, in operation 2260.

As described above, if a condition for outline alignment is satisfied, the cleaning robot 100 may perform outline alignment.

The cleaning robot 100 may perform outline alignment at a location that is adjacent to a location at which outline alignment has been performed in operation 2240, as shown in FIG. 37C. Also, a distance between a location at which outline alignment is performed in operation 2240 and a location at which outline alignment is performed in operation 2260 may be the width of the drum brush 173 or the width of the cleaning robot 100.

After the outline alignment is completed, the cleaning robot 100 may move backward by a fourth distance d4, in operation 2270.

More specifically, if the front outline of the cleaning robot 100 is aligned to the outline of the obstacle O, the cleaning robot 100 may move backward by the fourth distance d4, as shown in FIG. 37D.

The fourth distance d4 may be greater than a difference between a maximum length h' from the center of the cleaning robot 100 to the outline of the cleaning robot 100 and a length h from the center of the cleaning robot 100 to the front bumper 151 of the cleaning robot 100, so that the cleaning robot 100 can rotate at the same place without colliding with the obstacle O.

Thereafter, the cleaning robot 100 may rotate at the same place by about 180 degrees in an arbitrary direction, in operation 2280.

The controller 110 of the cleaning robot 100 may control the driving unit 160 so that the cleaning robot 100 rotates by about 180 degrees at the same place, as shown in FIG. 37D.

Since the cleaning robot 100 rotates by 180 degrees after outline alignment of aligning the front outline of the cleaning robot 100 to the outline of the obstacle O is performed, the cleaning robot 100 may face the opposite direction of the obstacle O, as shown in FIG. 37D.

Thereafter, the cleaning robot 100 may perform straight driving as in operation 2210.

By repeatedly performing the driving method 2200, the cleaning robot 100 may travel across a floor in a zigzag pattern to clean the floor, as shown in FIG. 38.

As described above, since the cleaning robot 100 performs outline alignment during cleaning in a zigzag pattern, the cleaning robot 100 may clean an edge of a floor that encounters an obstacle O.

Particularly, by performing, when an obstacle O is found, outline alignment parallel to the obstacle O two times, the cleaning robot 100 may effectively clean an edge of a floor that encounters the obstacle O.

FIG. 39 is a flowchart illustrating still another example of a driving method 2300 of the cleaning robot 100 according to an embodiment of the present disclosure, and FIGS. 40 and 41 show a driving path of the cleaning robot 100 according to the driving method 2300 illustrated in FIG. 39.

Hereinafter, another example of a driving method 2300 including outline alignment will be described with reference to FIGS. 39 to 41. In the following description, descriptions about the same operations of the cleaning robot 100 as described above will be briefly given.

The cleaning robot 100 may perform straight driving, in operation 2310.

The controller 110 of the cleaning robot 100 may control the driving unit 140 so that the cleaning robot 100 performs straight driving at a predetermined speed.

Thereafter, the cleaning robot 100 may determine whether an obstacle O is sensed in front of the cleaning robot 100, in operation 2320.

The obstacle sensor 140 may emit light such as infrared light forward from the cleaning robot 100, and receive reflection light reflected from an obstacle O to thereby sense the obstacle O. Also, the obstacle sensor 140 may calculate a distance to the obstacle O according to a location of a reflection light image created on the image sensor 143b.

If no obstacle O is sensed in front of the cleaning robot 100 ("No" in operation 2320), the cleaning robot 100 may continue to perform straight driving.

If an obstacle O is sensed in front of the cleaning robot 100 ("Yes" in operation 2320), the cleaning robot 100 may perform outline alignment, in operation 2330.

If a condition for outline alignment is satisfied, the cleaning robot 100 may perform outline alignment as shown in FIG. 40A.

After the outline alignment is completed, the cleaning robot 100 may move backward by a fifth distance d5, in operation 2340.

More specifically, after the front outline of the cleaning robot 100 is aligned to the outline of the obstacle O, the cleaning robot 100 may move backward by the fifth distance d5 as shown in FIG. 40B.

Herein, the fifth distance d5 may be greater than a difference between a maximum length h' from the center of the cleaning robot 100 to the outline of the cleaning robot 100 and a length h from the center of the cleaning robot 100 to the front bumper 151 of the cleaning robot 100, so that the cleaning robot 100 can rotate at the same place without colliding with the obstacle O.

Thereafter, the cleaning robot 100 may rotate at an arbitrary angle in an arbitrary direction at the same place, in operation 2350.

The controller 110 of the cleaning robot 100 may control the driving unit 150 so that the cleaning robot 100 rotates at the same place, as shown in FIG. 40C. More specifically, the controller 110 may control the driving unit 160 to rotate the left drive wheel 163a and the right drive wheel 163b at the same rotation speed in opposite directions.

Since the cleaning robot 100 rotates at an arbitrary angle in an arbitrary direction, the cleaning robot 100 can perform straight driving in an arbitrary direction, later.

Thereafter, the cleaning robot 100 may perform straight driving as in operation 2310, as shown in FIG. 40D.

By repeatedly performing the driving method 2300, the cleaning robot 100 may travel across a floor in an arbitrary pattern to clean the floor, as shown in FIG. 41.

The cleaning robot 100 may travel across the floor in the arbitrary pattern for a predetermined time period to clean the floor.

FIG. 42 is a flowchart illustrating another example of an automatic cleaning method 3000 in which the cleaning robot 100 according to an embodiment of the present disclosure cleans a floor automatically, and FIG. 43 shows the cleaning robot that cleans a floor automatically according to the automatic cleaning method 3000 illustrated in FIG. 42.

Hereinafter, an automatic cleaning method 3000 in which the cleaning robot 100 cleans a floor automatically will be described with reference to FIGS. 42 and 43. In the following description, descriptions about the same operations of the cleaning robot 100 as described above will be briefly given.

The cleaning robot 100 may perform cleaning area setting driving for setting a cleaning area, in operation 3010.

The cleaning robot 100 may travel across a floor along walls or obstacles O to check the size, shape, etc. of the floor, and divide the floor into one or more cleaning areas according to the size, shape, etc. of the floor.

Thereafter, the cleaning robot 100 may perform first driving for cleaning the floor, in operation 3020, and then perform second driving for cleaning the floor, in operation 3030.

The cleaning robot 100 may perform the first driving as shown in FIG. 43A, and then perform the second driving as shown in FIG. 43B.

As shown in FIGS. 43A and 43B, the first driving and the second driving may be driving in a zigzag pattern for cleaning, and the direction of the first driving is perpendicular to the direction of the second driving.

For example, the first driving may be driving in an x-axis direction for cleaning. After driving in the x-axis direction is completed one time, the cleaning robot 100 may shift in an y-axis direction, and then again perform driving in the x-axis direction.

In contrast, the second driving may be driving in an y-axis direction for cleaning. After driving in the y-axis direction is completed one time, the cleaning robot 100 may shift in an x-axis direction, and then again perform driving in the y-axis direction.

As such, by performing the first driving for cleaning and the second driving for cleaning, wherein the direction of the first driving for cleaning is perpendicular to the direction of the second driving for cleaning, the cleaning robot 100 may clean the floor thoroughly while effectively cleaning an edge of the floor that encounters the obstacle O.

FIG. 44 is a flowchart illustrating an example of a return method 4000 in which the cleaning robot 100 according to an embodiment of the present disclosure returns to a charging station, and FIG. 45 shows the cleaning robot that returns to a charging station according to the return method 4000 illustrated in FIG. 44.

Hereinafter, a return method 4000 in which the cleaning robot 100 returns to a charging station CS will be described with reference to FIGS. 44 and 45.

The cleaning robot 100 may determine whether a return command is input by a user, or whether low power is sensed, in operation 4010.

A user may input a return command for returning to the charging station CS to the cleaning robot 100, through a return button included in the user interface 120.

Also, the cleaning robot 100 may detect an output voltage from a battery (not shown) for supplying power to various components included in the cleaning robot 100, and determine, if the output voltage from the battery is lower than a reference voltage, that low power is sensed.

If a return command is received, or if low power is sensed ("Yes" in operation 4010), the cleaning robot 100 may deactivate outline alignment, in operation 4020.

If an obstacle O is sensed during driving for cleaning, the cleaning robot 100 may perform outline alignment to improve cleaning efficiency.

However, if the cleaning robot 100 performs outline alignment while returning to the charging station CS, power may be unnecessarily consumed, and the cleaning robot 100 may return to the charging station CS late.

For these reasons, the cleaning robot 100 may deactivate outline alignment when returning to the charging station CS.

Thereafter, the cleaning robot 100 may return to the charging station CS, in operation 4030.

When returning to the charging station CS, the cleaning robot 100 may perform no outline alignment even when an obstacle O is sensed, and return to the charging station CS along the outline of the obstacle O, as shown in FIG. 45.

As described above, the cleaning robot 100 may deactivate outline alignment when returning to the charging station CS, thereby quickly returning to the charging station CS.

FIG. 46 shows an external appearance of a cleaning robot 200 according to another embodiment of the present disclosure, FIG. 47 shows a bottom of the cleaning robot 200 according to another embodiment of the present disclosure, FIG. 48 shows the inside of a main body of the cleaning robot 200 according to another embodiment of the present disclosure, and FIG. 49 shows the insides of the main body and a sub body of the cleaning robot according to another embodiment of the present disclosure.

Referring to FIGS. 46 to 49, the cleaning robot 200 may include a main body 201, a sub body 203, a camera module 207, a step sensing module 209, an input unit 210, a display unit 220, a cyclone separator 251, a filter 253, a suction motor 255, a brush driving motor 261, a drum brush 263, wheel driving motors 271, and driving drive wheels 273.

As shown in FIG. 46, the main body 201 may be in the shape of a nearly semi-circular pillar, and the sub body 203 may be in the shape of a rectangle, although the shapes of the main body 201 and the sub body 203 are not limited to these.

Also, components for performing functions of the cleaning robot 200 may be installed in the inside and outside of the main body 201 and the sub body 203.

The camera module 207, which is used to acquire images about surroundings of the cleaning robot 200, may be disposed on the upper surface of the sub body 203 to acquire images about surroundings of the cleaning robot 100.

The camera module 207 may include a lens to focus light emitted upward from the cleaning robot 200, and an image sensor to convert light into an electrical signal. The image sensor may be a CMOS sensor or a CCD sensor.

Also, the camera module 207 may convert an image about surroundings of the cleaning robot 200 into an electrical signal that can be processed by the controller 290, and transfer the electrical signal corresponding to the image to the controller 290. The image may be used by the controller 290 to detect a location of the cleaning robot 200.

The step sensing module 209 may be disposed on the bottom of the sub body 203 to emit infrared light or ultrasonic waves toward a floor and detect infrared light or ultrasonic waves reflected from the floor.

More specifically, the step sensing module 209 may transfer information about the intensity of infrared light (or ultrasonic waves) reflected from the floor, or information about a time period taken to detect infrared light (or ultrasonic waves) reflected after the infrared light (or ultrasonic waves) is emitted, to the controller 290.

The controller 290 may determine existence of a step, based on the intensity of infrared light (or ultrasonic waves) reflected from the floor or the time period taken to detect infrared light (or ultrasonic waves) reflected after the infrared light (or ultrasonic waves) is emitted. For example, if the intensity of infrared light (or ultrasonic waves) reflected from the floor is lower than reference intensity, the controller 290 may determine that a step exists, and if a time period taken to detect infrared light (or ultrasonic waves) reflected after infrared light is emitted is longer than a predetermined time period, the controller 290 may determine that a step exists.

The input unit 210 may be disposed on the outer surface of the cleaning robot 200 to receive various control commands from a user.

The input unit 210 may include a power button 210a to turn on/off the cleaning robot 200, a start/stop button 210b to start or stop operating the cleaning robot 200, and a return button 210c to return the cleaning robot 200 to a charging station (not shown). Each of the buttons 210a, 210b, and 210c may be a push switch or a membrane switch to generate an input signal according to a pressure from a user, or a touch switch to generate an input signal according to a contact of a user's body part.

The display unit 220 may display information about various operations of the cleaning robot 200.

Also, the display unit 220 may display information of the cleaning robot 200 in response to a control command input by a user. For example, the display unit 220 may display an operation state of the cleaning robot 100, a power on/off state of the cleaning robot 100, a cleaning mode selected by a user, information about returning to a charging station, etc.

Also, the display unit 220 may be a LED display or an OLED display capable of self-light emitting, or a LCD with a separate light source.

The cyclone separator 251 may be installed in the main body 201 to separate dust from air entered through the dust suction opening 205 and transfer the air to the filter 253. More specifically, the cyclone separator 251 may be installed in a dust collecting unit 257 of the main body 201.

The cyclone separator 251 may separate dust from air entered through the dust suction opening 205 via a dust guide pipe 265, and transfer the air to the filter 253. The air transferred to the filter 253 may be discharged to the outside.

The filter 253 may filter out dust from the air separated by the cyclone separator 251, and discharge only air to the outside.

The suction motor 255 may generate a suction force in order to collect dust entered through the dust suction opening 251 in the dust collecting unit 257. Although not shown in the drawings, the cleaning robot 200 may further include a dust suction fan (not shown) that is rotated by the suction motor 255 to generate a suction force, in order to suck dust into the dust collecting unit 257.

The brush driving motor 261 may be disposed adjacent to the drum brush 263 to rotate the drum brush 263 according to a cleaning control signal from the controller 290.

As shown in FIG. 47, the drum brush 263 may be disposed in the dust suction opening 205 formed in the bottom of the sub body 203, and rotate on a rotating shaft that is disposed horizontally to the bottom of the sub body 203 to scatter dust existing on a floor into the dust suction opening 205.

The drive wheels 273 may be disposed at both sides of the bottom of the main body 201, and may include a left drive wheel disposed to the left of the cleaning robot 200 and a right drive wheel disposed to the right of the cleaning robot 200, when seen from the front part of the cleaning robot 200.

Also, the drive wheels 273 may receive rotating forces from the wheel driving motors 271 to move the cleaning robot 200.

The wheel driving motors 271 may generate rotating forces for rotating the drive wheels 273, and include a left driving motor 271 to rotate the left drive wheel 273, and a right driving motor 271 to rotate the right drive wheel 273.

The left and right driving motors 271 may receive driving control signals from the controller 290, respectively, to operate independently.

The left drive wheel 273 and the right drive wheel 273 can rotate independently by the left driving motor 271 and the right driving motor 271 that operate independently.

Also, since the left drive wheel 273 and the right drive wheel 273 can rotate independently, the cleaning robot 200 can move in various ways, such as forward driving, backward driving, rotational-driving, standing-driving, etc.

For example, when both the left and right drive wheels 273 rotate in a first direction, the cleaning robot 200 may straightly move forward, and when both the left and right drive wheels 273 rotate in a second direction, the cleaning robot 200 may straightly move backward.

Also, when the left and right drive wheels 273 rotate at different speeds in the same direction, the cleaning robot 200 may turn to the right or left, and if the left and right drive wheels 273 rotate in different directions, the cleaning robot 200 may rotate clockwise or counterclockwise at the same place.

A castor wheel 275 may be disposed on the bottom of the main body 201, and the rotation shaft of the castor wheel 275 may rotate according to a movement direction of the cleaning robot 200. The castor wheel 275 whose rotating shaft rotates according to a movement direction of the cleaning robot 120 may help the cleaning robot 200 move at its stable position without interfering with driving of the cleaning robot 200.

Also, the driving unit 270 may further include a gear module (not shown) to reduce the rotating forces of the wheel driving motors 271 and to transfer the rotating forces to the drive wheels 273, and a rotation sensor (not shown) to detect rotational displacements and rotation speeds of the wheel driving motors 271 or the drive wheels 273.

FIG. 50 is a block diagram showing a control configuration of the cleaning robot 200 according to another embodiment of the present disclosure, and FIG. 51 is a block diagram showing a configuration of a controller of FIG. 50.

As shown in FIG. 50, the cleaning robot 200 may include the input unit 210, the display unit 220, a voice output unit 230, a storage unit 240, a suction unit 250, a brush unit 260, a driving unit 270, and a controller 290.

The input unit 210 is a configuration to receive various control commands from a user, and may include the power button 210a, the start/stop button 210b, and the return button 210c in order to receive, when a user selects a button from among the power button 210a, the start/stop button 210b, and the return button 210c, a control command signal corresponding to the selected button. Each of the buttons 210a, 210b, and 210c may be a push switch or a membrane switch to generate an input signal according to a pressure from a user, or a touch switch to generate an input signal according to a contact of a user's body part.

Meanwhile, the input unit 210 may receive a control command signal transmitted from a remote controller (not shown), as well as from the buttons 210a, 210b, and 210c included in the cleaning robot 200. In order to receive a control command signal from a remote controller, the cleaning robot 200 may include a sensor (not shown) capable of receiving Near Field Communication (NFC) signals.

The display unit 220 may display information about the cleaning robot 200 in response to a control command input by a user. Also, the display unit 220 may display information related to operation that is performed on the cleaning robot 200, in the form of text. For example, the display unit 220 may display an operation state of the cleaning robot 200, a power on/off state of the cleaning robot 200, a cleaning mode selected by a user, information about returning to a charging station, etc.

The display unit 220 may be a LED display or an OLED display capable of self-light emitting, or a LCD with a separate light source.

The voice output unit 230 is a configuration to output information related to operation that is performed on the cleaning robot 200, in the form of voice, and can output an alarm notifying a flow-path load state of the cleaning robot 200, in the form of voice, under the control of the controller 290.

The storage unit 240 may store all information related to the cleaning robot 200, as well as various information related to driving of the cleaning robot 200. For example, the storage unit 240 may store a control program for sensing a flow-path load of the cleaning robot 200.

The storage unit 240 may be a non-volatile memory to permanently store information, or a volatile memory to temporarily store temporary data generated when operations of the cleaning robot 200 are controlled, wherein the non-volatile memory includes a magnetic disk, a solid state disk, Read Only Memory (ROM), EPROM, and Electrically Erasable Programmable Read Only Memory (EEPROM), and the volatile memory includes DRAM and SRAM.

The suction unit 250 may include the cyclone separator 251 to separate dust from air entered through the dust suction opening 205, the filter 253 to filter out dust from the air separated by the cyclone separator 251, and the suction motor 255 to generate a suction force to collect scattered dust in the dust collecting unit 257 through the dust suction opening 205. The suction motor 255 may be a Brushless Direct Current (BLDC) motor. However, the suction motor 255 is not limited to the BLDC motor, and may be a Direct Current (DC) motor.

As shown in FIG. 49, the suction unit 250 to suck dust scattered by rotations of the drum brush 263 into the dust collecting unit 257 may be disposed in the main body 201.

As shown in FIGS. 48 and 49, the dust collecting unit 257 may be disposed in the main body 201, and store dust sucked by the suction unit 250.

The brush unit 260 may include the drum brush 263 to scatter dust existing on a floor, and the brush driving motor 261 to rotate the drum brush 263.

The brush unit 260 and the suction unit 250 may include the dust guide pipe 265 to guide dust sucked through the dust suction opening 205 of the sub body 203 to the dust collecting unit 257 provided in the main body 201.

The driving unit 270 may include the wheel driving motors 271 and the drive wheels 273.

The drive wheels 273 may be disposed at both sides of the bottom of the main body 201. The drive wheels 273 may be disposed to the left and right of the cleaning robot 200 when seen from the front part of the cleaning robot 200.

The wheel driving motors 271 may generate rotating forces for rotating the drive wheels 273 to move the cleaning robot 200, and may include a left driving motor 271 and a right driving motor 271 in correspondence to the left drive wheel 273 and the right drive wheel 273. The left driving motor 271 and the right driving motor 271 may receive driving control signals from the controller 290, respectively, to operate independently.

If a revolutions per minutes (RPM) of the suction motor 255 exceeds a reference RPM for a predetermined time period, the controller 290 may determine that a load is generated at a part of the flow-path from the dust suction opening 205 to the dust collecting unit 257, and may generate a flow-path load alarm. Herein, the flow-path means a passage through which dust is transferred from the dust suction opening 205 to the dust collecting unit 257 via the dust guide pipe 265 in the cleaning robot 200. That is, the flow-path load means that clogging has occurred at a part of the flow-path from the dust suction opening 205 to the dust collecting unit 257. As shown in FIG. 49, the filter 253 may be connected to one side of the dust collecting unit 257. In the cleaning robot 200 which is equipment to generate a high suction force to suck dust, the cyclone separator 251 may be disposed in front of the filter 253 to separate dust from air in order to prevent the filter 253 from being clogged by dust. Dust not separated by the cyclone separator 251 may be accumulated in the filter 253 to reduce a suction force. In this case, resistance increases in the flow-path, and the RPM of the suction motor 255 increases. The controller 290 may sense a flow-path load based on a RPM of the suction motor 255 to generate an alarm notifying that the filter 253 or the flow-path should be cleaned.

Referring to FIG. 51, the controller 290 may include a suction motor state sensing unit 291, a flow-path load determiner 293, an alarm controller 295, and a driving controller 297.

More specifically, the suction motor state sensing unit 291 may sense a RPM of the suction motor 255. For example, the suction motor state sensing unit 291 may acquire measurement information about a RPM of the suction motor 255. If the suction motor 255 is a BLDC motor, the suction motor 255 may feed its own RPM information back to the suction motor state sensing unit 291. Since a BLDC motor feeds back a RPM, a separate device (for example, a pressure switch for sensing a vacuum pressure in a flow-path) for measuring a RPM of the suction motor 255 is not needed. The pressure switch, which is turned on/off by a spring, may have influence on measurement of a RPM of the suction motor 255 due to the fabrication error of the spring. However, in the present disclosure, since such a pressure switch is not needed, the problem can be overcome.

If the suction motor 255 is not a BLDC motor, a separate sensor for measuring a RPM of the suction motor 255 is needed.

The flow-path load determiner 293 may compare the RPM of the suction motor 255 to a reference RPM to determine whether the RPM of the suction motor 255 exceeds the reference RPM. If the flow-path load determiner 293 determines that the RPM of the suction motor 255 exceeds the reference RPM, the flow-path load determiner 293 may determine whether the RPM of the suction motor 255 exceeds the reference RPM for a reference time period or more. If the flow-path load determiner 293 determines that the RPM of the suction motor 255 exceeds the reference RPM for the reference time period or more, the flow-path load determiner 293 may determine that a load is generated at a part of the flow-path from the dust suction opening 205 to the dust collecting unit 257.

For example, when the suction motor 255 is a BLDC motor, the flow-path load determiner 293 may determine that clogging has occurred in the flow-path if the RPM of the suction motor 255 is 18200 rpm (vacuum pressure of −2300 Pa). If the RPM of the suction motor 255 is 19200 rpm (vacuum pressure of −2700 Pa), the flow-path load determiner 293 may determine that clogging of 60% has occurred in the flow-path. Also, if the RPM of the suction motor 255 is 19400 rpm (vacuum pressure of −3200 Pa), the flow-path load determiner 293 may determine that clogging of 100% has occurred in the flow-path. When the suction motor 255 is a BLDC motor, 18200 rpm (vacuum pressure of −2300 Pa) is a specification of when the flow-path from the dust suction opening 205 to the dust collecting unit 257 is not clogged due to dust, 19200 rpm (vacuum pressure of −2700 Pa) is a specification of when the flow-path is clogged to 60% due to dust, and 19400 rpm (vacuum pressure of −3200 Pa) is a specification of when the flow-path is clogged to 100% due to dust.

The alarm controller 295 may display a flow-path load alarm in the form of text through the display unit 220, or output a flow-path load alarm in the form of voice through the voice output unit 230.

Also, when the cleaning robot 200 returns to a charging station (not shown), the alarm controller 295 may generate an alarm for a predetermined time period.

Also, when the cleaning robot 200 returns to the charging station, the cleaning robot 200 may generate an alarm until a signal requesting turning-off of the alarm is received.

The driving controller 297 may be a configuration for controlling driving of the cleaning robot 200.

FIG. 52 is a flowchart illustrating an example of a control method of the cleaning robot 200 according to another embodiment of the present disclosure.

If the cleaning robot 200 is driven, the cleaning robot 200 may measure a RPM of the suction motor 255, in operations 5010 and 5020. The suction motor 255 may be a BLDC motor.

Then, the cleaning robot 200 may compare the RPM of the suction motor 255 to a reference RPM, in operation 5030.

If the cleaning robot 200 determines that the RPM of the suction motor 255 exceeds the reference RPM, the cleaning robot 200 may determine whether the RPM of the suction motor 255 exceeds the reference RPM for a reference time period or more, in operation 5040.

For example, the cleaning robot 200 may determine whether the RPM of the suction motor 255 exceeds 19200 rpm, in operation 5030, and if the cleaning robot 200 determines that the RPM of the suction motor 255 exceeds 19200 rpm, the cleaning robot 200 may determine whether the RPM of the suction motor 255 exceeds 19200 rpm for one minute or more. The one minute may have been arbitrarily set by an operator in order to determine whether the RPM of the suction motor is maintained for a predetermined time period. That is, the reference time period may be set to another value.

That the RPM of the suction motor 255 exceeds the reference RPM for the reference time period means that a state in which a RPM value of the suction motor 255, acquired by repeatedly performing operation 5020, exceeds the reference RPM is maintained for the reference time period or more.

Operation 5040 is performed to improve reliability on a flow-path load alarm of the cleaning robot 200. By performing operation 5040, a situation that a flow-path load alarm is temporarily generated when a RPM of the suction motor 255 temporarily exceeds the reference RPM and then the flow-path load alarm is stopped, or a situation that a flow-path load alarm is repeatedly generated and stopped whenever a RPM of the suction motor exceeds the reference RPM intermittently can be prevented in advance.

If the cleaning robot 200 determines that a RPM of the suction motor 255 exceeds the reference RPM for the reference time period or more, the cleaning robot 200 may determine that a load is generated at a part of the path-path from the dust suction opening 205 to the dust collecting unit 257, and generate a flow-path load alarm, in operation 5050.

At this time, the cleaning robot 200 may generate the flow-path load alarm in the form of text or voice.

FIG. 53 is a flowchart illustrating another example of a control method of the cleaning robot 200 according to another embodiment of the present disclosure.

Hereinafter, an example of a method in which the cleaning robot 200 returns to a charging station while generating a flow-path load alarm will be described.

If the cleaning robot 200 is driven, the cleaning robot 200 may measure a RPM of the suction motor 255, in operations 5110 and 5120.

Then, the cleaning robot 200 may compare the RPM of the suction motor 255 to a reference RPM, in operation 5130.

If the cleaning robot 200 determines that the RPM of the suction motor 255 exceeds the reference RPM, the cleaning robot 200 may determine whether the RPM of the suction motor exceeds the reference RPM for a predetermined time period or more, in operation 5140.

For example, the cleaning robot 200 may determine whether the RPM of the suction motor 255 exceeds 19200 rpm, in operation 5030, and if the cleaning robot 200 determines that the RPM of the suction motor 255 exceeds 19200 rpm, the cleaning robot 200 may determine whether the RPM of the suction motor 255 exceeds 19200 rpm for one minute or more.

That the RPM of the suction motor 255 exceeds the reference RPM for the reference time period means that a state in which a RPM value of the suction motor 255, acquired by repeatedly performing operation 5120, exceeds the reference RPM is maintained for the reference time period or more.

If the cleaning robot 200 determines that a RPM of the suction motor 255 exceeds the reference RPM for the reference time period or more, the cleaning robot 200 may determine that it is in a flow-path load state, and generate a flow-path load alarm, in operation 5150.

Then, the cleaning robot 200 may determine whether it returns to a charging station, in operation 5160.

If the cleaning robot 200 determines that it returns to the charging station, the cleaning robot 200 may continue to generate the flow-path load alarm for a predetermined time period, in operation 5170.

That is, when the cleaning robot 200 returns to the charging station, the cleaning robot 200 may continue to generate the flow-path load alarm until a signal requesting turning-off of the alarm is received, in operation 5170.

That is, when the cleaning robot 200 returns to the charging station while generating the flow-path load alarm, the cleaning robot 200 may continue to generate the flow-path load alarm for a predetermined time period or until a predetermined signal for requesting turning-off of the alarm is received.

FIG. 54 is a flowchart illustrating still another example of a control method of the cleaning robot 200 according to another embodiment of the present disclosure.

Hereinafter, an example of a method in which the cleaning robot 200 operates stepwisely according to a RPM of the suction motor 255 will be described.

If the cleaning robot 200 is driven, the cleaning robot 200 may measure a RPM of the suction motor 255, in operations 5210 and 5220. The suction motor 255 may be a BLDC motor.

Then, the cleaning robot 200 may compare the RPM of the suction motor 255 to a first reference RPM, in operation 5230.

If the cleaning robot 200 determines that the RPM of the suction motor 255 exceeds the first reference RPM, the cleaning robot 200 may determine whether the RPM of the suction motor exceeds the first reference RPM for a predetermined time period or more, in operation 5240.

For example, the cleaning robot 200 may determine whether the RPM of the suction motor 255 exceeds 19200 rpm, in operation 5230, and if the cleaning robot 200 determines that the RPM of the suction motor 255 exceeds 19200 rpm, the cleaning robot 200 may determine whether the RPM of the suction motor 255 exceeds 19200 rpm for one minute or more.

If the cleaning robot 200 determines that the RPM of the suction motor exceeds the first reference RPM for a predetermined time period or more, the cleaning robot 200 may determine that a load is generated at a part of the flow-path from the dust suction opening 205 to the dust collecting unit 257, and generate a flow-path load alarm, in operation 5250. The cleaning robot 200 may generate the flow-path load alarm in the form of text or voice.

Then, the cleaning robot 200 may compare the RPM of the suction motor 255 to a second reference RPM, in operation 5260.

For example, the cleaning robot 200 may determine whether a RPM of the suction motor 255 exceeds 19400 rpm, in operation 5260.

If the cleaning robot 200 determines that the RPM of the suction motor 255 exceeds the second reference RPM, the cleaning robot 200 may return to the charging station, in operation 5270. Since the cleaning robot 200 determines that the RPM of the suction motor 255 exceeding the second reference RPM may influence the performance of the cleaning robot 200, the cleaning robot 200 returns to the charging station to stop operating.

Since the cleaning robot according to the embodiments of the present disclosure senses a flow-path load and generates an alarm before a user determines through his/her naked eyes that the filter or the flow-path should be cleaned, a dust suction force of the cleaning robot can be maintained at an appropriate level.

Also, since the cleaning robot generates a flow-path load alarm if the RPM of the suction motor exceeds a reference RPM for a predetermined time period, it is possible to improve reliability on a flow-path load alarm of the cleaning robot, and to prevent frequent wrong operations of a flow-path load alarm in advance.

It will be apparent to those skilled in the art that various modifications and variations can be made in the disclosure without departing from the spirit or scope of the inventions. Thus, it is intended that the disclosure covers the modifications and variations of this invention provided they come within the scope of the appended claims and their equivalents.

The invention claimed is:

1. A cleaning robot, comprising:
    a main body having a front;
    a driver configured to move the main body;
    a sensor; and
    a controller configured to:
        in response to detecting a contact of the front of the main body to the obstacle based on an output of the sensor, control the driver to align the front of the main body to an outline of the obstacle, and
    wherein the controller is configured to control the driver, by rotating the main body about a contact part of the front of the main body contacting the obstacle, to contact both a left and a right of the front of the main body with the obstacle.

2. The cleaning robot according to claim 1, wherein upon aligning the front of the main body to the outline of the obstacle, the controller controls the driver to move the main body backwards and forwards a predetermined times.

3. The cleaning robot according to claim 1, wherein the sensor is configured to sense the obstacle without contacting the obstacle, and
wherein upon the obstacle being sensed by the sensor without contacting the obstacle, the controller controls the driver to align the front of the main body to the outline of the obstacle.

4. The cleaning robot according to claim 3, wherein the controller controls the driver to rotate the main body about a center of rotation calculated depending on a distance to the obstacle.

5. The cleaning robot according to claim 3, wherein in response to a width of the obstacle being wider than or equal to a reference width, the controller controls the driver to align the front of the main body to the outline of the obstacle.

6. The cleaning robot according to claim 3, wherein in response to a width of the obstacle being narrower than a reference width, the controller controls the driver to move the main body parallel to the outline of the obstacle.

7. The cleaning robot according to claim 3, further comprising a cleaner configured to suck dust existing on a floor,
wherein when a condition for outline alignment is satisfied, the controller increases a suction force of the cleaner.

8. The cleaning robot according to claim 1, wherein the sensor comprises:
a bumper disposed in front of the main body, and contacting the obstacle;
a bumper switch configured to output a contact sensed signal upon the bumper contacting the obstacle; and
an external force transferer configured to transfer an external force applied from the obstacle to the bumper to the bumper switch.

9. The cleaning robot according to claim 8, wherein upon the bumper contacting the obstacle, the bumper presses the external force transferer,
wherein upon the external force transferer being pressed by the bumper, the external force transferer rotates on a center of rotation to press the bumper switch, and
wherein upon the bumper switch being pressed by the external force transferer, the bumper switch outputs the contact sensed signal.

10. A control method of a cleaning robot, comprising:
driving the cleaning robot;
reducing a driving speed of the cleaning robot, in response to a distance between the cleaning robot and the obstacle being shorter than or equal to a reference distance;
in response to detecting a contact of a front of the cleaning robot to the obstacle, aligning the front of the cleaning robot to an outline of the obstacle, and
wherein the aligning of the front of the cleaning robot to the outline of the obstacle comprises, by rotating the cleaning robot about a contact part of the front of the cleaning robot contacting the obstacle, contacting both a left and a right of the front of the main body with the obstacle.

11. The control method according to claim 10, wherein the reducing of the driving speed of the cleaning robot comprises reducing the driving speed of the cleaning robot from a first driving speed to a second driving speed.

12. The control method according to claim 10, wherein the reducing of the driving speed of the cleaning robot comprises reducing the driving speed of the cleaning robot stepwisely.

13. The control method according to claim 10, further comprising:
in response to aligning the front of the cleaning robot to the outline of the obstacle, moving the cleaning robot backward and moving the cleaning robot parallel to the outline of the obstacle.

14. The control method according to claim 10, wherein the outline of the obstacle is a first outline and the control method further comprises:
moving the cleaning robot so that the front of the cleaning robot is aligned to the first outline of the obstacle, and then the front of the cleaning robot is aligned to a second outline of the obstacle.

* * * * *